(12) United States Patent
Chang et al.

(10) Patent No.: US 10,670,831 B2
(45) Date of Patent: Jun. 2, 2020

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Kuo-Yu Liao, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 129 days.

(21) Appl. No.: 16/043,269

(22) Filed: Jul. 24, 2018

(65) Prior Publication Data

US 2019/0339487 A1   Nov. 7, 2019

(30) Foreign Application Priority Data

May 1, 2018 (TW) .............................. 107114799 A

(51) Int. Cl.
G02B 9/34 (2006.01)
G02B 9/36 (2006.01)
G02B 13/00 (2006.01)
G02B 3/02 (2006.01)
H04N 5/335 (2011.01)

(52) U.S. Cl.
CPC ................. *G02B 9/36* (2013.01); *G02B 3/02* (2013.01); *G02B 13/004* (2013.01); *H04N 5/335* (2013.01)

(58) Field of Classification Search
CPC .......... G02B 9/36; G02B 3/02; G02B 13/004; G02B 9/34; G02B 13/04
See application file for complete search history.

(56) References Cited

U.S. PATENT DOCUMENTS 9,341,857 B2 * 5/2016 Suzuki ................... G02B 27/42

* cited by examiner

*Primary Examiner* — Joseph P Martinez
(74) *Attorney, Agent, or Firm* — Muncy, Geissler, Olds & Lowe, P.C.

(57) ABSTRACT

An optical image capturing system is provided. In order from an object side to an image side, the optical image capturing system includes a first lens, a second lens, a third lens and a fourth lens. The first lens has a refractive power and the object side thereof may be convex. The second lens and the third lens have refractive power. The object side and the image side thereof may be aspheric. The fourth lens may have positive refractive power. The object side and the image side thereof are aspheric. At least one of sides of the fourth lens may have one inflection point. The four lenses have refractive power. When meeting some certain conditions, the optical image capturing system may have outstanding light-gathering ability and an adjustment ability about the optical path in order to elevate the image quality.

25 Claims, 25 Drawing Sheets

OPTICAL IMAGE CAPTURING SYSTEM

CROSS-REFERENCE TO RELATED APPLICATION

This application claims priority from Taiwan Patent Application No. 107114799, filed on May 1, 2018, in the Taiwan Intellectual Property Office, the content of which is hereby incorporated by reference in its entirety for all purposes.

BACKGROUND OF THE INVENTION

1. Field of the Invention

The present invention relates to an optical image capturing system, and more particularly is about a compact optical image capturing system applied to electronic products.

2. Description of the Related Art

In recent years, with the rise of portable electronic devices having camera functionalities, the demand for an optical image capturing system has gradually been raised. The image-sensing device of the ordinary photographing camera is commonly selected from a charge coupled device (CCD) or a complementary metal-oxide semiconductor sensor (CMOS Sensor). In addition, as advanced semiconductor manufacturing technology enables the minimization of the pixel size of the image-sensing device, the development of the optical image capturing system has gravitated towards the field of high pixels. Therefore, the requirement for high imaging quality has been rapidly increasing.

Conventional optical image capturing systems of portable electronic devices usually adopt a two lenses structure or three lenses structure as their main structure. However, since the pixel density of portable electronic devices has continuously increased, more end-users are demanding a large aperture for such functionalities as glimmer and night view, or for a wide angle of view such as for selfies using the front camera. However, the optical image capturing system with the large aperture often encounters the dilemma of plentiful aberration, which results in the deterioration of peripheral image quality and difficulties about manufacturing, and the optical image capturing system with wide angle of view in design encounters the dilemma of increased distortion rate in image formation. Conventional optical image capturing systems may not be sufficient to meet those advanced photography requirements.

Therefore, how to design an optical image capturing system capable of balancing the requirements for higher total pixel and higher image quality as well as the minimization of optical lenses by effectively increasing the amount of admitted light and the angle of view the optical image capturing system has become an important issue.

SUMMARY OF THE INVENTION

The aspect of embodiment of the present invention directs to an optical image capturing system which is able to use a combination of refractive power, convex and concave surfaces of four optical lenses (the convex or concave surface in the invention is the geometrical shape of an object side or an image side of each lens on an optical axis in principle) and the mechanism elements with small thickness is used for positioning the lenses. Further, the quantity of incoming light of the optical image capturing system is effectively enhanced and thus the angle of view of the optical image capturing system is increased. Simultaneously, the optical image capturing system has a specific relative illumination, and the total pixels and the image forming quality increase in order to apply to miniaturization of an electronic product or an electronic product with narrow borders.

The terms and the numerals pertaining to the mechanism elements parameters in the embodiment of the present invention are shown as below for further reference.

The optical image capturing system of this embodiment may include an image-sensing module, and the image-sensing module includes a substrate and a photosensitive element disposed on the substrate. The optical image capturing system may include a first positioning element denoted by PE1 (positioning element 1) and comprises a base and a holder. The base is disposed on the substrate and has an open accommodation space configured to accommodate the photosensitive element. The holder is in a hollow shape and opaque. Optionally, the holder can be formed integrally. The holder has a cylinder and a basement, which are connected with each other. The cylinder has a predetermined thickness TPE1 (Thickness of Positioning Element 1). The holder has a first through hole and a second through hole which are formed on the two opposite ends, respectively. The first through hole is connected with the cylinder. The second through hole is connected with the basement. The maximum value of the minimum side length of the basement on the plane perpendicular to the optical axis is expressed as PhiD. The maximum diameter of the inner hole of the second through holes is expressed as Phi2.

The optical image capturing system of the present invention further may include a second positioning element denoted by positioning element 2. The second positioning element is accommodated in the holder of the first positioning element, and comprises a positioning part and a connecting part. The positioning part is in a hollow shape and has a third through hole and a fourth through hole formed on the two opposite ends of the optical axis. The third through hole is connected with the positioning part, and the fourth through hole is connected with the basement and has a predetermined thickness TPE2 (Thickness of Positioning Element 2). The positioning part directly contacts with any one of the lenses in the embodiment of the present invention and generates the positioning effect of accommodating the lens and arranging the lens on the optical axis. The connecting part is disposed outside the positioning part and can directly combine with the cylinder so that the second positioning element can be accommodated in the holder of the first positioning element, and the optical image capturing system has function of adjusting and positioning the focal length in optical axis direction. The maximum outer diameter of the plane of the connection part on the plane perpendicular to the optical axis is expressed as PhiC. The maximum diameter of the inner hole of the fourth through hole is expressed as Phi4. The foregoing connecting part may possess the thread and make the second positioning element be engaged with the holder of the first positioning element.

Any one of lenses of the embodiment of the present invention can be directly disposed in the cylinder of the first positioning element, and be closer to the first through hole than the photosensitive element, and face the photosensitive element.

Otherwise, any one of lenses of the embodiment of the present invention can be selectively indirectly disposed in the first positioning element by means of the second positioning element, be closer to the third through hole than the photosensitive element, and face the photosensitive element.

The term and the definition to the lens parameter in the embodiment of the present invention are shown as below for further reference.

The Lens Parameters Related to the Length or the Height

The maximum height for image formation of the optical image capturing system is expressed as HOI. The height of the optical image capturing system is expressed as HOS. The distance from the object side of the first lens to the image side of the fourth lens is expressed as InTL. The distance from the image side of the fourth lens to the image plane is expressed as InB. InTL+InB=HOS. The distance from an aperture stop (aperture) to an image plane is expressed as InS. The distance from the first lens to the second lens is expressed as In12 (instance). The central thickness of the first lens of the optical image capturing system on the optical axis is expressed as TP1 (instance).

The Lens Parameters Related to the Material

The coefficient of dispersion of the first lens in the optical image capturing system is expressed as NA1 (instance). The refractive index of the first lens is expressed as Nd1 (instance).

The Lens Parameters Related to the Angle of View

The angle of view is expressed as AF. The half of the angle of view is expressed as HAF. The major light angle is expressed as MRA.

The Lens Parameters Related to the Exit/Entrance Pupil

The entrance pupil diameter of the optical image capturing system is expressed as HEP. The exit pupil of the optical image capturing system means that the ray at the aperture passes through the lens set which is on the rear side of the aperture and forms an image on the first image plane. The exit pupil diameter of the optical image capturing system is expressed as HXP. For any one surface of single lens, the maximum effective half diameter (EHD) is the perpendicular distance between an optical axis and an intersection point on the surface where the incident light with a maximum angle of view of the system passing the margin of the entrance pupil. For example, the maximum effective half diameter of the object side of the first lens is expressed as EHD11. The maximum effective half diameter of the image side of the first lens is expressed as EHD12. The maximum effective half diameter of the object side of the second lens is expressed as EHD21. The maximum effective half diameter of the image side of the second lens is expressed as EHD22. The maximum effective half diameter position of any one surface of the remaining lenses of the optical image capturing system can be referred as mentioned above. The maximum effective diameter of the image side which is the nearest to the image plane of the optical image capturing system is expressed as PhiA, and the relationship is satisfied: PhiA=double EHD. If the surface is aspheric, the cut-off point of the maximum effective diameter namely includes the cut-off point of the aspherical surface. An ineffective half diameter (IHD) position of any surface of single lens means the surficial section of the cut-off point (if the surface is an aspheric surface, an end point of the aspherical coefficient is on the surface) of the maximum effective diameter extending to the same surface away from the optical axis. The maximum diameter of the image side of the lens which is the nearest to the image plane of the optical image capturing system is expressed as PhiB, and the relationship is satisfied: PhiB=a double (a maximum EHD+a maximum IHM)=PhiA+a double (a maximum IHM).

In the optical image capturing system of the present invention, the maximum effective diameter of the image side on the lens that is the closest to the image plane (i.e. image space) is the optical exit pupil, and the maximum effective diameter is expressed as PhiA. For instance, when the optical exit pupil is at the image side of the third lens, the maximum effective diameter is expressed as PhiA3. When the optical exit pupil is at the image side of the fourth lens, the maximum effective diameter is expressed as PhiA4. For the optical image capturing system having different number of lenses with refractive power, the maximum effective diameter (optical exit pupil) can be referred as mentioned above. The pupil magnification ratio of the optical image capturing system is expressed as PMR, and the following relationship is satisfied: PMR=PhiA/HEP.

The Lens Parameters Related to the Surface Depth of the Lens

The horizontal distance parallel to the optical axis, which is measured from the intersection point where the object side of the fourth lens crosses the optical axis to the terminal point of the maximum effective half diameter on the object side of the fourth lens, may be expressed as InRS41 (instance). The horizontal distance parallel to the optical axis, which is measured from the intersection point where the image side of the fourth lens crosses the optical axis to the terminal point of the maximum effective half diameter on the image side of the fourth lens, may be expressed as InRS42 (instance).

The Lens Parameters Related to the Shape of the Lens

The critical point C is a point, which is tangential to the tangential plane and perpendicular to the optical axis on the specific surface of the lens except that an intersection point which crosses the optical axis on the specific surface of the lens. In addition to the description above, the perpendicular distance between the critical point C31 on the object side of the third lens and the optical axis may be expressed as HVT31 (instance). The perpendicular distance between a critical point C32 on the image side of the third lens and the optical axis may be expressed as HVT32 (instance). The perpendicular distance between the critical point C41 on the object side of the fourth lens and the optical axis may be expressed as HVT41 (example). The perpendicular distance between a critical point C42 on the image side of the fourth lens and the optical axis may be expressed as HVT42 (instance). The perpendicular distance between the critical point on the object side or the image side of other lenses and the optical axis may be expressed in a similar way.

The object side of the fourth lens has one inflection point IF411 which is the first nearest to the optical axis, and the sinkage value of the inflection point IF411 is expressed as SGI411 (instance). The horizontal distance parallel to the optical axis from an inflection point on the object side of the fourth lens that is the first nearest to the optical axis to the intersection point where the object side of the fourth lens crosses the optical axis is expressed as SGI411. The distance perpendicular to the optical axis between the inflection point IF411 and the optical axis is HIF411 (instance). The image side of the fourth lens has one inflection point IF421 which is the first nearest to the optical axis, and the sinkage value of the inflection point IF421 is expressed as SGI421 (instance). The horizontal distance parallel to the optical axis from an inflection point on the image side of the fourth lens that is the first nearest to the optical axis to the intersection point where the image side of the fourth lens crosses the optical axis is expressed as SGI421. The distance perpendicular to the optical axis between the inflection point IF421 and the optical axis is HIF421 (instance).

The object side of the fourth lens has one inflection point IF412 which is the second nearest to the optical axis, and the sinkage value of the inflection point IF412 is expressed as SGI412 (instance). The horizontal distance parallel to the optical axis from an inflection point on the object side of the fourth lens that is the second nearest to the optical axis to the intersection point where the object side of the fourth lens crosses the optical axis is expressed as SGI412. The distance perpendicular to the optical axis between the inflection point IF412 and the optical axis is HIF412 (instance). The image side of the fourth lens has one inflection point IF422 which is the second nearest to the optical axis, and the sinkage value of the inflection point IF422 is expressed as SGI422 (instance). The horizontal distance parallel to the optical axis from an inflection point on the image side of the fourth lens that is the second nearest to the optical axis to the intersection point where the image side of the fourth lens crosses the optical axis is expressed as SGI422. The distance perpendicular to the optical axis between the inflection point IF422 and the optical axis is HIF422 (instance).

The object side of the fourth lens has one inflection point IF413 which is the third nearest to the optical axis, and the sinkage value of the inflection point IF413 is expressed as SGI413 (instance). The horizontal distance parallel to the optical axis from an inflection point on the object side of the fourth lens that is the third nearest to the optical axis to the intersection point where the object side of the fourth lens crosses the optical axis is expressed as SGI413. The distance perpendicular to the optical axis between the inflection point IF413 and the optical axis is HIF413 (instance). The image side of the fourth lens has one inflection point IF423 which is the third nearest to the optical axis, and the sinkage value of the inflection point IF423 is expressed as SGI423 (instance). The horizontal distance parallel to the optical axis from an inflection point on the image side of the fourth lens that is the third nearest to the optical axis to the intersection point where the image side of the fourth lens crosses the optical axis is expressed as SGI423. The distance perpendicular to the optical axis between the inflection point IF423 and the optical axis is HIF423 (instance).

The object side of the fourth lens has one inflection point IF414 which is the fourth nearest to the optical axis, and the sinkage value of the inflection point IF414 is expressed as SGI414 (instance). The horizontal distance parallel to the optical axis from an inflection point on the object side of the fourth lens that is the fourth nearest to the optical axis to the intersection point where the object side of the fourth lens crosses the optical axis is expressed as SGI414. The distance perpendicular to the optical axis between the inflection point IF414 and the optical axis is HIF414 (instance). The image side of the fourth lens has one inflection point IF424 which is the fourth nearest to the optical axis, and the sinkage value of the inflection point IF424 is expressed as SGI424 (instance). The horizontal distance parallel to the optical axis from an inflection point on the image side of the fourth lens that is the fourth nearest to the optical axis to the intersection point where the image side of the fourth lens crosses the optical axis is expressed as SGI424. The distance perpendicular to the optical axis between the inflection point IF424 and the optical axis is HIF424 (instance).

The inflection point, the distance perpendicular to the optical axis between the inflection point and the optical axis, and the sinkage value thereof on the object side or image side of other lenses are denoted in a similar way as described above.

The Lens Parameters Related to an Aberration

Optical distortion for image formation in the optical image capturing system is expressed as ODT. TV distortion for image formation in the optical image capturing system is expressed as TDT. Further, the range of the aberration offset for the view of image formation may be limited to 50%-100% field. The offset of the spherical aberration is expressed as DFS. The offset of the coma aberration is expressed as DFC.

The characteristic diagram of modulation transfer function of the optical image capturing system is used for testing and evaluating the contrast ratio and the sharpness ratio of the image. The vertical coordinate axis of the characteristic diagram of modulation transfer function indicates a contrast transfer rate (with values from 0 to 1). The horizontal coordinate axis indicates a spatial frequency (cycles/mm; lp/mm; line pairs per mm). Theoretically, an ideal image capturing system can show the line contrast of a photographed object clearly and distinctly. However, the values of the contrast transfer rate at the vertical coordinate axis are smaller than one in the actual optical image capturing system. In addition, it is generally more difficult to achieve a fine degree of recovery in the edge region of the image than in the central region of the image. The contrast transfer rates (MTF values) with spatial frequencies of 55 cycles/mm at the optical axis, 0.3 field of view and 0.7 field of view of visible light spectrum on the image plane may be expressed respectively as MTFE0, MTFE3 and MTFE7. The contrast transfer rates (MTF values) with spatial frequencies of 110 cycles/mm at the optical axis, 0.3 field of view, and 0.7 field of view of visible light spectrum on the image plane may be respectively expressed as MTFQ0, MTFQ3 and MTFQ7. The contrast transfer rates (MTF values) with spatial frequencies of 220 cycles/mm at the optical axis, 0.3 field of view, and 0.7 field of view of visible light spectrum on the image plane may be respectively expressed as MTFH0, MTFH3 and MTFH7. The contrast transfer rates (MTF values) with spatial frequencies of 440 cycles/mm at the optical axis, 0.3 field of view, and 0.7 field of view of visible light spectrum on the image plane may be respectively expressed as MTF0, MTF3 and MTF7. The three fields of view described above are representative to the center, the internal field of view and the external field of view of the lens. Therefore, the three fields of view described above may be used to evaluate whether the performance of the specific optical image capturing system is excellent. If the design of the optical image capturing system corresponds to a sensing device with the pixel size below and equal to 1.12 micrometers, the quarter spatial frequencies, the half spatial frequencies (half frequencies) and the full spatial frequencies (full frequencies) of the characteristic diagram of modulation transfer function are respectively at least 110 cycles/mm, 220 cycles/mm and 440 cycles/mm.

If an optical image capturing system needs to satisfy conditions with images of the infrared spectrum and the visible spectrum simultaneously, such as the requirements for night vision in low light, the used wavelength may be 850 nm or 800 nm. Since the main function is to recognize the shape of an object formed in a black-and-white environment, high resolution is unnecessary and thus the spatial frequency less than 110 cycles/mm may be selected to evaluate the performance of the specific optical image capturing system on the infrared light spectrum. When the foregoing operation wavelength 850 nm is focused on the image plane, the contrast transfer rates (MTF values) with a spatial frequency of 55 cycles/mm where the images are at the optical axis, 0.3 field of view and 0.7 field of view may be respectively expressed as MTFI0, MTFI3 and MTFI7. However, because the difference between the infrared wavelength of 850 nm or 800 nm and the general visible light wavelength is large, there is a significant difficulty in design of the optical image capturing system which can simultaneously focus the visible light and the infrared light (dual-mode) and achieve a specific performance, respectively The present invention provides an optical image capturing system, an object side or an image side of the fourth lens has an inflection point, such that the angle of incidence from each field of view to the fourth lens can be adjusted effectively and the optical distortion and the TV distortion can be corrected as well. Furthermore, the surfaces of the fourth lens may have a better optical path adjusting ability to acquire better imaging quality.

The present invention provides an optical image capturing system, in order from an object side to an image side, including a first lens, a second lens, a third lens, a fourth lens and an image plane. The first lens has refractive power. Both the object side and image side of the fourth lens may be aspheric. Focal lengths of the first lens through the fourth lens are respectively f1, f2, f3 and f4. The focal length of the optical image capturing system is f. The entrance pupil diameter of the optical image capturing system is HEP. The distance on an optical axis from an object side of the first lens to the image plane is HOS. The distance on the optical axis from the object side of the first lens to the image side of the fourth lens is InTL. PhiA4 is the maximum effective diameter of the image side of the fourth lens. Thicknesses of the first lens to the fourth lens at height of ½ HEP parallel to the optical axis are respectively expressed as ETP1, ETP2, ETP3 and ETP4. A sum of ETP1 to ETP4 described above is expressed as SETP. The thicknesses of the first lens to the fourth lens on the optical axis are respectively expressed as TP1, TP2, TP3 and TP4. A sum of TP1 to TP4 described above is expressed as STP. The following conditions are satisfied: 1.2≤f/HEP≤10; 0.5≤HOS/f≤20, 0<PhiA4/InTL≤1.3 and 0.5≤SETP/STP<1.

In addition, the present invention provides an optical image capturing system. The optical image capturing system, in order along an optical axis from an object side to an image side, includes a first lens, a second lens, a third lens, a fourth lens, an image plane and a first positioning element. The first positioning element comprises a holder. The holder is in a hollow shape and opaque. The holder comprises a cylinder and a basement connected with each other. The cylinder is configured to accommodate the first lens to the fourth lens. The basement is between the fourth lens and the image plane. An outer periphery of the basement is greater than an outer periphery of the cylinder. The maximum value of the minimum side length of the basement on the plane perpendicular to the optical axis is expressed as PhiD. The first lens has refractive power. The object side of the first lens adjacent to the optical axis is convex. The second lens has refractive power. The third lens has refractive power. The fourth lens has refractive power. At least one lens among the first lens to the fourth lens has positive refractive power. f1, f2, f3 and f4 are focal lengths of the first lens to the fourth lens. f is the focal length of the optical image capturing system. HEP is the entrance pupil diameter of the optical image capturing system. HOS is the distance from object side of the first lens to the image plane. InTL is the distance on the optical axis from object side of the first lens to image side of the fourth lens. A half maximum angle of view of the optical image capturing system may be expressed as HAF. The horizontal distance parallel to the optical axis from a coordinate point on the object side of the first lens at height of ½ HEP to the image plane is expressed as ETL. The horizontal distance parallel to the optical axis from the coordinate point on the object side of the first lens at height of ½ HEP to a coordinate point on the image side of the fourth lens at height of ½ HEP is expressed as EIN. The following conditions are satisfied: 1.2≤f/HEP 10; 0.5≤HOS/f≤20; 0.4≤|tan(HAF)|≤6.0; 0 mm<PhiD≤2.9 mm; 0.2≤EIN/ETL<1.

The present invention provides another optical image capturing system, in order along an optical axis from an object side to an image side, includes a first lens, a second lens, a third lens, a fourth lens, an image plane and a first positioning element. The first positioning element comprises a holder. The holder is in a hollow shape and opaque. The holder comprises a cylinder and a basement connected with each other. The cylinder is configured to accommodate the first lens to the fourth lens. The basement is between the fourth lens and the image plane. An outer periphery of the basement is greater than an outer periphery of the cylinder. The maximum value of the minimum side length of the basement on the plane perpendicular to the optical axis is expressed as PhiD. The second positioning element is disposed in the holder, and comprises a positioning part and a connecting part. The positioning part is in a hollow shape and directly contacts and accommodates any one of the four lenses to arrange the four lenses on the optical axis. The connecting part is disposed outside the positioning part and directly contacts an inner periphery of the cylinder. The maximum outer diameter of the connecting part on the plane perpendicular to the optical axis is expressed as PhiC. The first lens has refractive power. The object side of the first lens adjacent to the optical axis is convex. The second lens has refractive power. The third lens has refractive power. The fourth lens has refractive power. At least one lens among the first lens to the fourth lenses has positive refractive power. The focal lengths of the four lenses are respectively expressed as f1, f2, f3 and f4. A focal length of the optical image capturing system is expressed as f. An entrance pupil diameter of the optical image capturing system is expressed as HEP. A distance on the optical axis from the object side of the first lens to the first image plane is expressed as HOS. The distance from the object side of the first lens to the image side of the fourth lens may be expressed as InTL. A half maximum angle of view of the optical image capturing system may be expressed as HAF. The maximum effective diameter of the image side of the fourth lens may be expressed as PhiA4. The horizontal distance parallel to the optical axis from a coordinate point on the object side of the first lens at height of ½ HEP to the image plane is expressed as ETL. The horizontal distance parallel to the optical axis from the coordinate point on the object side of the first lens at height of ½ HEP to a coordinate point on the image side of the fourth lens at height of ½ HEP is expressed as EIN. The following conditions are satisfied: 1.2≤f/HEP≤10; 0.5≤HOS/f≤15; 0.4≤|tan(HAF)|≤6.0; 0<PhiA4/InTL≤1.5; PhiC<PhiD; 0 mm<PhiD≤3.3 mm; 0.2≤EIN/ETL<1.

The thickness of a single lens at a height of ½ entrance pupil diameter (HEP) particularly affects the corrected aberration of common area of each field of view of light and the capability of correcting the optical path difference between each field of view of light in the scope of ½ entrance pupil diameter (HEP). The capability of aberration correction is enhanced if the thickness of the lens becomes greater, but the difficulty for manufacturing is also increased simultaneously. Therefore, the thickness of a single lens at the height of ½ entrance pupil diameter (HEP) needs to be controlled. The ratio relationship (ETP/TP) between the thickness (ETP) of the lens at a height of ½ entrance pupil diameter (HEP) and the thickness (TP) of the lens on the optical axis needs to be controlled in particular. For example, the thickness of the first lens at a height of ½ entrance pupil diameter (HEP) may be expressed as ETP1. The thickness of the second lens at a height of ½ entrance pupil diameter (HEP) may be expressed as ETP2. The thicknesses of other lenses at a height of ½ entrance pupil diameter (HEP) in the optical image capturing system are expressed in a similar way. The sum of ETP1 to ETP4 described above is expressed as SETP. The embodiments of the present invention may satisfy the following relationship: 0.3≤SETP/EIN≤0.8.

In order to achieve a balance between enhancing the capability of aberration correction and reducing the difficulty for manufacturing, the ratio relationship (ETP/TP) between the thickness (ETP) of the lens at the height of ½ entrance pupil diameter (HEP) and the thickness (TP) of the lens on the optical axis needs to be controlled in particular. For example, the thickness of the first lens at the height of ½ entrance pupil diameter (HEP) may be expressed as ETP1. The thickness of the first lens on the optical axis may be expressed as TP1. The ratio between ETP1 and TP1 may be expressed as ETP1/TP1. The thickness of the second lens at the height of ½ entrance pupil diameter (HEP) may be expressed as ETP2. The thickness of the second lens on the optical axis may be expressed as TP2. The ratio between ETP2 and TP2 may be expressed as ETP2/TP2. The ratio relationships between the thicknesses of other lenses at height of ½ entrance pupil diameter (HEP) and the thicknesses (TP) of the lens on the optical axis lens in the optical image capturing system are expressed in a similar way. The embodiments of the present invention may satisfy the following relationship: 0.5≤ETP/TP≤3.

The horizontal distance between two adjacent lenses at height of ½ entrance pupil diameter (HEP) may be expressed as ED. The horizontal distance (ED) described above is parallel to the optical axis of the optical image capturing system and particularly affects the corrected aberration of common area of each field of view of light and the capability of correcting the optical path difference between each field of view of light at the position of ½ entrance pupil diameter (HEP). The capability of correcting aberration increases when the horizontal distance becomes greater, but the difficulty of manufacturing is also increased and the degree of 'miniaturization' to the length of the optical image capturing system is restricted. Therefore, the horizontal distance (ED) between two specific adjacent lens at the height of ½ entrance pupil diameter (HEP) must be controlled.

In order to achieve a balance between enhancing the capability of correcting aberration and reducing the difficulty for minimization of the length of the optical image capturing system, the ratio relationship (ED/IN) of the horizontal distance (ED) between the two adjacent lenses at height of ½ entrance pupil diameter (HEP) to the horizontal distance (IN) between the two adjacent lenses on the optical axis particularly needs to be controlled. For example, the horizontal distance between the first lens and the second lens at height of ½ entrance pupil diameter (HEP) may be expressed as ED12. The horizontal distance on the optical axis between the first lens and the second lens may be expressed as IN12. The ratio between ED12 and IN12 may be expressed as ED12/IN12. The horizontal distance between the second lens and the third lens at height of ½ entrance pupil diameter (HEP) may be expressed as ED23. The horizontal distance on the optical axis between the second lens and the third lens may be expressed as IN23. The ratio between ED23 and IN23 may be expressed as ED23/IN23. The ratio relationships of the horizontal distances between other two adjacent lenses in the optical image capturing system at height of ½ entrance pupil diameter (HEP) to the horizontal distances on the optical axis between the two adjacent lenses are expressed in a similar way.

The horizontal distance parallel to the optical axis from a coordinate point on the image side of the fourth lens at height ½ HEP to the image plane may be expressed as EBL. The horizontal distance parallel to the optical axis from an intersection point, where the image side of the fourth lens crosses the optical axis to the image plane may be expressed as BL. The embodiments of the present invention are able to achieve a balance between enhancing the capability of aberration correction and reserving space to accommodate other optical s and the following condition may be satisfied: 0.2≤EBL/BL≤1.1. The optical image capturing system may further include a light filtering element. The light filtering is located between the fourth lens and the image plane. The distance parallel to the optical axis from a coordinate point on the image side of the fourth lens at height of ½ HEP to the light filtering may be expressed as EIR. The distance parallel to the optical axis from an intersection point, where the image side of the fourth lens crosses the optical axis to the light filtering is expressed as PIR. The embodiments of the present invention may satisfy the following condition: 0.2≤EIR/PIR≤0.8.

The optical image capturing system described above may be used to collocate with the image-sensing device whose diagonal length is shorter than 1/1.2 inches to form an image. Preferably, the size of the image-sensing device is 1/2.3 inches. The pixel size of the image-sensing device is smaller than 1.4 micrometers (μm). Preferably, the pixel size of the image-sensing device is smaller than 1.12 micrometers (μm). The best pixel size of the image-sensing device is smaller than 0.9 micrometers (μm). Furthermore, the optical image capturing system is applicable to the image-sensing device with an aspect ratio of 16:9.

The optical image capturing system described above is applicable to the demand of video recording with more than millions or tens of millions of pixels (e.g. 4K and 2K videos or the so-called UHD and QHD) and is endowed with a good image quality.

The height of optical image capturing system (HOS) may be reduced to achieve the minimization of the optical image capturing system when the absolute value of f1 is larger than f4 (|f1|>f4).

When |f2|+|f3|>|f1|+|f4|, at least one lens among the second lens to the third lens may have a weak positive refractive power or a weak negative refractive power. The weak refractive power indicates that an absolute value of the focal length of a specific lens is greater than 10. When at least one lens among the second lens to the third lens has the weak positive refractive power, the positive refractive power of the first lens can be shared, such that the unnecessary aberration will not appear too early. On the contrary, when at least one lens among the second lens to the third lens has the weak negative refractive power, the aberration of the optical image capturing system can be corrected and fine-tuned.

The fourth lens may have positive refractive power. Moreover, at least one surface of the fourth lens may possess at least one inflection point, which is capable of effectively reducing the incident angle of the off-axis rays and may further correct the off-axis aberration.

BRIEF DESCRIPTION OF THE DRAWINGS

The structure, operating principle and effects of the present invention will be described in detail by way of various embodiments illustrated in the accompanying drawings.

DETAILED DESCRIPTION OF THE PREFERRED EMBODIMENTS

Figure 1A:
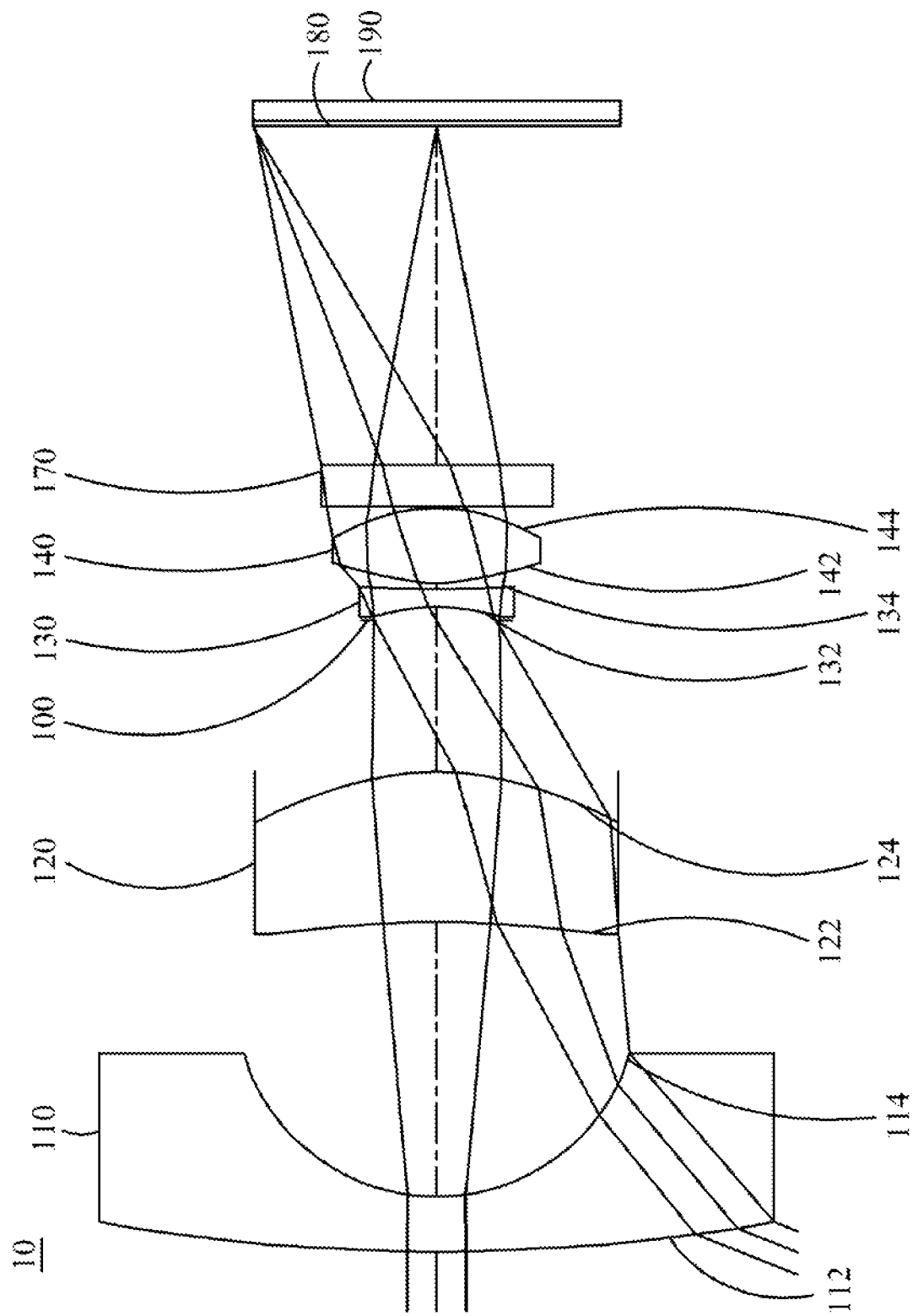
FIG. 1A is a schematic view of an optical image capturing system of the first embodiment of the present invention.

An optical image capturing system is provided, which includes, in the order from the object side to the image side, a first lens, a second lens, a third lens, a fourth lens with refractive power and an image plane. The optical image capturing system may further include an image-sensing device, which is disposed on the image plane.

The optical image capturing system may use three sets of operation wavelengths, which are 486.1 nm, 587.5 nm and 656.2 nm, respectively, and 587.5 nm serves as the primary reference wavelength and is a reference wavelength to obtain technical features of the optical system. The optical image capturing system may also use five sets of wavelengths, which are 470 nm, 510 nm, 555 nm, 610 nm and 650 nm, respectively, and 555 nm serves as the primary reference wavelength and is a reference wavelength to obtain technical features of the optical system.

The ratio of the focal length f of the optical image capturing system to a focal length fp of each lens with positive refractive power is PPR. The ratio of the focal length f of the optical image capturing system to a focal length fn of each lens with negative refractive power is NPR. The sum of the PPR of all lenses with positive refractive power is ΣPPR. The sum of the NPR of all lenses with negative refractive power is ΣNPR. The total refractive power and the total length of the optical image capturing system can be controlled easily when the following condition is satisfied: 0.5 ΣPPR/|ΣNPR|≤4.5; preferably, the following condition is satisfied: 0.9≤ΣPPR/|ΣNPR|≤3.5.

The height of the optical image capturing system is expressed as HOS. When the value of HOS/f is approximately one, the configuration is beneficial for manufacturing the minimized optical image capturing system with high pixel for image formation.

The sum of the fp of all lenses with positive refractive power of the optical image capturing system is ΣPP. The sum of the fp of all lenses with negative refractive power of the optical image capturing system is ΣNP. In one embodiment of the optical image capturing system, the following conditions are satisfied: 0<ΣPP≤200 and f4/ΣPP≤0.85; preferably, the following conditions are satisfied: 0<ΣPP≤150 and 0.01≤f4/ΣPP≤0.7. Hereby, it is favorable for controlling the ability of focusing for the optical image capturing system and for distributing appropriately the positive refractive power of the optical image capturing system such that an observable aberration is suppressed to occur too early.

The optical image capturing system may further include an image-sensing device disposed on the image plane. The half diagonal of the effective detection field of the image-sensing device (image formation height or the maximum image height of the optical image capturing system) may be expressed as HOI. The distance on the optical axis from the object side of the first lens to the image plane may be expressed as HOS. The following conditions are satisfied: HOS/HOI≤15 and 0.5≤HOS/f≤20.0. Preferably, the following conditions may be satisfied: 1≤HOS/HOI≤10 and 1≤HOS/f≤15. Hereby, this configuration can keep the miniaturization of the optical image capturing system to collocate with a light and thin portable electronic product.

In addition, in the optical image capturing system of the present invention, according to different requirements, at least one aperture may be arranged to reduce stray light and help elevate the image quality.

In the optical image capturing system of the invention, the aperture may be a front or middle aperture. Wherein, the front aperture is the aperture between a photographed object and the first lens while the middle aperture is the aperture between the first lens and the image plane. In the case that the aperture is the front aperture, it can make the optical image capturing system generate a longer distance between the exit pupil and the image plane, such that the optical image capturing system can accommodate more optical elements and the efficiency of the image-sensing device in receiving image can be increased. In the case that the aperture is the middle aperture, it can expand the angle of view of the optical image capturing system, such that the optical image capturing system has the advantage of the camera lens with wide angle. The distance from the foregoing aperture to the image plane may be expressed as InS. The following condition is satisfied: 0.2≤InS/HOS≤1.1. Preferably, the following condition may be satisfied: 0.4≤InS/HOS≤1. Therefore, the optical image capturing system can be kept miniaturized and have a feature of wide angle of view.

In the optical image capturing system of the present invention, the distance from the object side of the first lens to the image side of the fourth lens may be expressed as InTL. The sum of thicknesses of all lenses with refractive power on the optical axis may be expressed as ΣTP. The following condition is satisfied: 0.2≤ΣTP/InTL≤0.95. Preferably, the following conditions may be satisfied: 0.2≤ΣTP/InTL≤0.9. Hereby, this configuration can keep the contrast ratio of the optical image capturing system and the yield rate about manufacturing lens at the same time, and provide the proper back focal length so as to accommodate other elements.

The curvature radius of the object side of the first lens is R1. The curvature radius of the image side of the first lens is R2. The following condition is satisfied: 0.01≤|R1/R2|≤100. Preferably, the following condition is satisfied: 0.01≤|R1/R2|≤60.

The curvature radius of the object side of the fourth lens is R7. The curvature radius of the image side of the fourth lens is R8. The following condition is satisfied: −200<(R7−R8)/(R7+R8)<30. Hereby, this configuration is beneficial for correcting the astigmatism generated by the optical image capturing system.

The distance between the first lens and the second lens on the optical axis is IN12, and the following condition is satisfied: 0<IN12/f≤5.0. Preferably, the following condition is satisfied: 0.01≤IN12/f≤4.0. Thereby, this configuration is helpful to improve the chromatic aberration of the lens in order to elevate the performance of the optical image capturing system.

The distance between the second lens and the third lens on the optical axis is IN23, and the following condition is satisfied: 0<IN23/f≤5.0. Preferably, the following condition is satisfied: 0.01≤IN23/f≤3.0. Thereby, this configuration is helpful to improve the performance of the optical image capturing system.

The distance between the third lens and the fourth lens on the optical axis is IN34, and the following condition is satisfied: 0<IN34/f≤5.0. Preferably, the following condition is satisfied: 0.001≤IN34/f≤3.0. Thereby, this configuration is helpful to improve the performance of the optical image capturing system.

The central thicknesses of the first lens and the second lens on the optical axis are respectively TP1 and TP2, and the following condition is satisfied: 1≤(TP1+IN12)/TP2≤20. With this configuration, the sensitivity of the optical image capturing system can be controlled, and performance of the optical image capturing system can be improved.

The central thicknesses of the third lens and the fourth lens on the optical axis are respectively TP3 and TP4. The distance between the third lens and the fourth lens on the optical axis is IN34, and the following condition is satisfied: 0.2≤(TP4+IN34)/TP4≤20. With this configuration, the sensitivity of the optical image capturing system can be controlled and the total height of the optical image capturing system can be reduced.

The distance between the second lens and the third lens on the optical axis is IN23, and the sum of central thicknesses of the first lens through the fourth lens on the optical axis is ΣTP, and the following condition is satisfied: 0.01≤IN23/(TP2+IN23+TP3)≤0.9. Preferably, the following condition is satisfied: 0.05≤IN23/(TP2+IN23+TP3)≤0.7. With this configuration, the aberration generated when the incident light is travelling inside the optical system can be corrected slightly layer upon layer, and the total height of the optical image capturing system can be reduced.

In the optical image capturing system of the present invention, the horizontal distance parallel to the optical axis, which is measured from the intersection point where the object side of the fourth lens crosses the optical axis to the terminal point of the maximum effective half diameter on the object side of the fourth lens, may be expressed as InRS41. (When the horizontal distance is toward the image side, InRS41 is positive values. When the horizontal distance is toward the object side, InRS41 is a negative value.) The horizontal distance parallel to the optical axis, which is measured from the intersection point where the image side of the fourth lens crosses the optical axis to the terminal point of the maximum effective half diameter on the image side of the fourth lens, may be expressed as InRS42. The central thickness of the fourth lens is TP4. The following conditions are satisfied: −1 mm≤InRS41≤1 mm, −1 mm≤InRS42≤1 mm, 1 mm≤|InRS41|+|InRS42|≤2 mm, 0.01≤|InRS41|/TP4≤10, 0.01≤|InRS42|/TP4≤10. Hereby, the control of the position of the maximum effective half diameter between the object side and the image side of the fourth lens is favorable for correcting aberration for peripheral field of view of the optical image capturing system and effectively keeping miniaturization of the optical image capturing system.

In the optical image capturing system of the present invention, the horizontal distance parallel to the optical axis from an inflection point on the object side of the fourth lens that is the first nearest to the optical axis to an intersection point where the object side of the fourth lens crosses the optical axis may be expressed as SGI411. The horizontal distance in parallel with the optical axis from an inflection point on the image side of the fourth lens that is the first nearest to the optical axis to an intersection point where the image side of the fourth lens crosses the optical axis may be expressed as SGI421. The following conditions are satisfied: 0<SGI411/(SGI411+TP4)≤0.9 and 0<SGI421/(SGI421+TP4)≤0.9. Preferably, the following conditions are satisfied: 0.01<SGI411/(SGI411+TP4)≤0.7 and 0.01<SGI421/(SGI421+TP4)≤0.7.

In the optical image capturing system of the present invention, the horizontal distance parallel to the optical axis from an inflection point on the object side of the fourth lens that is the second nearest to the optical axis to an intersection point where the object side of the fourth lens crosses the optical axis may be expressed as SGI412. The horizontal distance in parallel with the optical axis from an inflection point on the image side of the fourth lens that is the second nearest to the optical axis to an intersection point where the image side of the fourth lens crosses the optical axis may be expressed as SGI422. The following conditions are satisfied: 0<SGI412/(SGI412+TP4)≤0.9 and 0<SGI422/(SGI422+TP4)≤0.9. Preferably, the following conditions are satisfied: 0.1≤SGI412/(SGI412+TP4)≤0.8 and 0.1≤SGI422/(SGI422+TP4)≤0.8.

The perpendicular distance between the inflection point on the object side of the fourth lens that is the first nearest to the optical axis and the optical axis may be expressed as HIF411. The perpendicular distance between an intersection point where the image side of the fourth lens crosses the optical axis and an inflection point on the image side of the fourth lens that is the first nearest to the optical axis may be expressed as HIF421. The following conditions are satisfied: 0.01≤HIF411/HOI≤0.9, and 0.01≤HIF421/HOI≤0.9. Preferably, the following conditions are satisfied: 0.09≤HIF411/HOI≤0.5 and 0.09≤HIF421/HOI≤0.5.

The perpendicular distance between the inflection point on the object side of the fourth lens that is the second nearest to the optical axis and the optical axis may be expressed as HIF412. The perpendicular distance between an intersection point where the image side of the fourth lens crosses the optical axis and an inflection point on the image side of the fourth lens that is the second nearest to the optical axis may be expressed as HIF422. The following conditions are satisfied: 0.01≤HIF412/HOI≤0.9, and 0.01≤HIF422/HOI≤0.9. Preferably, the following conditions are satisfied: 0.09≤HIF412/HOI≤0.8 and 0.09≤HIF422/HOI≤0.8.

The perpendicular distance between the inflection point on the object side of the fourth lens that is the third nearest to the optical axis and the optical axis may be expressed as HIF413. The perpendicular distance between an intersection point where the image side of the fourth lens crosses the optical axis and an inflection point on the image side of the fourth lens that is the third nearest to the optical axis may be expressed as HIF423. The following conditions are satisfied: 0.001 mm≤|HIF413|≤5 mm, and 0.001 mm≤|HIF423 |≤5 mm. Preferably, the following conditions are satisfied: 0.1 mm≤|HIF423 |≤3.5 mm and 0.1 mm≤|HIF413 |≤3.5 mm.

The perpendicular distance between the inflection point on the object side of the fourth lens that is the fourth nearest to the optical axis and the optical axis may be expressed as HIF414. The perpendicular distance between an intersection point where the image side of the fourth lens crosses the optical axis and an inflection point on the image side of the fourth lens that is the fourth nearest to the optical axis may be expressed as HIF424. The following conditions are satisfied: 0.001 mm≤|HIF414|≤5 mm, and 0.001 mm≤|HIF424 |≤5 mm. Preferably, the following conditions are satisfied: 0.1 mm≤|HIF424 |≤3.5 mm and 0.1 mm≤|HIF414 |≤3.5 mm.

In one embodiment of the optical image capturing system of the present invention, the chromatic aberration of the optical image capturing system can be corrected by alternatively arranging the lenses with large coefficient of dispersion and small coefficient of dispersion, and the chromatic aberration of the optical image capturing system can be corrected.

The equation for the aforementioned aspheric surface is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \quad (1)$$

where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

In the optical image capturing system provided by the present invention, the lens may be made of glass or plastic. If the lens is made of plastic, it can reduce the manufacturing cost as well as the weight of the lens effectively. If lens is made of glass, it can control the heat effect and increase the design space of the configuration of the lens with refractive power in the optical image capturing system. Besides, the object side and the image side of the first lens through fourth lens may be aspheric, which can gain more control variables and even reduce the number of the used lenses in contrast to traditional glass lens in addition to the use of reducing the aberration. Thus, the total height of the optical image capturing system can be reduced effectively.

Furthermore, in the optical image capturing system provided by the present invention, when the surface of lens is a convex surface, the surface of that lens is a convex surface in the vicinity of the optical axis in principle. When the surface of lens is a concave surface, the surface of that lens is a concave surface in the vicinity of the optical axis in principle.

In addition, in the optical image capturing system of the present invention, according to different requirements, at least one aperture may be arranged for reducing stray light and improving the imaging quality.

The optical image capturing system of the present invention can be applied to the optical image capturing system with automatic focus based on the demand and have the characteristics of good aberration correction and good image quality. Thereby, the optical image capturing system can expand the application aspect.

The optical image capturing system of the present invention may include a driving module upon demand, the driving module couples with the four lenses to displace the lenses. The driving module described above may be the voice coil motor (VCM) which is applied to move the lens to focus, or may be the optical image stabilization (OIS) which is applied to reduce the frequency the optical system is out of focus owing to the vibration of the lens during photo or video shooting.

At least one lens of the first lens, the second lens, the third lens and the fourth lens may be a light filtering element for light with wavelength of less than 500 nm, depending on the design requirements. The light filtering element may be made by coating film on at least one surface of that lens with certain filtering function, or forming that lens with material that can filter light with short wavelength.

According to the above embodiments, the specific embodiments with figures are presented in detail as below.

The First Embodiment

Figure 1B:
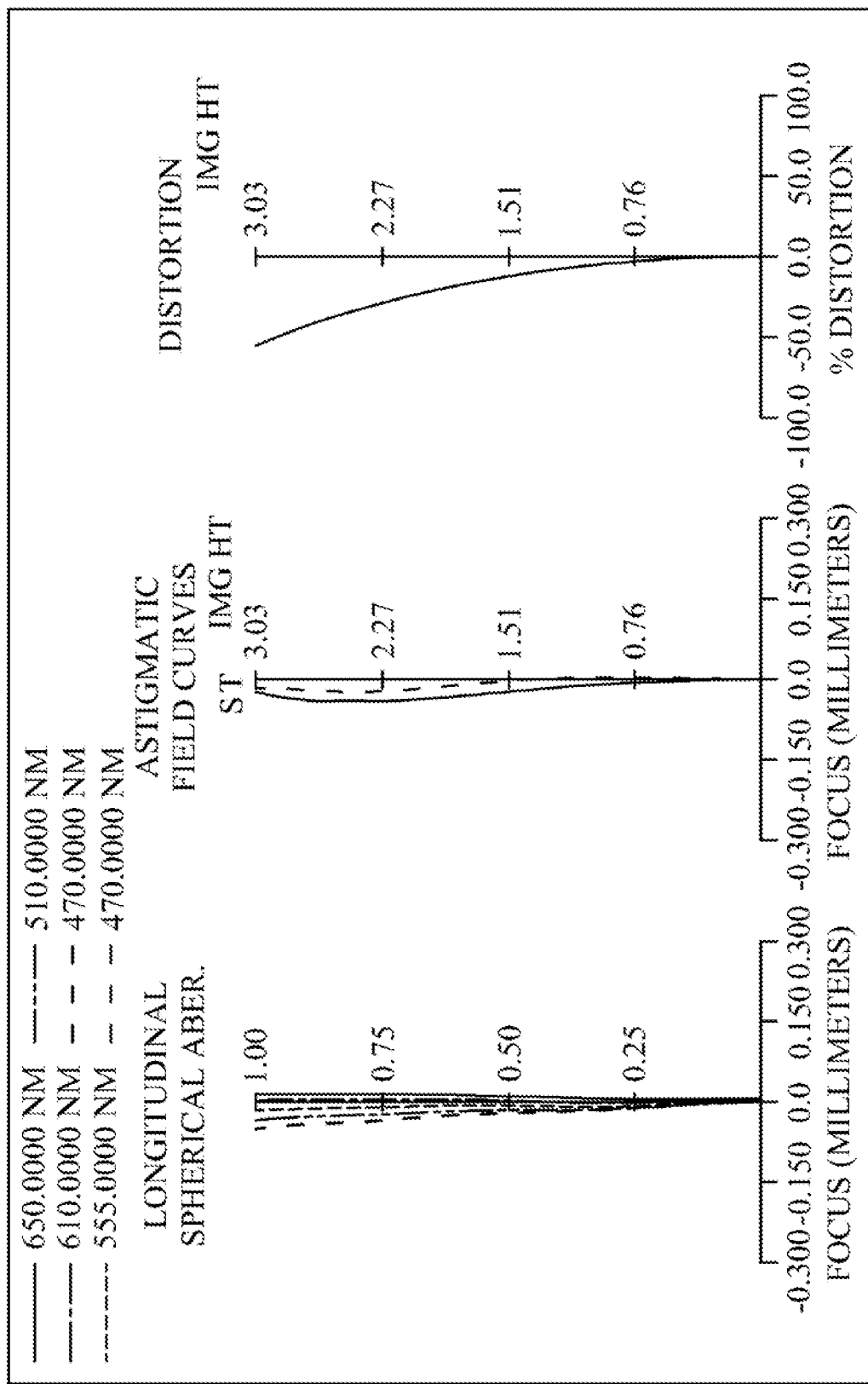
FIG. 1B shows curve diagrams of longitudinal spherical aberration, astigmatic field, and optical distortion of the optical image capturing system in the order from left to right of the first embodiment of the present invention.
Figure 1C:
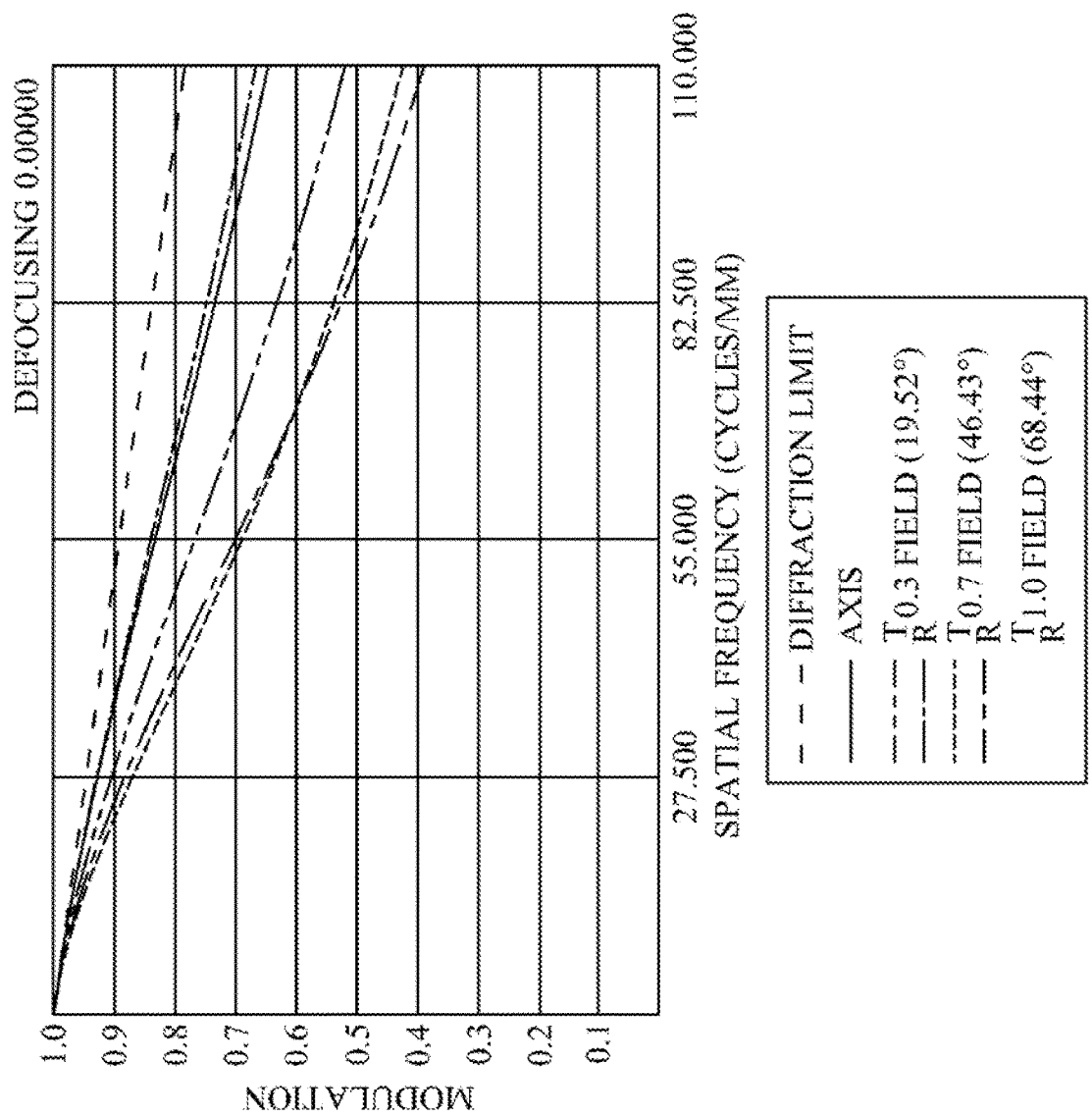
FIG. 1C is a characteristic diagram of modulation transfer of visible light spectrum for the optical image capturing system according to the first embodiment of the present invention.
Figure 1D:
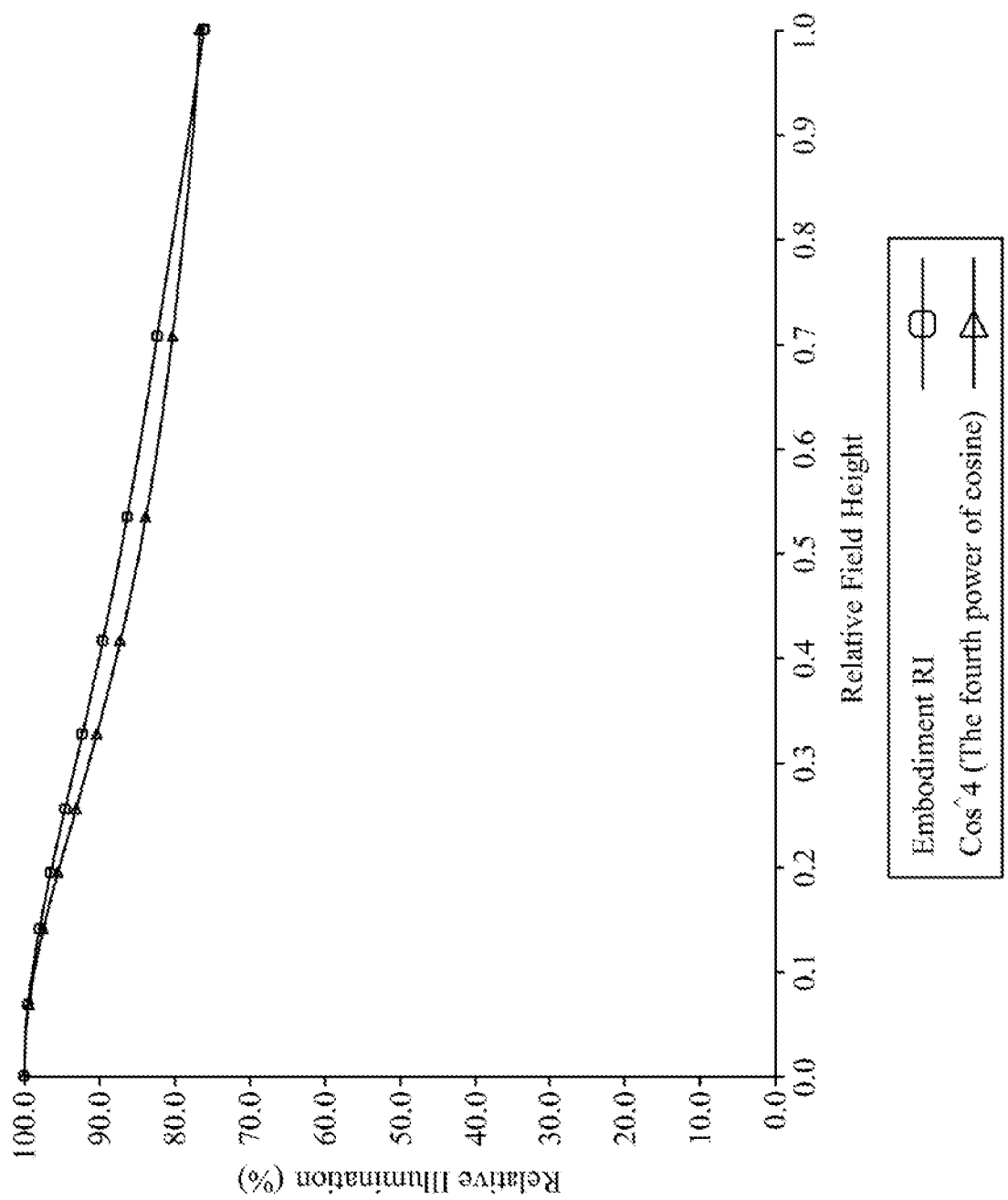
FIG. 1D is a numerical diagram of relative illumination at each field of view on the image plane for an optical image capturing system of the first embodiment of the present invention.

Please refer to FIGS. 1A, 1B, 1C and 1D. FIG. 1A is a schematic view of an optical image capturing system of the first embodiment of the present invention. FIG. 1B shows the longitudinal spherical aberration curves, astigmatic field curves, and optical distortion curve of the optical image capturing system in the order from left to right according to the first embodiment of the present invention. FIG. 1C is a characteristic diagram of modulation transfer of visible light spectrum for the optical image capturing system according to the first embodiment of the present invention. FIG. 1D is a numerical diagram of relative illumination at each field of view on the image plane for an optical image capturing system of the first embodiment of the present invention. As shown in FIG. 1A, in order along an optical axis from an object side to an image side, the optical image capturing system 10 comprises a first lens 110, a second lens 120, an aperture stop 100, a third lens 130, a fourth lens 140, an infrared filter 170, an image plane 180 and an image-sensing device 190.

The first lens 110 has negative refractive power and is made of a glass material. The first lens 110 has a convex object side 112 and the first lens 110 has a concave image side 114. Both of the object side 112 and the image side 114 of the first lens 110 are aspheric. The thickness of the first lens 110 on the optical axis is TP1. The thickness of the first lens 110 at the height of ½ entrance pupil diameter (HEP) may be expressed as ETP1.

The horizontal distance parallel to the optical axis from an inflection point on the object side 112 of the first lens 110 that is the nearest to the optical axis to the intersection point where the object side 112 of the first lens 110 crosses the optical axis may be expressed as SGI111. The horizontal distance parallel to the optical axis from an inflection point on the image side 114 of the first lens 110 that is the nearest to the optical axis to the intersection point where the image side 114 of the first lens 110 crosses the optical axis may be expressed as SGI121. The following conditions are satisfied: SGI111=0 mm, SGI121=0 mm, |SGI111|/(|SGI111|+TP1)=0 and |SGI121|/(|SGI121|+TP1)=0.

The perpendicular distance between the optical axis and the inflection point on the object side 112 of the first lens 110 that is the nearest to the optical axis is expressed as HIF111. The perpendicular distance between the optical axis and the inflection point on the image side 114 of the first lens 110 that is the nearest to the optical axis may be expressed as HIF121. The following conditions are satisfied: HIF111=0 mm, HIF121=0 mm, HIF111/HOI=0, HIF121/HOI=0.

The second lens 120 has positive refractive power and is made of plastic. An object side 122 of the second lens 120 is a concave surface and an image side 124 of the second lens 120 is a convex surface. Both of the object side 122 and the image side 124 of the second lens 120 are aspheric. The object side 122 of the second lens 120 has one inflection point. The thickness of the second lens 120 on the optical axis is TP2. The thickness of the second lens 120 at the height of ½ entrance pupil diameter (HEP) may be expressed as ETP2.

The horizontal distance parallel to the optical axis from an inflection point on the object side 122 of the second lens 120 that is the nearest to the optical axis to an intersection point where the object side 122 of the second lens 120 crosses the optical axis may be expressed as SGI211. The horizontal distance parallel to the optical axis from an inflection point on the image side 124 of the second lens 120 that is the nearest to the optical axis to the intersection point where the image side 124 of the second lens 120 crosses the optical axis is expressed as SGI221. The following conditions are satisfied: SGI211=−0.13283 mm and SGI211/(SGI211+TP2)=0.05045.

The perpendicular distance between the inflection point on the object side 122 of the second lens 120 that is the nearest to the optical axis and the optical axis may be expressed as HIF211. The perpendicular distance between the inflection point on the image side 124 of the second lens 120 that is the nearest to the optical axis and the optical axis may be expressed as HIF221. The following conditions are satisfied: HIF211=2.10379 mm and HIF211/HOI=0.69478.

The third lens 130 has negative refractive power and is made of plastic. An object side 132 of the third lens 130 is a concave surface and an image side 134 of the third lens 130 is a concave surface. Both of the object side 132 and the image side 134 of the third lens 130 are aspheric. The image side 134 of the third lens 130 has one inflection point. The thickness of the third lens 130 on the optical axis is TP3. The thickness of the third lens 130 at the height of ½ entrance pupil diameter (HEP) may be expressed as ETP3.

The horizontal distance parallel to the optical axis from an inflection point on the object side 132 of the third lens 130 that is the nearest to the optical axis to an intersection point where the object side 132 of the third lens 130 crosses the optical axis may be expressed as SGI311. The horizontal distance parallel to the optical axis from an inflection point on the image side 134 of the third lens 130 that is the nearest to the optical axis to the intersection point where the image side 134 of the third lens 130 crosses the optical axis may be expressed as SGI321. The following conditions are satisfied: SGI321=0.01218 mm and |SGI321|/(|SGI321|+TP3)=0.03902.

The perpendicular distance between the inflection point on the object side 132 of the third lens 130 that is the nearest to the optical axis and the optical axis may be expressed as HIF311. The perpendicular distance between the inflection point on the image side 134 of the third lens 130 that is the nearest to the optical axis and the optical axis is expressed as HIF321. The following conditions are satisfied: HIF321=0.84373 mm and HIF321/HOI=0.27864.

The fourth lens 140 has positive refractive power and is made of plastic. An object side 142 of the fourth lens 140 is a convex surface and an image side 144 of the fourth lens 140 is a convex surface. Both of the object side 142 and the image side 144 of the fourth lens 140 are aspheric. The image side 144 of the fourth lens 140 has one inflection point. The thickness of the fourth lens 140 on the optical axis is TP4. The thickness of the fourth lens 140 at the height of ½ entrance pupil diameter (HEP) may be expressed as ETP4.

The horizontal distance parallel to the optical axis from an inflection point on the object side 142 of the fourth lens 140 that is the first nearest to the optical axis to an intersection point where the object side 142 of the fourth lens 140 crosses the optical axis may be expressed as SGI411. The horizontal distance parallel to the optical axis from an inflection point on the image side 144 of the fourth lens 140 that is the first nearest to the optical axis to the intersection point where the image side 144 of the fourth lens 140 crosses the optical axis may be expressed as SGI421. The following conditions are satisfied: SGI411=0 mm, SGI421=−0.41627 mm, |SGI411|/(|SGI411|+TP4)=0 and |SGI421|/(|SGI421|+TP4)=0.25015.

The horizontal distance parallel to the optical axis from an inflection point on the object side 142 of the fourth lens 140 that is the second nearest to the optical axis to an intersection point where the object side 142 of the fourth lens 140 crosses the optical axis may be expressed as SGI412. The following conditions are satisfied: SGI412=0 mm and |SGI412|/(|SGI412|+TP4)=0.

The perpendicular distance between the inflection point on the object side 142 of the forth lens 140 that is the first nearest to the optical axis and the optical axis may be expressed as HIF411. The perpendicular distance between the inflection point on the image side 144 of the fourth lens 140 that is the first nearest to the optical axis and the optical axis may be expressed as HIF421. The following conditions are satisfied: HIF411=0 mm, HIF421=1.55079 mm, HIF411/HOI=0 and HIF421/HOI=0.51215.

The perpendicular distance between the inflection point on the object side 142 of the fourth lens 140 that is the second nearest to the optical axis and the optical axis may be expressed as HIF412. The following conditions are satisfied: HIF412=0 mm and HIF412/HOI=0.

The distance parallel to the optical axis between the coordinate point of the object side 112 of the first lens 110 at a height of ½ HEP and the image plane 180 may be expressed as ETL. The distance parallel to the optical axis between the coordinate point of the object side 112 of the first lens 110 at a height of ½ HEP and the coordinate point of the image side 144 of the fourth lens 140 at a height of ½ HEP may be expressed as EIN. The following conditions may be satisfied: ETL=18.744 mm, EIN=12.339 mm and EIN/ETL=0.658.

The first embodiment meets the following conditions: ETP1=0.949 mm; ETP2=2.483 mm; ETP3=0.345 mm; ETP4=1.168 mm. The sum of ETP1 to ETP4 described above is expressed as SETP; SETP=4.945 mm. TP1=0.918 mm; TP2=2.500 mm; TP3=0.300 mm; TP4=1.248 mm; the sum of TP1 to TP4 described above is expressed as STP; STP=4.966 mm; and SETP/STP=0.996.

The first embodiment particularly controls the ratio relationship (ETP/TP) between the thickness (ETP) of each lens at a height of ½ entrance pupil diameter (HEP) and the thickness (TP) of the lens to which the surface belongs on the optical axis in order to achieve a balance between manufacturability and capability of aberration correction. The following relationships may be satisfied: ETP1/TP1=1.034, ETP2/TP2=0.993, ETP3/TP3=1.148 and ETP4/TP4=0.936.

The first embodiment controls the horizontal distance between each two adjacent lenses at a height of ½ entrance pupil diameter (HEP) to achieve a balance between the degree of miniaturization for the length of the optical image capturing system HOS, the manufacturability and the capability of aberration correction. The ratio relationship (ED/IN) of the horizontal distance (ED) between the two adjacent lens at the height of ½ entrance pupil diameter (HEP) to the horizontal distance (IN) on the optical axis between the two adjacent lens is particularly controlled. The following relationships are satisfied: the horizontal distance parallel to the optical axis between the first lens 110 and the second lens 120 at a height of ½ entrance pupil diameter (HEP) may be expressed as ED12=4.529 mm. The horizontal distance parallel to the optical axis between the second lens 120 and the third lens 130 at a height of ½ entrance pupil diameter (HEP) may be expressed as ED23=2.735 mm. The horizontal distance parallel to the optical axis between the third lens 130 and the fourth lens 140 at a height of ½ entrance pupil diameter (HEP) may be expressed as ED34=0.131 mm.

The horizontal distance on the optical axis between the first lens 110 and the second lens 120 may be expressed as IN12=4.571 mm and ED12/IN12=0.991. The horizontal distance on the optical axis between the second lens 120 and the third lens 130 may be expressed as IN23=2.752 mm and ED23/IN23=0.994. The horizontal distance on the optical axis between the third lens 130 and the fourth lens 140 may be expressed as IN34=0.094 mm and ED34/IN34=1.387.

The horizontal distance parallel to the optical axis between a coordinate point on the image side 144 of the fourth lens 140 at the height of ½ HEP and the image plane 180 may be expressed as EBL=6.405 mm. The horizontal distance parallel to the optical axis between an intersection point where the image side 144 of the fourth lens 140 crosses the optical axis and the image plane 180 may be expressed as BL=6.3642 mm. The embodiment of the present invention may meet the following relationship: EBL/BL=1.00641. In the first embodiment, the distance parallel to the optical axis between the coordinate point on the image side 144 of the fourth lens 140 at the height of ½ HEP and the infrared filter 170 may be expressed as EIR=0.065 mm. The distance parallel to the optical axis between the intersection point where the image side 144 of the fourth lens 140 crosses the optical axis and the infrared filter 170 may be expressed as PIR=0.025 mm. The following relationship is satisfied: EIR/PIR=2.631.

The infrared filter 170 is made of glass. The infrared filter 170 is disposed between the fourth lens 140 and the image plane 180, and does not affect the focal length of the optical image capturing system 10.

In the optical image capturing system 10 of the first embodiment, the focal length of the optical image capturing system 10 may be expressed as f. The entrance pupil diameter of the optical image capturing system 10 may be expressed as HEP. A half maximum angle of view of the optical image capturing system 10 may be expressed as HAF. The detailed parameters are shown as below: f=2.6841 mm, f/HEP=2.7959, HAF=70 deg. and tan(HAF)=2.7475.

In the optical image capturing system 10 of the first embodiment, the focal length of the first lens 110 may be expressed as f1. The focal length of the fourth lens 140 may be expressed as f4. The following conditions are satisfied: f1=−5.4534 mm, f/f1 |=0.4922, f4=2.7595 mm and |f1/f4 |=1.9762.

In the optical image capturing system 10 of the first embodiment, focal lengths of the second lens 120 to the third lens 130 may be respectively expressed as f2 and f3. The following conditions are satisfied: |f2|+|f3|=13.2561 mm, |f1|+|f4|=8.2129 mm and |f2|+|f3|>|f1|+|f4|.

The ratio of the focal length f of the optical image capturing system 10 to the focal length fp of each of lenses with positive refractive power may be expressed as PPR. The ratio of the focal length f of the optical image capturing system 10 to a focal length fn of each of lenses with negative refractive power may be expressed as NPR. In the optical image capturing system 10 of the first embodiment, the sum of the PPR of all lenses with positive refractive power is ΣPPR=|f/f2|+|f/f4|=1.25394. The sum of the NPR of all lenses with negative refractive power is $\Sigma NPR=|f/f1|+|f/f2|=1.21490$, $\Sigma PPR/|\Sigma NPR|=1.03213$. Simultaneously, the following conditions are also satisfied: $|f/f1|=0.49218$, $|f/f2|=0.28128$, $|f/f3|=0.72273$, $|f/f4|=0.97267$.

In the optical image capturing system 10 of the first embodiment, the distance from the object side 112 of the first lens 110 to the image side 144 of the fourth lens 140 may be expressed as InTL. The distance from the object side 112 of the first lens 110 to the image plane 180 may be expressed as HOS. The distance from the aperture 100 to the image plane 180 may be expressed as InS. A half diagonal length of the effective detection field of the image-sensing device 190 may be expressed as HOI. The distance from the image side 144 of the fourth lens 140 to the image plane 180 may be expressed as InB. The following conditions are satisfied: InTL+InB=HOS, HOS=18.74760 mm, HOI=3.088 mm, HOS/HOI=6.19141, HOS/f=6.9848, InTL/HOS=0.6605, InS=8.2310 mm and InS/HOS=0.4390.

In the optical image capturing system 10 of the first embodiment, a total thickness of all lenses with refractive power on the optical axis may be expressed as $\Sigma TP$. The following conditions are satisfied: $\Sigma TP=4.9656$ mm and $\Sigma TP/InTL=0.4010$. Hereby, this configuration can keep the contrast ratio of the optical image capturing system and the yield rate about manufacturing lens at the same time, and provide the proper back focal length to accommodate other elements.

In the optical image capturing system 10 of the first embodiment, the curvature radius of the object side 112 of the first lens 110 may be expressed as R1. The curvature radius of the image side 114 of the first lens 110 may be expressed as R2. The following condition is satisfied: $|R1/R2|=9.6100$. Hereby, the first lens 110 has a suitable magnitude of positive refractive power to prevent the longitudinal spherical aberration from increasing too fast.

In the optical image capturing system 10 of the first embodiment, the curvature radius of the object side 142 of the fourth lens 140 may be expressed as R7. The curvature radius of the image side 144 of the fourth lens 140 may be expressed as R8. The following condition is satisfied: $(R7-R8)/(R7+R8)=-35.5932$. Hereby, this configuration is beneficial for correcting the astigmatism generated by the optical image capturing system.

In the optical image capturing system 10 of the first embodiment, the sum of focal lengths of all lenses with positive refractive power may be expressed as $\Sigma PP$. The following conditions are satisfied: $\Sigma PP=12.30183$ mm and $f4/\Sigma PP=0.22432$. Hereby, this configuration is helpful to distribute the positive refractive power of the fourth lens 140 to other lenses with positive refractive power in an appropriate way to suppress the generation of noticeable aberrations in the propagating process of the incident light in the optical image capturing system 10.

In the optical image capturing system 10 of the first embodiment, the sum of focal lengths of all lenses with negative refractive power may be expressed as $\Sigma NP$. The following conditions are satisfied: $\Sigma NP=-14.6405$ mm and $f1/\Sigma NP=0.59488$. Hereby, this configuration is helpful to distribute the negative refractive power of the fourth lens to other lenses with negative refractive power in an appropriate way to suppress the generation of noticeable aberrations in the propagating process of the incident light in the optical image capturing system 10.

In the optical image capturing system 10 of the first embodiment, the distance on the optical axis between the first lens 110 and the second lens 120 may be expressed as IN12. The following conditions are satisfied: IN12=4.5709 mm and IN12/f=1.70299. Therefore, this configuration is helpful to improve the chromatic aberration of the lens in order to elevate the performance of the optical image capturing system 10 of the first embodiment.

In the optical image capturing system 10 of the first embodiment, the distance on the optical axis between the second lens 120 and the third lens 130 may be expressed as IN23. The following conditions are satisfied: IN23=2.7524 mm and IN23/f=1.02548. Therefore, this configuration is helpful to improve the chromatic aberration of the lens in order to elevate the performance of the optical image capturing system 10 of the first embodiment.

In the optical image capturing system 10 of the first embodiment, the distance on the optical axis between the third lens 130 and the fourth lens 140 may be expressed as IN34. The following conditions are satisfied: IN34=0.0944 mm and IN34/f=0.03517. Therefore, this configuration is helpful to improve the chromatic aberration of the lens in order to elevate the performance of the optical image capturing system 10 of the first embodiment.

In the optical image capturing system 10 of the first embodiment, the thicknesses of the first lens 110 and the second lens 120 on the optical axis may be expressed respectively as TP1 and TP2. The following conditions are satisfied: TP1=0.9179 mm, TP2=2.5000 mm, TP1/TP2=0.36715 and (TP1+IN12)/TP2=2.19552. Therefore, this configuration is helpful to control the sensitivity generated by the optical image capturing system 10 and elevate the performance of the optical image capturing system 10 of the first embodiment.

In the optical image capturing system 10 of the first embodiment, the thicknesses of the third lens 130 and the fourth lens 140 on the optical axis may respectively be expressed as TP3 and TP4 and the distance between the aforementioned two lenses on the optical axis is IN34. The following conditions are satisfied: TP3=0.3 mm, TP4=1.2478 mm, TP3/TP4=0.24043 and (TP4+IN34)/TP3=4.47393. Therefore, this configuration is helpful to control the sensitivity generated by the optical image capturing system 10 and elevate the performance of the optical image capturing system 10 of the first embodiment.

In the optical image capturing system 10 of the first embodiment, the following conditions are satisfied: IN23/(TP2+IN23+TP3)=0.49572. Therefore, this configuration is helpful to slightly correct the aberration of the propagating process of the incident light layer by layer and decrease the total height of the optical image capturing system.

In the optical image capturing system 10 of the first embodiment, the horizontal distance parallel to the optical axis from a maximum effective diameter position on the object side 142 of the fourth lens 140 to the intersection point where the object side 142 of the fourth lens 140 crosses the optical axis may be expressed as InRS41. The horizontal distance parallel to the optical axis from a maximum effective diameter position on the image side 144 of the fourth lens 140 to an intersection point where the image side 144 of the fourth lens 140 crosses the optical axis may be expressed as InRS42. The thickness of the fourth lens 140 on the optical axis may be expressed as TP4. The following conditions are satisfied: InRS41=0.2955 mm, InRS42=-0.4940 mm, |InRS41|+|InRS42|=0.7894 mm, |InRS41|/TP4=0.23679, and |InRS42|/TP4=0.39590. Hereby, the configuration is favorable to the manufacturing and forming of the lens and maintaining the minimization for the optical image capturing system 10.

In the optical image capturing system 10 of the first embodiment, the perpendicular distance between a critical point C41 on the object side 142 of the fourth lens 140 and the optical axis may be expressed as HVT41. The perpendicular distance between a critical point C42 on the image side 144 of the fourth lens 140 and the optical axis may be expressed as HVT42. The following conditions are satisfied: HVT41=0 mm, HVT42=0 mm.

In the optical image capturing system 10 of the first embodiment, the following condition is satisfied: HVT42/HOI=0.

In the optical image capturing system 10 of the first embodiment, the following condition is satisfied: HVT42/HOS=0.

In the optical image capturing system 10 of the first embodiment, the coefficient of dispersion of the first lens 110 may be expressed as NA1. The coefficient of dispersion of the second lens 120 may be expressed as NA2. The coefficient of dispersion of the third lens 130 may be expressed as NA3. The coefficient of dispersion of the fourth lens 140 may be expressed as NA4. The following condition is satisfied: |NA1−NA2|=0.0351. Hereby, this configuration is helpful to correct the chromatic aberration of the optical image capturing system.

In the optical image capturing system 10 of the first embodiment, TV distortion and optical distortion for image formation in the optical image capturing system 10 may be respectively expressed as TDT and ODT. The following conditions are satisfied: TDT=37.4846% and ODT=−55.3331%.

In the optical image capturing system 10 of the present embodiment, the modulation transfer rates (values of MTF) for the visible light at the quarter spatial frequency of 110 cycles/mm at positions of the optical axis, 0.3 HOI and 0.7 HOI on the image plane 180 are respectively denoted as MTFQ0, MTFQ3 and MTFQ7. The following conditions are satisfied: MTFQ0 is about 0.65, MTFQ3 is about 0.52 and MTFQ7 is about 0.42. The modulation transfer rates (values of MTF) for the visible light at the spatial frequency of 55 cycles/mm at positions of the optical axis, 0.3 HOI and 0.7 HOI on the image plane 180 are denoted as MTFE0, MTFE3 and MTFE7 respectively. The following conditions are satisfied: MTFE0 is about 0.84, MTFE3 is about 0.76 and MTFE7 is about 0.69. In the optical image capturing system 10 of the present embodiment, when the operation wavelength 850 nm focuses on image plane 180, the modulation transfer rates (MTF values) with the spatial frequency of 55 cycles/mm where the images are at the optical axis, 0.3 field of view and 0.7 field of view are respectively expressed as MTFI0, MTFI3 and MTFI7. The following conditions are satisfied: MTFI0 is about 0.83, MTFI3 is about 0.79 and MTFI7 is about 0.65.

Please refer to FIG. 1D. FIG. 1D is a numerical diagram of relative illumination at each field of view on the image plane for an optical image capturing system of the first embodiment of the present invention. The relative illumination of the optical axis (0.0 field of view), 0.1 field of view, 0.2 field of view, 0.3 field of view, 0.4 field of view, 0.5 field of view, 0.6 field of view, 0.7 field of view, 0.8 field of view, 0.9 field of view and 1.0 field of view are respectively denoted by RI1, RI12, RI13, RI14, RI15, RI6, RI17, RI18, RI19 and RI10, wherein the relative illumination of 0.9 field of view RI9 is appropriately 80%.

Figure 7:
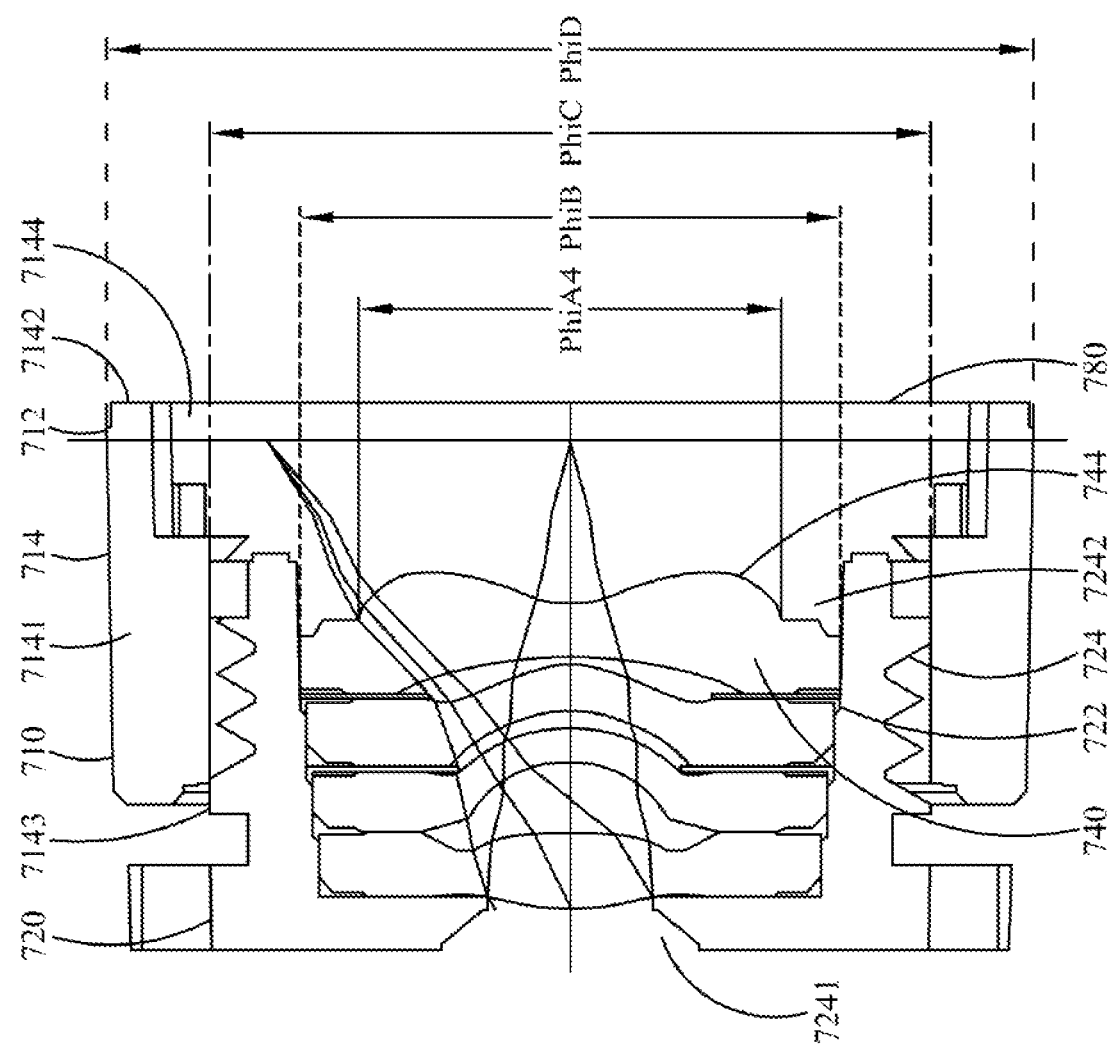
FIG. 7 is schematic view showing maximum effective diameter PhiA4 of image side of the fourth lens, maximum diameter PhiB of the image side of the fourth lens, a maximum value PhiD of the minimum side length of the basement of the first positioning element on the plane perpendicular to the optical axis, and the maximum outer diameter PhiC of the connecting part of the second positioning element on the plane perpendicular to the optical axis.

Please refer to FIG. 7. The optical image capturing system 10 of this embodiment may include an image-sensing module (not shown in FIG. 7), and the image-sensing module includes a substrate and a photosensitive element disposed on the substrate. The optical image capturing system may include a first positioning element 710. The first positioning element 710 comprises a base 712 and a holder 714. The base 712 has an open accommodation space formed on the substrate to accommodate the photosensitive element. The holder 714 is in a hollow shape and opaque. Optionally, the holder 714 can be formed integrally. The holder 714 has a cylinder 7141 and a basement 7142. The holder 714 has a first through hole 7143 and a second through hole 7144 formed on the two opposite ends, respectively. The first through hole 7143 is connected with the cylinder 7141. The second through hole 7144 is connected with the basement 7142. The maximum value of the minimum side length of the basement 7142 on the plane perpendicular to the optical axis is expressed as PhiD, and PhiD=3.3 millimeter.

The optical image capturing system of this embodiment includes a second positioning element 720. The second positioning element 720 is accommodated in the holder 714 of the first positioning element 710, and comprises a positioning part 722 and a connecting part 724. The positioning part 722 is in a hollow shape and has a third through hole 7241 and a fourth through hole 7242 formed on the two opposite ends on the optical axis. The third through hole 7241 is connected with the positioning part 722, and the fourth through hole 7242 is connected with the basement 7142. The positioning part 722 directly contacts with any one of the lenses of this embodiment and generates the positioning effect of accommodating the lens and arranging the lens on the optical axis. The connecting part 724 is disposed outside the positioning part 722 and can directly combine with the cylinder 7141, so that the second positioning element 720 can be accommodated in the holder 714 of the first positioning element 710. The optical image capturing system has function of adjusting and positioning the focal length in optical axis direction. The maximum outer diameter of the connecting part 724 on the plane perpendicular to the optical axis is expressed as PhiC, and PhiC=2.85 mm. The maximum diameter of the inner hole of the fourth through hole 7242 is expressed as Phi4. The connecting part 724 may possess the thread and make the second positioning element 720 be engaged with the holder 714 of the first positioning element 710.

Any one of lenses of this embodiment can be indirectly disposed in the first positioning element 710 by the second positioning element 720, and disposed closer to the third through hole 7241 than the image-sensing device, and face the image-sensing device.

In this embodiment, the lens nearest to the image plane 780 is the fourth lens 740, a maximum effective diameter of the image side 744 of the fourth lens 740 is expressed as PhiA4, and the following condition is satisfied: PhiA4=a double of EHD42=1.767 mm. The image side 744 of the fourth lens 740 is aspheric. Cutoff points of the maximum effective diameter include cutoff points of the aspheric surface. The ineffective half diameter (IHD) of image side 744 of the fourth lens 740 is a surface section extended from the cutoff points of the maximum effective half diameter of the same surface in a direction away from the optical axis. In this embodiment, the lens which is the nearest to the image plane 780 is the fourth lens 140. The maximum diameter of the image side 744 of the fourth lens 740 is expressed as PhiB, and the following condition is satisfied: PhiB=a double of (a maximum EHD 42+a maximum IHD)=PhiA4+a double of a (maximum IHD)=2.167 mm.

In this embodiment, the maximum effective diameter of the image side 744 of the fourth lens 740 which is the nearest to the image plane 780 (that is, the image space), also called optical exit pupil, is expressed as PhiA4. The pupil magnification ratio of the optical image capturing system is expressed as PMR. The following condition is satisfied: PMR=PhiA4/HEP=1.84337. A ratio to pupil and image is expressed as PMMR, and the following condition is satisfied: PMMR=PhiA4/ImgH=0.58355. A condensed ratio is expressed as PSMR, and the following condition is satisfied: PSMR=PhiA4/InTL=0.14269.

Table 1 and Table 2 below should be incorporated into the reference of the first embodiment.

TABLE 1

Lens Parameter for the First Embodiment
f(focal length) = 2.6841 mm; f/HEP = 2.7959;
HAF(half angle of view) = 70 deg; tan(HAF) = 2.7475

| Surface No. | | Curvature Radius | Thickness (mm) | Material |
|---|---|---|---|---|
| 0 | Object | Plane | Infinity | |
| 1 | First Lens | 31.98102785 | 0.918 | Glass |
| 2 | | 3.327880578 | 4.571 | |
| 3 | Second Lens | −15.2556818 | 2.500 | Plastic |
| 4 | | −4.681543531 | 2.528 | |
| 5 | Aperture | Plane | 0.225 | |
| 6 | Third Lens | −2.453543123 | 0.300 | Plastic |
| 7 | | 127.8664454 | 0.094 | |
| 8 | Fourth Lens | 2.697747363 | 1.248 | Plastic |
| 9 | | −2.853715061 | 0.725 | |
| 10 | Infrared filter | Plane | 2.000 | BK7_SCHOTT |
| 11 | | Plane | 3.640 | |
| 12 | Image Plane | Plane | | |

| Surface No. | Refractive Index | Coefficient of Dispersion | Focal Length |
|---|---|---|---|
| 0 | | | |
| 1 | 1.688 | 50.26 | −5.453 |
| 2 | | | |
| 3 | 1.642 | 22.46 | 9.542 |
| 4 | | | |
| 5 | | | |
| 6 | 1.642 | 22.46 | −3.714 |
| 7 | | | |
| 8 | 1.544 | 56.09 | 2.759 |
| 9 | | | |
| 10 | 1.517 | 64.13 | |
| 11 | | | |
| 12 | | | |

Reference Wavelength = 555 nm. Shield Position: the 3rd surface with effective aperture radius = 3.0 mm

TABLE 2

Aspheric Coefficients of the First Embodiment
Aspheric Coefficients

| | Surface No. | | |
|---|---|---|---|
| | 3 | 4 | 6 |
| k | −2.918829E+01 | −3.214789E+00 | −1.504539E+01 |
| A4 | −9.004096E−04 | −9.725260E−06 | 8.890018E−05 |
| A6 | 2.391364E−04 | −8.096303E−05 | −1.166688E−02 |
| A8 | −2.421089E−05 | 7.787465E−07 | −5.720942E−04 |
| A10 | 1.716292E−06 | 3.517517E−07 | 8.305770E−04 |
| A12 | 0.000000E+00 | 0.000000E+00 | 0.000000E+00 |

| | Surface No. | | |
|---|---|---|---|
| | 7 | 8 | 9 |
| k | −2.970417E+01 | −1.613370E+01 | −1.145951E+00 |
| A4 | 3.634454E−02 | 9.587367E−03 | −4.742020E−03 |
| A6 | −3.060142E−02 | −3.693991E−03 | 1.232422E−03 |
| A8 | 8.833265E−03 | 8.653836E−04 | 3.333400E−04 |
| A10 | −1.362695E−03 | −7.093620E−05 | −2.583094E−06 |
| A12 | 0.000000E+00 | 0.000000E+00 | 0.000000E+00 |

Table 1 is the detailed structure data to the first embodiment in FIG. 1A, wherein the unit of the curvature radius, the thickness, the distance, and the focal length is millimeters (mm). Surfaces 0-12 illustrate the surfaces from the object side to the image plane in the optical image capturing system. Table 2 is the aspheric coefficients of the first embodiment, wherein k is the conic coefficient in the aspheric surface formula, and A1-A20 are the first to the twentieth order aspheric surface coefficient. Furthermore, the tables in the following embodiments are referenced to the schematic view and the aberration graphs, respectively, and definitions of parameters in the tables are equal to those in the Table 1 and the Table 2, so the repetitious details will not be given here.

The Second Embodiment

Figure 2A:
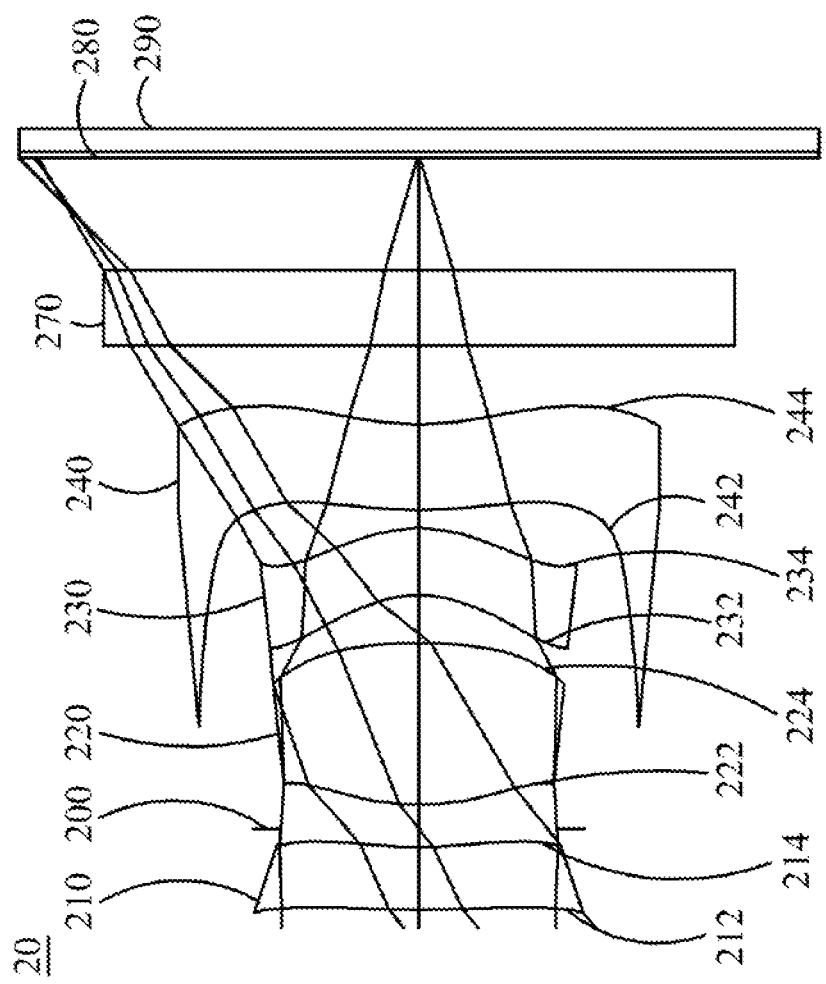
FIG. 2A is a schematic view of an optical image capturing system of the second embodiment of the present invention.
Figure 2B:
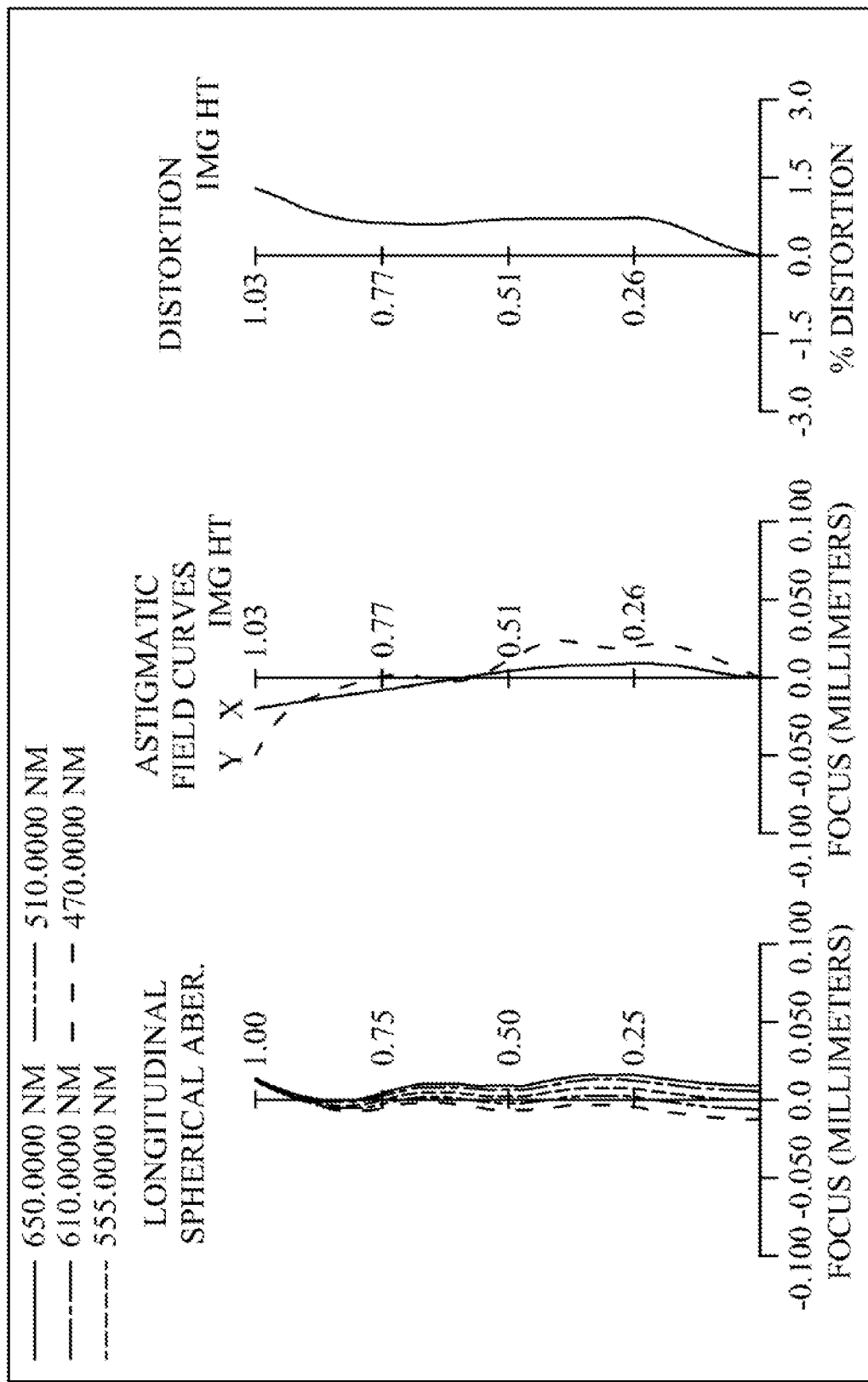
FIG. 2B shows curve diagrams of longitudinal spherical aberration, astigmatic field, and optical distortion of the optical image capturing system in the order from left to right of the second embodiment of the present invention.
Figure 2C:
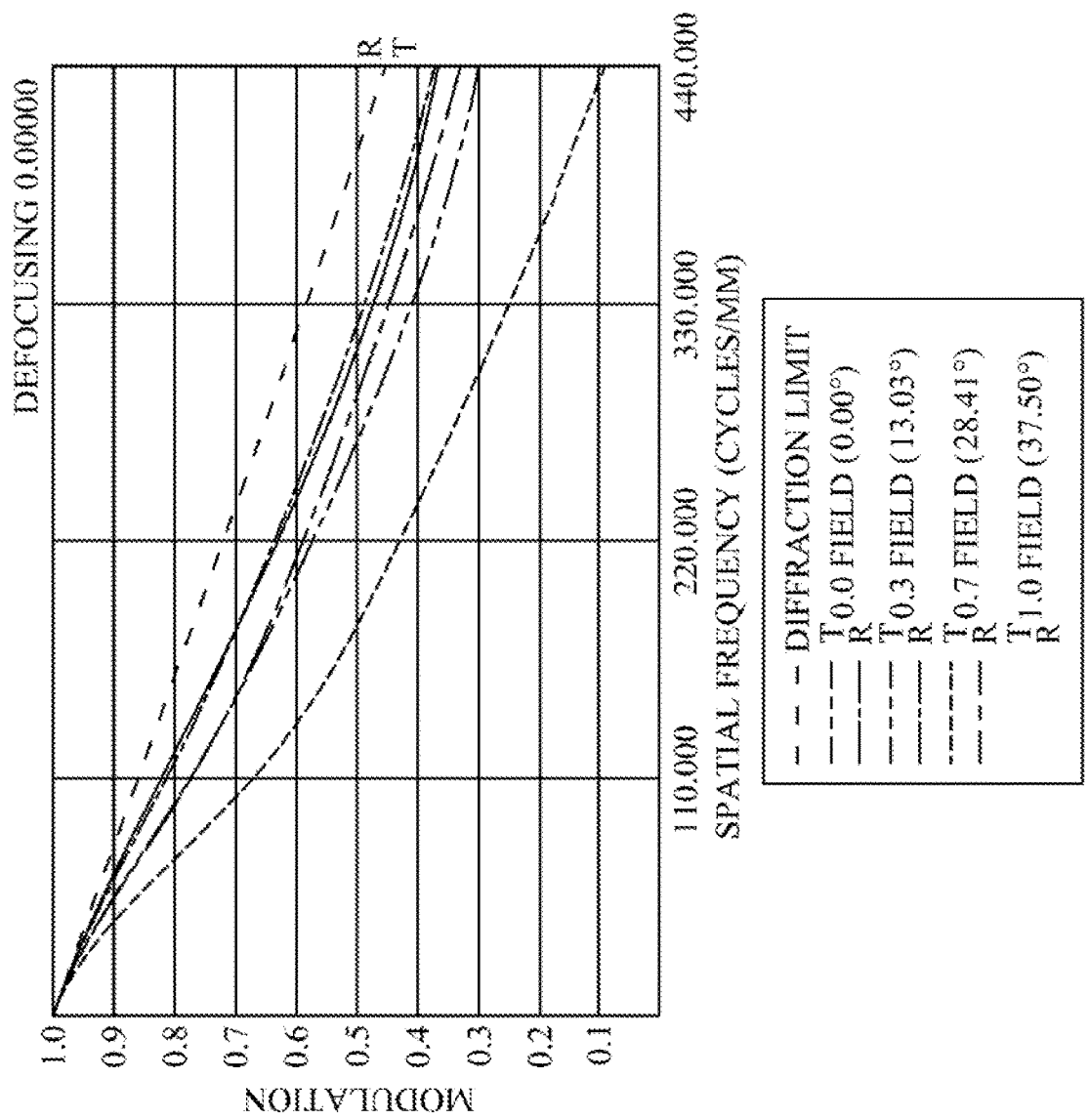
FIG. 2C is a characteristic diagram of modulation transfer of visible light spectrum for the optical image capturing system according to the second embodiment of the present invention.
Figure 2D:
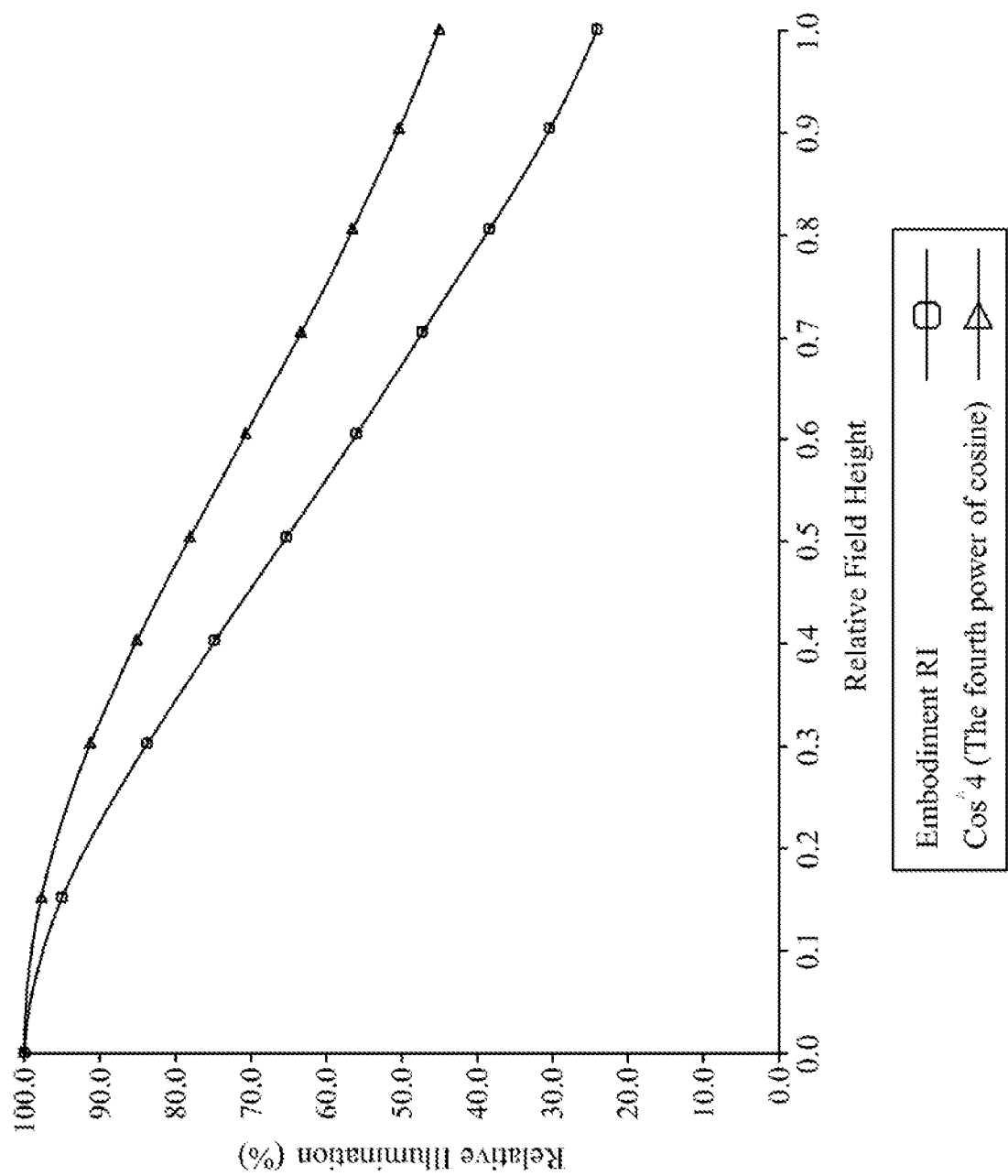
FIG. 2D is a numerical diagram of relative illumination at each field of view on the image plane for an optical image capturing system of the second embodiment of the present invention.

Please refer to FIGS. 2A, 2B, 2C and 2D. FIG. 2A is a schematic view of an optical image capturing system of the second embodiment of the present invention. FIG. 2B shows the longitudinal spherical aberration curves, astigmatic field curves, and optical distortion curve of the optical image capturing system in the order from left to right according to the second embodiment of the present invention. FIG. 2C is a characteristic diagram of modulation transfer of visible light spectrum for the optical image capturing system according to the second embodiment of the present invention. FIG. 2D is a numerical diagram of relative illumination at each field of view on the image plane for an optical image capturing system of the second embodiment of the present invention. As shown in FIG. 2A, in order along an optical axis from an object side to an image side, the optical image capturing system 20 comprises a first lens 210, an aperture stop 200 a second lens 220, a third lens 230, a fourth lens 240, an infrared filter 270, an image plane 280 and an image-sensing device 290.

The first lens 210 has negative refractive power and is made of plastic. An object side 212 of the first lens 210 is a convex surface and an image side 214 of the first lens 210 is a concave surface. Both of the object side 212 and the image side 214 of the first lens 210 are aspheric. Both of the object side 212 and the image side 214 of the first lens 210 has one inflection point.

The second lens 220 has positive refractive power and is made of plastic. An object side 222 of the second lens 220 is a convex surface and an image side 224 of the second lens 220 is a convex surface. Both of the object side 222 and the image side 224 of the second lens 220 are aspheric. The object side 222 of the second lens 220 has one inflection point.

The third lens 230 has positive refractive power and is made of plastic. An object side 232 of the third lens 230 is a concave surface and an image side 234 of the third lens 230 is a convex surface. Both of the object side 232 and the image side 234 of the third lens 230 are aspheric. Both of the object side 232 and the image side 234 of the third lens 230 has one inflection point.

The fourth lens 240 has negative refractive power and is made of plastic. An object side 242 of the fourth lens 240 is convex a surface and an image side 244 of the fourth lens 240 is a concave surface. Both of the object side 242 and the image side 244 of the fourth lens 240 are aspheric. Both of the object side 242 and the image side 244 of the fourth lens 240 has one inflection point.

The infrared filter 270 is made of glass. The infrared filter 270 is disposed between the fourth lens 240 and the image plane 280, and does not affect the focal length f of the optical image capturing system 20.

In the optical image capturing system 20 of the second embodiment, both of the second lens 220 and the third lens 230 have positive refractive power. The focal lengths of the second lens 220 and the third lens 230 are respectively expressed as f2 and f3. The sum of the fp of all lenses with positive refractive power of the optical image capturing system 20 is ΣPP, and the following condition is satisfied: ΣPP=f2+f3. Hereby, this configuration is helpful to distribute the positive refractive power of the single lens to other lenses with positive refractive power in an appropriate way to suppress the generation of noticeable aberrations in the propagating process of the incident light in the optical image capturing system 20.

In the optical image capturing system 20 of the second embodiment, a sum of the focal lengths of all lenses with negative refractive power is Σ NP, and the following condition is satisfied: ΣNP=f1+f3.

Please refer to the following Table 3 and Table 4.
The detailed data of the optical image capturing system 20 of the second Embodiment is as shown in Table 3.

TABLE 3

Lens Parameter for the Second Embodiment
f(focal length) = 1.323 mm; f/HEP = 1.8;
HAF(half angle of view) = 37.5 deg; tan(HAF) = 0.7673

| Surface No. | | Curvature Radius | Thickness (mm) | Material |
|---|---|---|---|---|
| 0 | Object | Plane | Infinity | |
| 1 | First Lens | 2.815155869 | 0.175 | Plastic |
| 2 | | 1.16843349 | 0.051 | |
| 3 | Aperture | Plane | 0.066 | |
| 4 | Second Lens | 0.599339272 | 0.450 | Plastic |
| 5 | | −1.411016917 | 0.133 | |
| 6 | Third Lens | −0.317760089 | 0.187 | Plastic |
| 7 | | −0.356324528 | 0.050 | |
| 8 | Fourth Lens | 1.400960481 | 0.238 | Plastic |
| 9 | | 0.686143826 | 0.219 | |
| 10 | Infrared filter | Plane | 0.210 | BK7_SCHOTT |
| 11 | | Plane | 0.31 | |
| 12 | Image Plane | Plane | | |

| Surface No. | Refractive Index | Coefficient of Dispersion | Focal Length |
|---|---|---|---|
| 0 | | | |
| 1 | 1.515 | 56.55 | −4.014 |
| 2 | | | |
| 3 | | | |
| 4 | 1.544 | 55.96 | 0.837 |
| 5 | | | |
| 6 | 1.642 | 22.46 | 5.004 |
| 7 | | | |
| 8 | 1.642 | 22.46 | −2.390 |
| 9 | | | |
| 10 | 1.517 | 64.13 | |
| 11 | | | |
| 12 | | | |

Reference Wavelength = 555 nm; Shield Position: the 1st surface with effective aperture radius = 0.43 mm; the 5th surface with effective aperture radius = 0.390 mm.

TABLE 4

Aspheric Coefficients of the Second Embodiment
Aspheric Coefficients

| | Surface No. | | | |
|---|---|---|---|---|
| | 1 | 2 | 4 | 5 |
| k | −2.100896E+01 | −3.117650E+01 | −6.594072E−01 | −5.749340E+00 |
| A4 | −1.034815E+00 | −1.247743E+00 | −2.144582E+00 | −5.564182E−01 |
| A6 | −1.467293E+01 | −3.933644E+01 | −2.397809E+01 | −5.601046E+01 |
| A8 | 4.846220E+02 | 1.049222E+03 | 1.466540E+03 | 7.715029E+02 |
| A10 | −7.102825E+03 | −1.234792E+04 | −4.393327E+04 | −8.580555E+03 |
| A12 | 5.884002E+04 | 5.356074E+04 | 7.002153E+05 | 6.735915E+04 |
| A14 | −2.820526E+05 | 1.558329E+05 | −6.248007E+06 | −2.902619E+05 |
| A16 | 7.245452E+05 | −2.134561E+06 | 2.912419E+07 | 5.267012E+05 |
| A18 | −7.701193E+05 | 5.176547E+06 | −5.535295E+07 | −1.326747E+05 |
| A20 | 1.874256E+01 | 0.000000E+00 | 0.000000E+00 | 0.000000E+00 |

| | Surface No. | | | |
|---|---|---|---|---|
| | 6 | 7 | 8 | 9 |
| k | −1.293538E+00 | −1.778968E+00 | −9.958872E−02 | −9.720777E+00 |
| A4 | 5.280891E+00 | 7.147752E+00 | 2.668792E+00 | −6.993487E−01 |
| A6 | −4.929357E+01 | −1.152802E+02 | −1.053723E+02 | −9.822777E+00 |
| A8 | −5.524670E+02 | 1.188148E+03 | 1.164018E+03 | 9.374187E+01 |
| A10 | 2.181848E+04 | −6.205622E+03 | −7.629138E+03 | −4.377047E+02 |
| A12 | −2.298819E+05 | 2.212051E+04 | 3.098893E+04 | 1.160682E+03 |
| A14 | 1.176507E+06 | −6.949962E+04 | −7.777603E+04 | −1.720966E+03 |
| A16 | −3.006163E+06 | 1.681686E+05 | 1.168351E+05 | 1.259258E+03 |
| A18 | 3.050941E+06 | −1.906600E+05 | −9.146103E+04 | −3.228384E+02 |
| A20 | 0.000000E+00 | 0.000000E+00 | 0.000000E+00 | 0.000000E+00 |

In the second embodiment, the presentation of the aspheric surface equation is similar to that in the first embodiment. Furthermore, the definitions of parameters in following tables are similar to those in the first embodiment, so the repetitive details will not be given here.

The following values for the conditions can be obtained from the data in Table 3 and Table 4.

| Second Embodiment (Primary Reference Wavelength = 555 nm) | | | | | |
|---|---|---|---|---|---|
| ETP1 | ETP2 | ETP3 | ETP4 | ED12/ED23 | SED |
| 0.178 | 0.299 | 0.223 | 0.269 | 1.948 | 0.426 |
| ETP1/TP1 | ETP2/TP2 | ETP3/TP3 | ETP4/TP4 | ED23/ED34 | SETP |
| 1.018 | 0.664 | 1.193 | 1.128 | 0.493 | 0.969 |
| ETL | EBL | EIN | EIR | PIR | STP |
| 2.085 | 0.691 | 1.395 | 0.171 | 0.219 | 1.050 |
| EIN/ETL | SETP/EIN | EIR/PIR | EBL/BL | BL | SETP/STP |
| 0.669 | 0.695 | 0.777 | 0.9344 | 0.7395 | 0.922 |
| ED12 | ED23 | ED34 | ED12/IN12 | ED23/IN23 | ED34/IN34 |
| 0.167 | 0.086 | 0.174 | 1.428 | 0.645 | 3.473 |
| InRS41 | InRS42 | HVT41 | HVT42 | ODT % | TDT % |
| −0.02448 | −0.00545 | 0.30907 | 0.42296 | 1.30002 | 0.70606 |
| $|f/f1|$ | $|f/f2|$ | $|f/f3|$ | $|f/f4|$ | $|f1/f2|$ | $|f2/f3|$ |
| 0.32944 | 1.58025 | 0.26432 | 0.55346 | 4.79676 | 0.16726 |
| ΣPPR | ΣNPR | ΣPPR/$|ΣNPR|$ | ΣPP | ΣNP | f1/ΣPP |
| 1.84456 | 0.88290 | 2.08922 | 5.84043 | −6.40396 | −0.68735 |
| f4/ΣNP | IN12/f | IN23/f | IN34/f | TP3/f | TP4/f |
| 0.37314 | 0.08827 | 0.10034 | 0.03781 | 0.14140 | 0.18018 |
| InTL | HOS | HOS/HOI | InS/HOS | InTL/HOS | ΣTP/InTL |
| 1.34974 | 2.08923 | 2.03232 | 0.89196 | 0.64605 | 0.77815 |
| (TP1 + IN12)/TP2 | (TP4 + IN34)/TP3 | TP1/TP2 | TP3/TP4 | IN23/(TP2 + IN23 + TP3) | |
| 0.64830 | 1.54164 | 0.38889 | 0.78476 | 0.17240 | |
| $|InRS41|$/TP4 | $|InRS42|$/TP4 | HVT42/HOI | HVT42/HOS | PhiA4/InTL | PhiA4/HOI |
| 0.1027 | 0.0229 | 0.4114 | 0.2024 | 1.0372 | 0.6809 |
| PhiA4 | PhiB | PhiC | PhiD | RI9 | PhiA4/HEP |
| 1.4 mm | 1.8 mm | 2.2 mm | 2.5 mm | 50% | 1.9055 |
| MTFE0 | MTFE3 | MTFE7 | MTFQ0 | MTFQ3 | MTFQ7 |
| 0.92 | 0.9 | 0.85 | 0.83 | 0.77 | 0.67 |

Values Related to Inflection Point of Second Embodiment
(Primary Reference Wavelength = 555 nm)

| | | | | | | | | |
|---|---|---|---|---|---|---|---|---|
| HIF111 | 0.1522 | HIF111/HOI | 0.1481 | SGI111 | 0.0034 | \|SGI111\|/(\|SGI111\| + TP1) | 0.0192 |
| HIF121 | 0.1456 | HIF121/HOI | 0.1417 | SGI121 | 0.0074 | \|SGI121\|/(\|SGI121\| + TP1) | 0.0408 |
| HIF211 | 0.2328 | HIF211/HOI | 0.2264 | SGI211 | 0.0389 | \|SGI211\|/(\|SGI211\| + TP2) | 0.0796 |
| HIF311 | 0.2617 | HIF311/HOI | 0.2546 | SGI311 | −0.0900 | \|SGI311\|/(\|SGI311\| + TP3) | 0.3249 |
| HIF321 | 0.2495 | HIF321/HOI | 0.2427 | SGI321 | −0.0673 | \|SGI321\|/(\|SGI321\| + TP3) | 0.2646 |
| HIF411 | 0.1827 | HIF411/HOI | 0.1778 | SGI411 | 0.0122 | \|SGI411\|/(\|SGI411\| + TP4) | 0.0486 |
| HIF421 | 0.2076 | HIF421/HOI | 0.2020 | SGI421 | 0.0250 | \|SGI421\|/(\|SGI421\| + TP4) | 0.0950 |

The following values for the conditions can be obtained from the data in Table 3 and Table 4.

The Third Embodiment

Figure 3A:
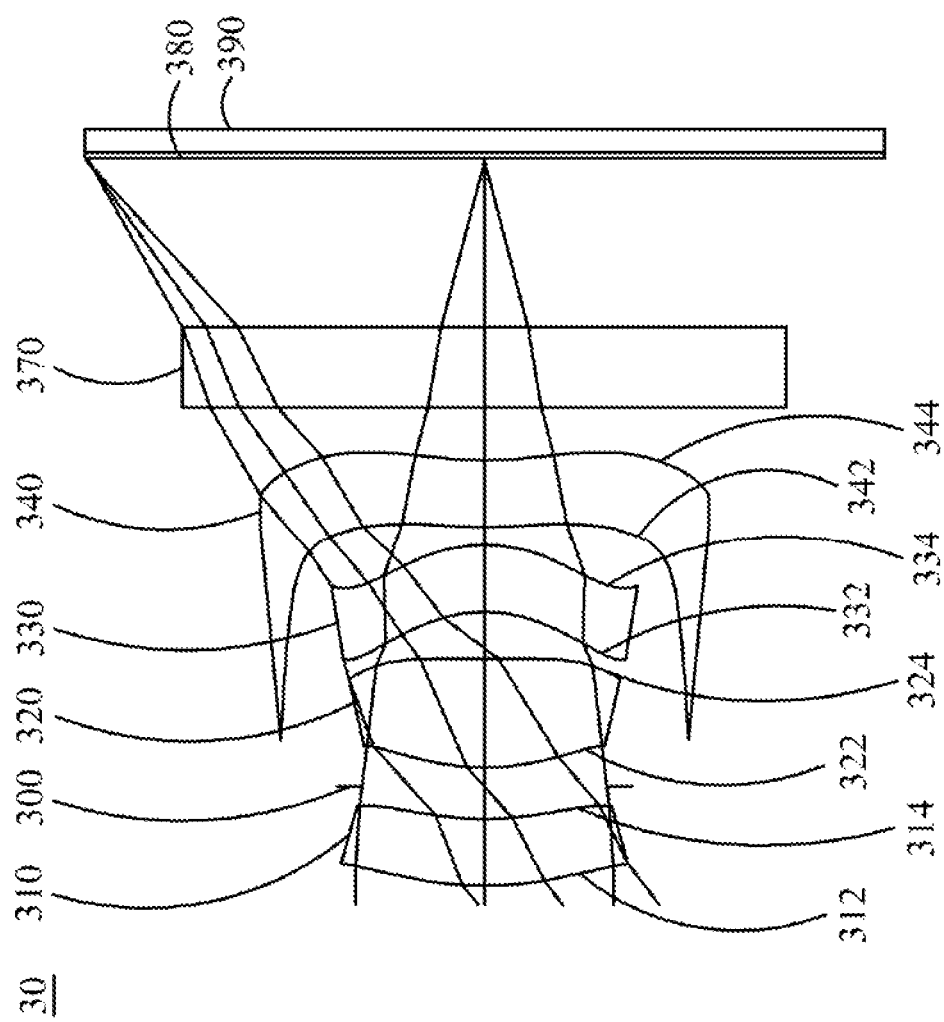
FIG. 3A is a schematic view of an optical image capturing system of the third embodiment of the present invention.
Figure 3B:
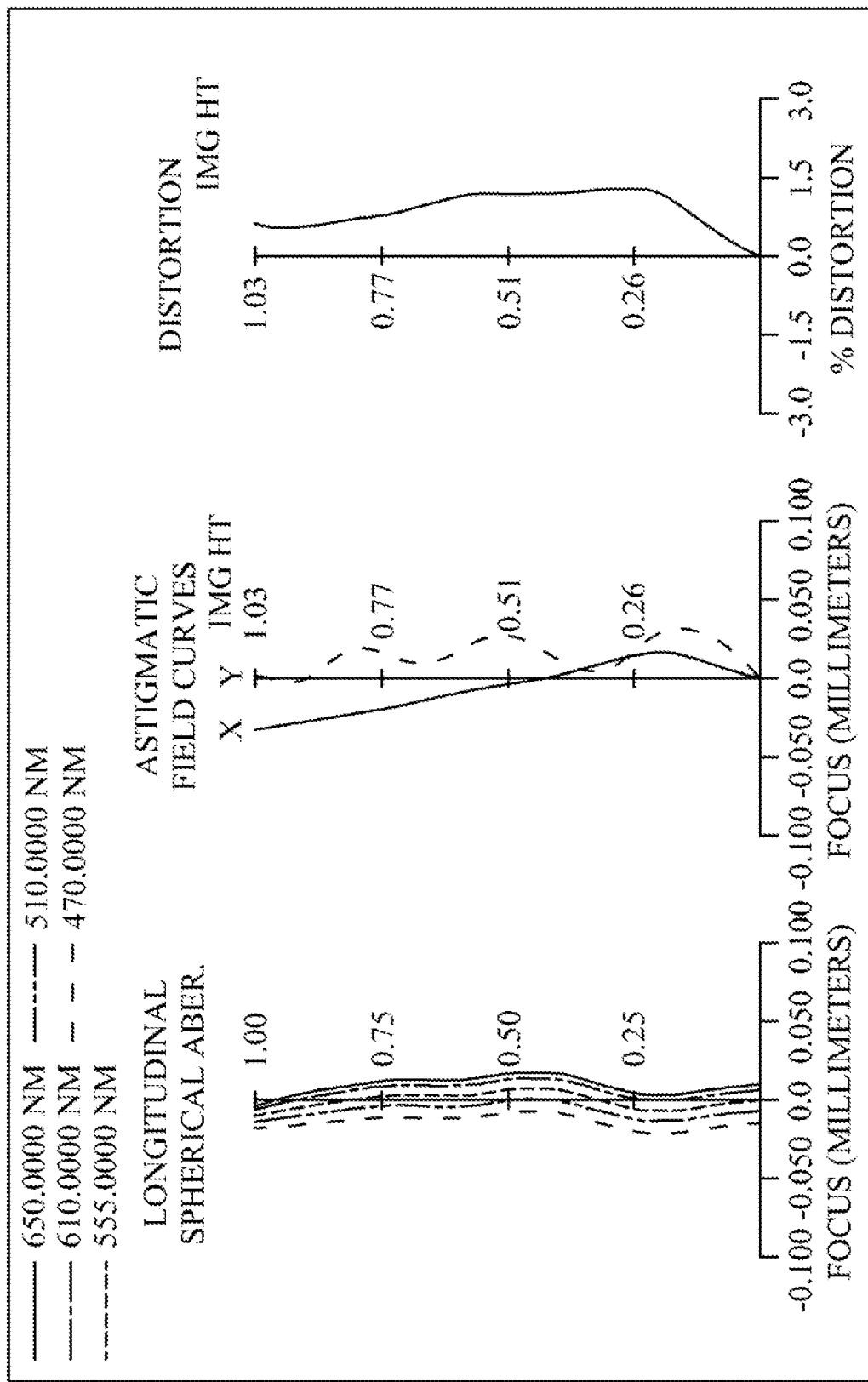
FIG. 3B shows curve diagrams of longitudinal spherical aberration, astigmatic field, and optical distortion of the optical image capturing system in the order from left to right of the third embodiment of the present invention.
Figure 3C:
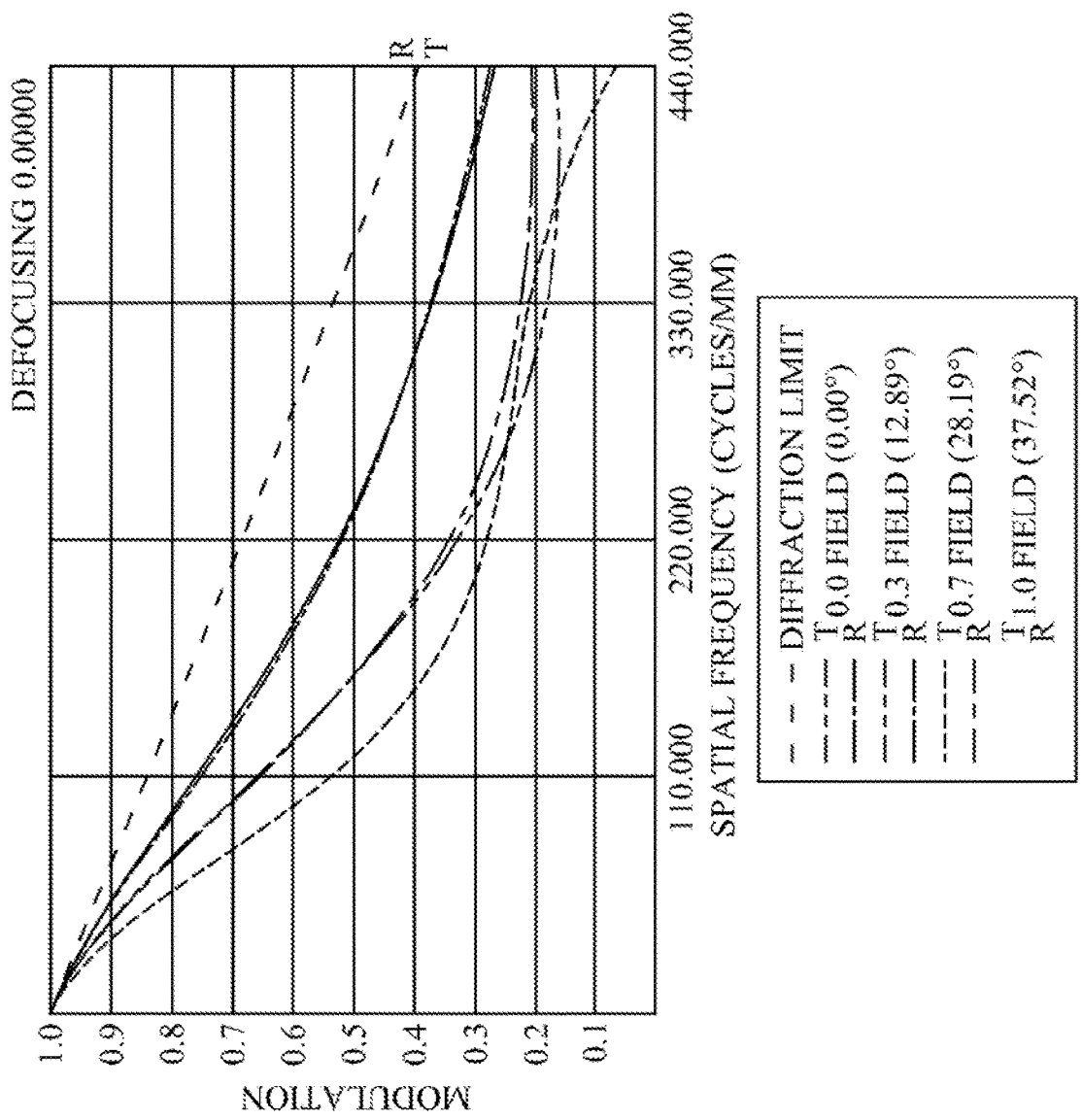
FIG. 3C is a characteristic diagram of modulation transfer of visible light spectrum for the optical image capturing system according to the third embodiment of the present invention.
Figure 3D:
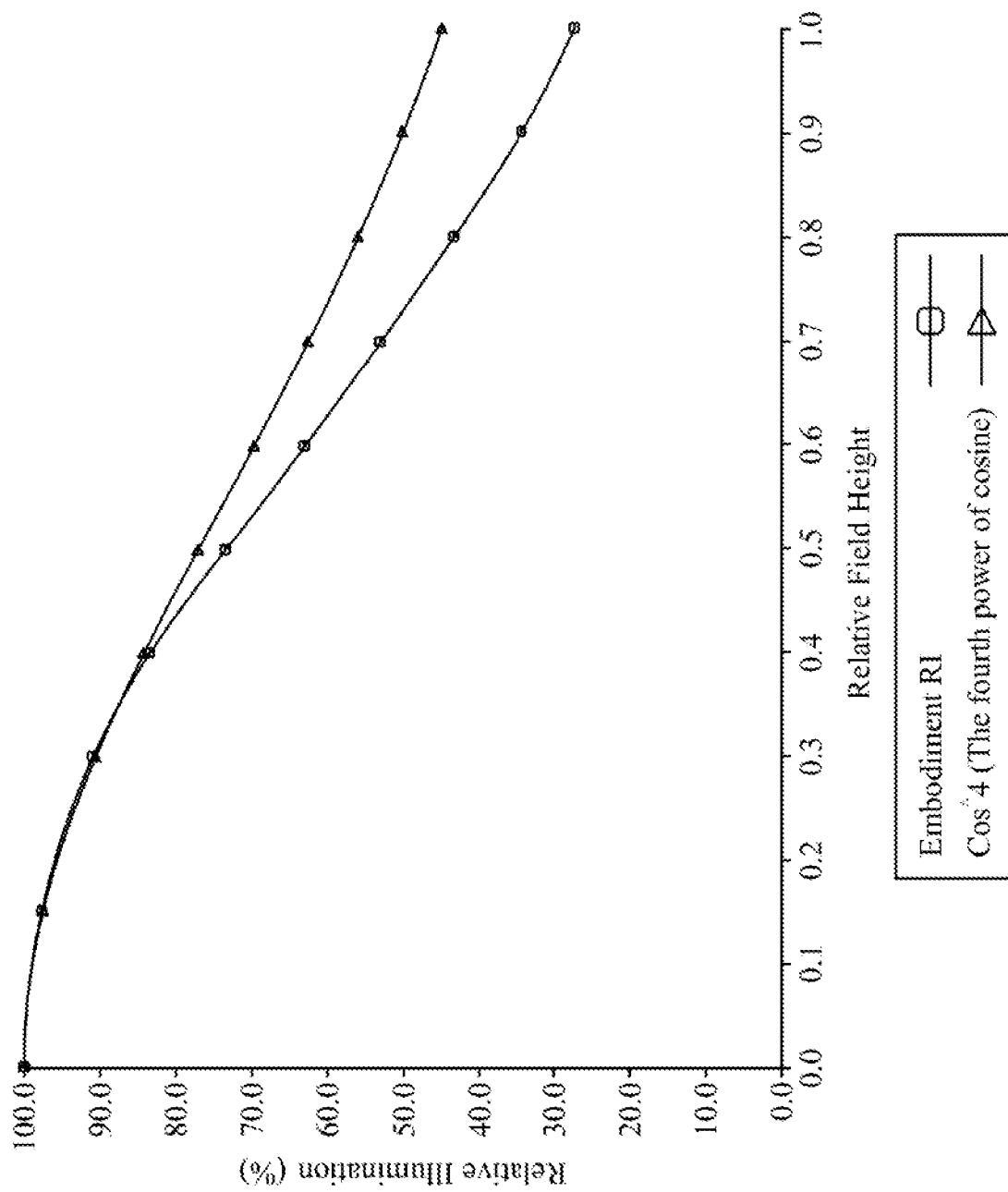
FIG. 3D is a numerical diagram of relative illumination at each field of view on the image plane for an optical image capturing system of the third embodiment of the present invention.

Please refer to FIGS. 3A, 3B, 3C and 3D. FIG. 3A is a schematic view of an optical image capturing system of the third embodiment of the present invention. FIG. 3B shows the longitudinal spherical aberration curves, astigmatic field curves, and optical distortion curve of the optical image capturing system in the order from left to right according to the third embodiment of the present invention. FIG. 3C is a characteristic diagram of modulation transfer of visible light spectrum for the optical image capturing system according to the third embodiment of the present invention. FIG. 3D is a numerical diagram of relative illumination at each field of view on the image plane for an optical image capturing system of the third embodiment of the present invention. As shown in FIG. 3A, in order along an optical axis from an object side to an image side, the optical image capturing system 30 comprises a first lens 310, an aperture stop 300 a second lens 320, a third lens 330, a fourth lens 340, an infrared filter 370, an image plane 380 and an image-sensing device 390.

The first lens 310 has positive refractive power and is made of plastic. An object side 312 of the first lens 310 is a convex surface and an image side 314 of the first lens 310 is a concave surface. Both of the object side 312 and the image side 314 of the first lens 310 are aspheric. Both of the object side 312 and the image side 314 of the first lens 310 has one inflection point.

The second lens 320 has positive refractive power and is made of plastic. An object side 322 of the second lens 320 is a convex surface and an image side 324 of the second lens 320 is a convex surface. Both of the object side 322 and the image side 324 of the second lens 320 are aspheric. Both of the object side 322 and the image side 324 of the second lens 320 have one inflection point.

The third lens 330 has positive refractive power and is made of plastic. An object side 332 of the third lens 330 is a concave surface and an image side 334 of the third lens 330 is a convex surface. Both of the object side 332 and the image side 334 of the third lens 330 are aspheric. Both of the object side 332 and the image side 334 of the third lens 330 has one inflection point.

The fourth lens 340 has negative refractive power and is made of plastic. An object side 342 of the fourth lens 340 is convex a surface and an image side 344 of the fourth lens 340 is a concave surface. Both of the object side 342 and the image side 344 of the fourth lens 340 are aspheric. Both of the object side 342 and the image side 344 of the fourth lens 340 has one inflection point.

The infrared filter 370 is made of glass. The infrared filter 370 is disposed between the fourth lens 340 and the image plane 380, and does not affect the focal length of the optical image capturing system 30.

In the optical image capturing system 30 of the third embodiment, the first lens 310, the second lens 320 and the third lens 330 have positive refractive power. The focal lengths of the first lens 310, the second lens 320 and the third lens 330 are respectively expressed as f1, f2 and f3. The sum of the fp of all lenses with positive refractive power of the optical image capturing system 30 is ΣPP, and the following condition is satisfied: ΣPP=f1+f2+f3. Hereby, this configuration is helpful to distribute the positive refractive power of the single lens to other lenses with positive refractive power in an appropriate way to suppress the generation of noticeable aberrations in the propagating process of the incident light in the optical image capturing system 30.

In the optical image capturing system 30 of the third embodiment, a sum of the focal lengths of all lenses with negative refractive power is Σ NP, and the following condition is satisfied: ΣNP=f4.

Please refer to the following Table 5 and Table 6.

The detailed data of the optical image capturing system 30 of the third embodiment is as shown in Table 5.

TABLE 5

Lens Parameter for the Third Embodiment
f (focal length) = 1.3310 mm; f/HEP = 2.0;
HAF (half angle of view) = 37.5170 deg; tan(HAF) = 0.7678

| Surface No. | | Curvature Radius | Thickness (mm) | Material |
|---|---|---|---|---|
| 0 | Object | Plane | Infinity | |
| 1 | First Lens | 0.83935305 | 0.175 | Plastic |
| 2 | | 0.779262354 | 0.085 | |
| 3 | Aperture | Plane | 0.050 | |
| 4 | Second Lens | 0.623234619 | 0.285 | Plastic |
| 5 | | −11.00170615 | 0.123 | |
| 6 | Third Lens | −0.364938387 | 0.175 | Plastic |
| 7 | | −0.410676892 | 0.050 | |
| 8 | Fourth Lens | 1.0692297 | 0.175 | Plastic |
| 9 | | 0.820249597 | 0.138 | |
| 10 | Infrared filter | Plane | 0.210 | BK7_SCHOTT |
| 11 | | Plane | 0.442 | |
| 12 | Image Plane | Plane | | |

TABLE 5-continued

Lens Parameter for the Third Embodiment
f (focal length) = 1.3310 mm; f/HEP = 2.0;
HAF (half angle of view) = 37.5170 deg; tan(HAF) = 0.7678

| Surface No. | Refractive Index | Coefficient of Dispersion | Focal Length |
|---|---|---|---|
| 0 | | | |
| 1 | 1.584 | 29.88 | 238.535 |
| 2 | | | |
| 3 | | | |
| 4 | 1.545 | 55.96 | 1.089 |
| 5 | | | |
| 6 | 1.642 | 22.46 | 10.040 |
| 7 | | | |
| 8 | 1.642 | 22.46 | −7.515 |
| 9 | | | |
| 10 | 1.517 | 64.13 | |
| 11 | | | |
| 12 | | | |

Reference Wavelength = 555 nm; Shield Position: the 1st surface with effective aperture radius = 0.370 mm; the 5th surface with effective aperture radius = 0.350 mm.

TABLE 6

Aspheric Coefficients of the third embodiment
Aspheric Coefficients

| | Surface No. | | | |
|---|---|---|---|---|
| | 1 | 2 | 4 | 5 |
| k | −1.559670E+01 | −3.285895E+01 | −3.283737E−01 | −2.715604E+01 |
| A4 | 2.960488E+00 | 5.065976E+00 | −7.176660E−01 | 3.614461E−01 |
| A6 | −8.781953E+01 | −1.155499E+02 | −5.059534E+01 | −7.045897E+01 |
| A8 | 2.168917E+03 | 1.873961E+02 | 2.209574E+03 | 1.490315E+03 |
| A10 | −3.808808E+04 | 4.119672E+04 | −6.239210E+04 | −2.783463E+04 |
| A12 | 4.172494E+05 | −9.858251E+05 | 9.875788E+05 | 2.549608E+05 |
| A14 | −2.731712E+06 | 1.068435E+07 | −9.081709E+06 | −1.110874E+06 |
| A16 | 9.752197E+06 | −5.730864E+07 | 4.401602E+07 | 2.625091E+06 |
| A18 | −1.459442E+07 | 1.229646E+08 | −8.582584E+07 | −4.104192E+06 |
| A20 | 1.874089E+01 | 0.000000E+00 | 0.000000E+00 | 0.000000E+00 |

| | Surface No. | | | |
|---|---|---|---|---|
| | 6 | 7 | 8 | 9 |
| k | −1.097425E+00 | −1.384866E+00 | −9.000000E+01 | −1.042971E+01 |
| A4 | 2.214305E+00 | −4.780890E+00 | −5.438650E+00 | −5.344102E+00 |
| A6 | −8.731178E+01 | 1.414294E+02 | 9.066051E+01 | 5.295146E+01 |
| A8 | 2.841182E+03 | −1.711255E+03 | −1.364068E+03 | −4.481013E+02 |
| A10 | −5.162307E+04 | 9.272611E+03 | 1.266697E+04 | 2.489477E+03 |
| A12 | 5.492447E+05 | 4.055356E+04 | −7.011162E+04 | −8.594433E+03 |
| A14 | −3.054910E+06 | −7.073760E+05 | 2.041429E+05 | 1.680325E+04 |
| A16 | 7.919499E+06 | 2.992540E+06 | −2.001005E+05 | −1.520673E+04 |
| A18 | −6.822180E+06 | −4.349295E+06 | −1.771508E+05 | 2.609779E+03 |
| A20 | 0.000000E+00 | 0.000000E+00 | 0.000000E+00 | 0.000000E+00 |

In the third embodiment, the presentation of the aspheric surface formula is similar to that in the first embodiment. Furthermore, the definitions of parameters in following tables are equal to those in the first embodiment, so the repetitious details will not be given here.

The following values for the conditions can be obtained from the data in Table 5 and Table 6

Third Embodiment (Primary Reference Wavelength = 555 nm)

| ETP1 | ETP2 | ETP3 | ETP4 | ED12/ED23 | SED |
|---|---|---|---|---|---|
| 0.162 | 0.193 | 0.186 | 0.197 | 3.763 | 0.351 |

| ETP1/TP1 | ETP2/TP2 | ETP3/TP3 | ETP4/TP4 | ED23/ED34 | SETP |
|---|---|---|---|---|---|
| 0.926 | 0.679 | 1.062 | 1.126 | 0.272 | 0.738 |

| ETL | EBL | EIN | EIR | PIR | STP |
|---|---|---|---|---|---|
| 2.085 | 0.691 | 1.395 | 0.171 | 0.219 | 0.810 |

Third Embodiment (Primary Reference Wavelength = 555 nm) -continued

| EIN/ETL | SETP/EIN | EIR/PIR | EBL/BL | BL | SETP/STP |
|---|---|---|---|---|---|
| 0.669 | 0.695 | 0.777 | 0.8747 | 0.79 | 0.912 |
| ED12 | ED23 | ED34 | ED12/IN12 | ED23/IN23 | ED34/IN34 |
| 0.157 | 0.042 | 0.153 | 1.164 | 0.339 | 3.061 |
| InRS41 | InRS42 | HVT41 | HVT42 | ODT % | TDT % |
| −0.06700 | −0.09200 | 0.20300 | 0.29700 | 1.30000 | 0.60800 |
| \|f/f1\| | \|f/f2\| | \|f/f3\| | \|f/f4\| | \|f1/f2\| | \|f2/f3\| |
| 0.00558 | 1.22222 | 0.13257 | 0.17711 | 219.04040 | 0.10847 |
| ΣPPR | ΣNPR | ΣPPR/\|ΣNPR\| | ΣPP | ΣNP | f1/ΣPP |
| 1.36037 | 0.17711 | 7.68084 | 249.66400 | −7.51500 | 0.95542 |
| f4/ΣNP | IN12/f | IN23/f | IN34/f | TP3/f | TP4/f |
| −0.14491 | 0.10143 | 0.09241 | 0.03757 | 0.13148 | 0.13148 |
| InTL | HOS | HOS/HOI | InS/HOS | InTL/HOS | ΣTP/InTL |
| 1.11700 | 1.90700 | 1.85506 | 0.86418 | 0.58574 | 0.72516 |
| (TP1 + IN12)/TP2 | (TP4 + IN34)/TP3 | TP1/TP2 | TP3/TP4 | IN23/(TP2 + IN23 + TP3) | |
| 1.08772 | 1.28571 | 0.61404 | 1.00000 | 0.21098 | |
| \|InRS41\|/TP4 | \|InRS42\|/TP4 | HVT42/HOI | HVT42/HOS | PhiA4/InTL | PhiA4/HOI |
| 0.3829 | 0.5257 | 0.2889 | 0.1557 | 1.0743 | 0.5837 |
| PhiA4 | PhiB | PhiC | PhiD | RI9 | PhiA4/HEP |
| 1.2 mm | 1.6 mm | 2.0 mm | 2.3 mm | 50% | 1.8032 |
| MTFE0 | MTFE3 | MTFE7 | MTFQ0 | MTFQ3 | MTFQ7 |
| 0.9 | 0.86 | 0.8 | 0.76 | 0.65 | 0.54 |

The following values for the conditional expressions can be obtained from the data in Table 5 and Table 6.

Values Related to Inflection Point of Third Embodiment (Primary Reference Wavelength = 555 nm)

| | | | | | | |
|---|---|---|---|---|---|---|
| HIF111 | 0.2660 | HIF111/HOI | 0.2588 | SGI111 | 0.0370 | \|SGI111\|/(\|SGI111\| + TP1) | 0.1745 |
| HIF121 | 0.1940 | HIF12/HOI | 0.1887 | SGI121 | 0.0200 | \|SGI121\|/(\|SGI121\| + TP1) | 0.1026 |
| HIF211 | 0.2270 | HIF211/HOI | 0.2208 | SGI211 | 0.0380 | \|SGI211\|/(\|SGI211\| + TP2) | 0.1176 |
| HIF221 | 0.3430 | HIF221/HOI | 0.3337 | SGI221 | −0.0490 | \|SGI221\|/(\|SGI221\| + TP2) | 0.1467 |
| HIF311 | 0.2590 | HIF311/HOI | 0.2519 | SGI311 | −0.0860 | \|SGI311\|/(\|SGI311\| + TP3) | 0.3295 |
| HIF321 | 0.2470 | HIF321/HOI | 0.2403 | SGI321 | −0.0730 | \|SGI321\|/(\|SGI321\| + TP3) | 0.2944 |
| HIF411 | 0.0950 | HIF411/HOI | 0.0924 | SGI411 | 0.0030 | \|SGI411\|/(\|SGI411\| + TP4) | 0.0169 |
| HIF421 | 0.1440 | HIF421/HOI | 0.1401 | SGI421 | 0.0100 | \|SGI421\|/(\|SGI421\| + TP4) | 0.0541 |

The Fourth Embodiment

Figure 4A:
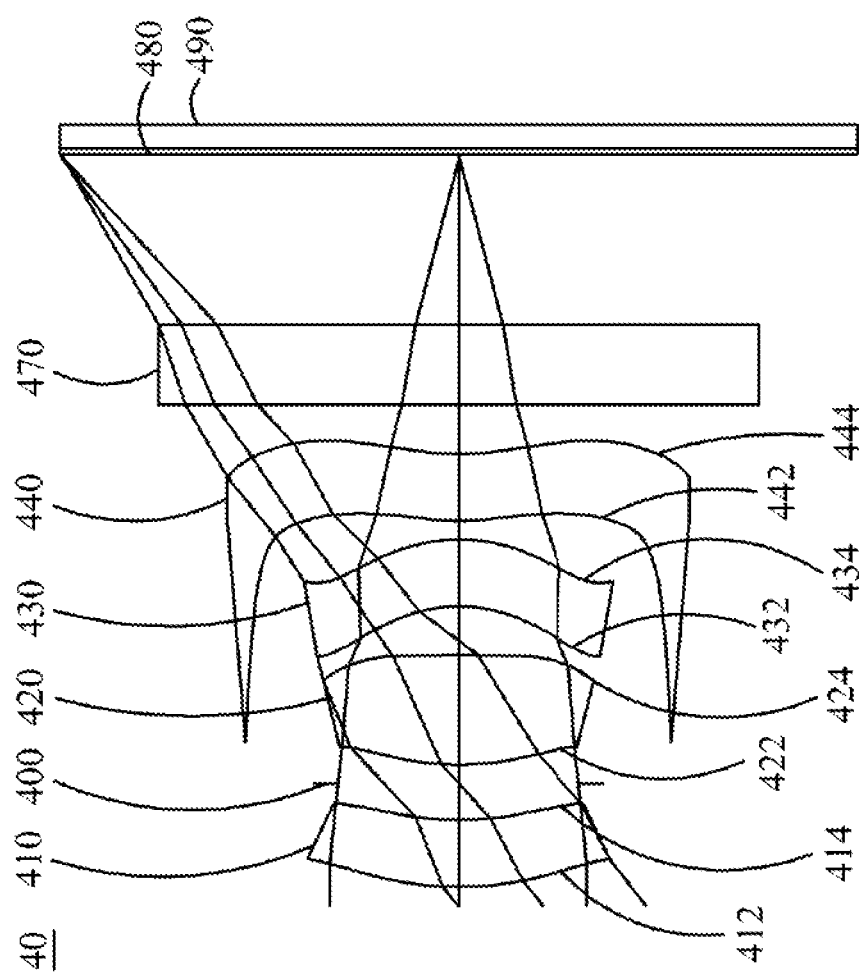
FIG. 4A is a schematic view of an optical image capturing system of the fourth embodiment of the present invention.
Figure 4B:
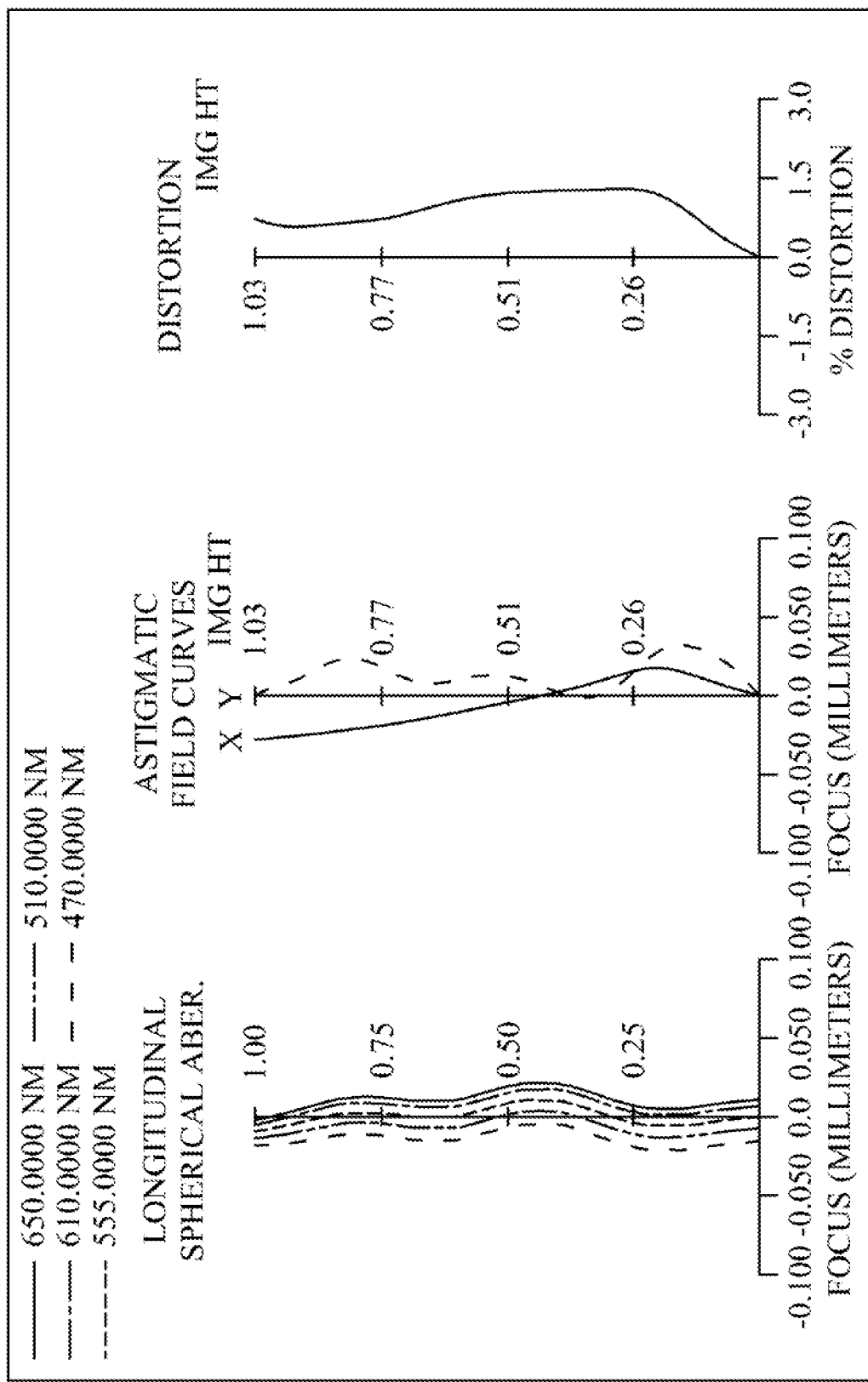
FIG. 4B shows curve diagrams of longitudinal spherical aberration, astigmatic field, and optical distortion of the optical image capturing system in the order from left to right of the fourth embodiment of the present invention.
Figure 4C:
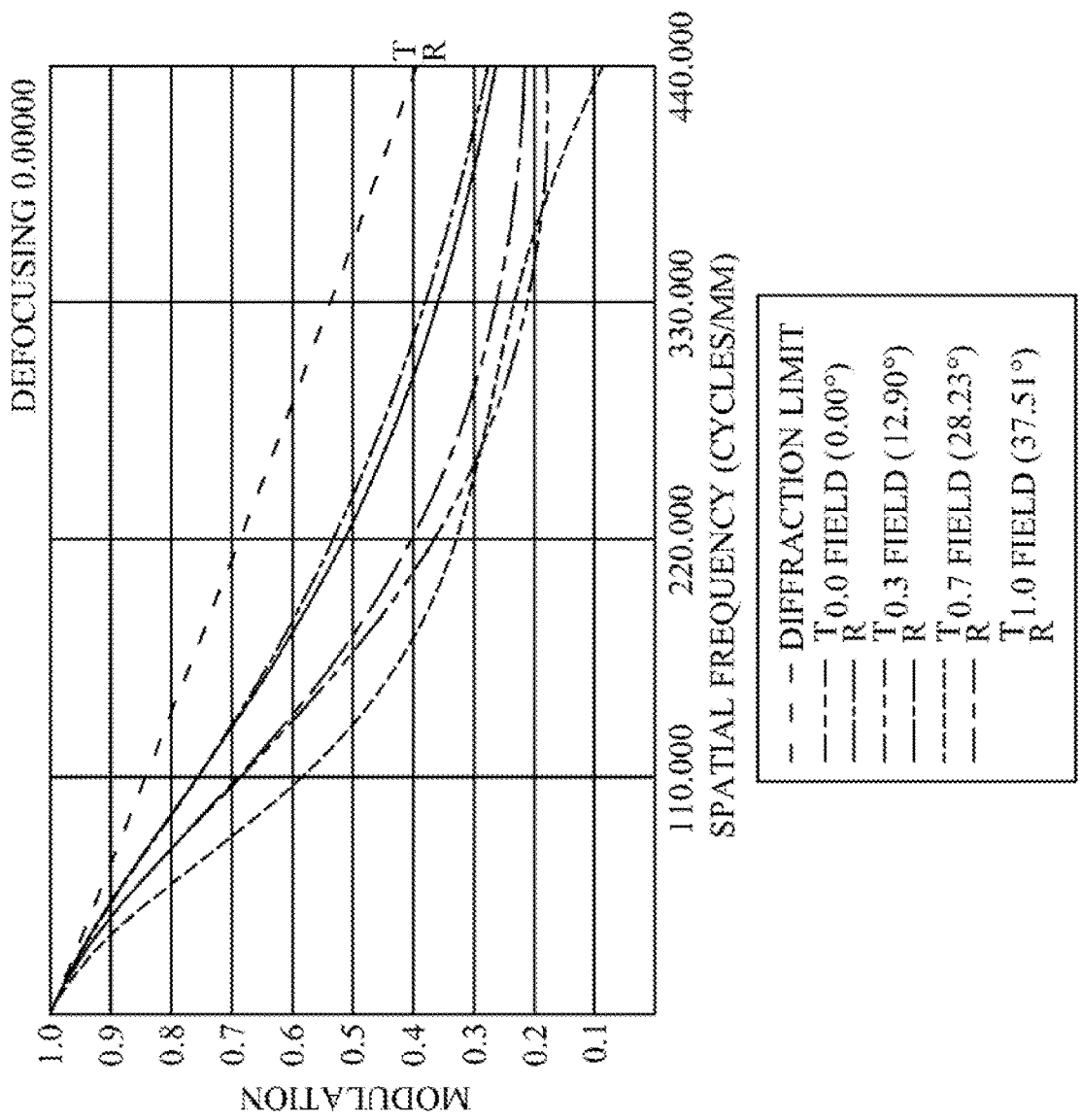
FIG. 4C is a characteristic diagram of modulation transfer of visible light spectrum for the optical image capturing system according to the fourth embodiment of the present invention.
Figure 4D:
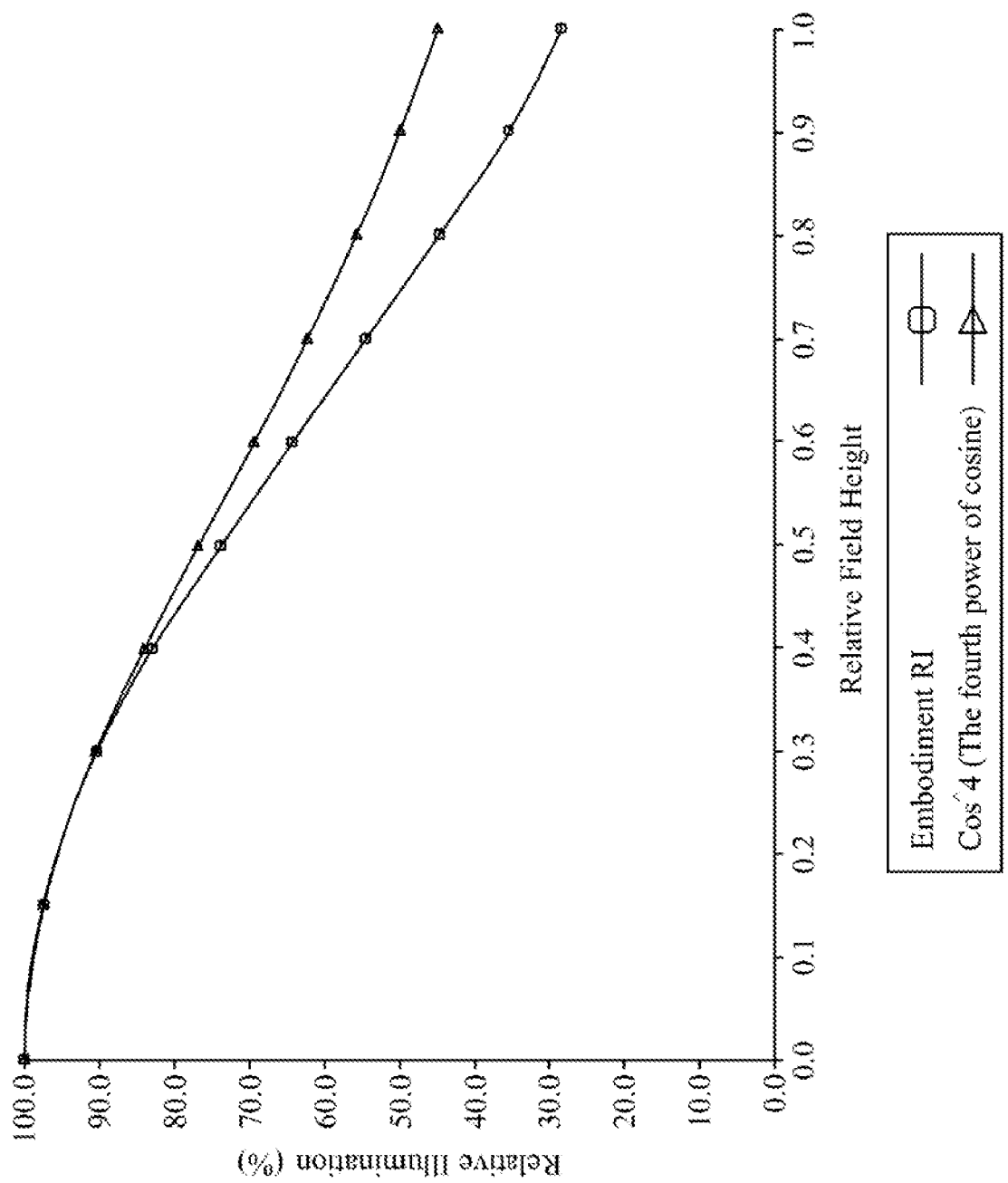
FIG. 4D is a numerical diagram of relative illumination at each field of view on the image plane for an optical image capturing system of the fourth embodiment of the present invention.

Please refer to FIGS. 4A, 4B, 4C and 4D. FIG. 4A is a schematic view of an optical image capturing system of the fourth embodiment of the present invention. FIG. 4B shows the longitudinal spherical aberration curves, astigmatic field curves, and optical distortion curve of the optical image capturing system in the order from left to right according to the fourth embodiment of the present invention. FIG. 4C is a characteristic diagram of modulation transfer of visible light spectrum for the optical image capturing system according to the fourth embodiment of the present invention. FIG. 4D is a numerical diagram of relative illumination at each field of view on the image plane for an optical image capturing system of the fourth embodiment of the present invention. As shown in FIG. 4A, in order along an optical axis from an object side to an image side, the optical image capturing system 40 comprises a first lens 410, an aperture stop 400 a second lens 420, a third lens 430, a fourth lens 440, an infrared filter 470, an image plane 480 and an image-sensing device 490.

The first lens 410 has positive refractive power and is made of plastic. An object side 412 of the first lens 410 is a convex surface and an image side 414 of the first lens 410 is a concave surface. Both of the object side 412 and the image side 414 of the first lens 410 are aspheric. Both of the object side 412 and the image side 414 of the first lens 410 has one inflection point.

The second lens 420 has positive refractive power and is made of plastic. An object side 422 of the second lens 420 is a convex surface and an image side 424 of the second lens 420 is a convex surface. Both of the object side 422 and the image side 424 of the second lens 420 are aspheric. The object side 422 of the second lens 420 has one inflection point.

The third lens 430 has negative refractive power and is made of plastic. An object side 432 of the third lens 430 is a concave surface and an image side 434 of the third lens 430 is a convex surface. Both of the object side 432 and the image side 434 of the third lens 430 are aspheric. Both of the object side 432 and the image side 434 of the third lens 430 has one inflection point.

The fourth lens 440 has positive refractive power and is made of plastic. An object side 442 of the fourth lens 440 is convex a surface and an image side 444 of the fourth lens 440 is a concave surface. Both of the object side 442 and the image side 444 of the fourth lens 440 are aspheric. Both of the object side 442 and the image side 444 of the fourth lens 440 has one inflection point.

The infrared filter 470 is made of glass. The infrared filter 470 is disposed between the fourth lens 440 and the image plane 480, and does not affect the focal length of the optical image capturing system 40.

In the optical image capturing system 40 of the fourth embodiment, the first lens 410, the second lens 420 and the fourth lens 440 have positive refractive power. The focal lengths of the first lens 410, the second lens 420 and the fourth lens 440 are respectively expressed as f1, f2 and f4. The sum of the fp of all lenses with positive refractive power of the optical image capturing system 40 is ΣPP, and the following condition is satisfied: ΣPP=f1+f2+f4. Hereby, this configuration is helpful to distribute the positive refractive power of the single lens to other lenses with positive refractive power in an appropriate way to suppress the generation of noticeable aberrations in the propagating process of the incident light in the optical image capturing system 40.

In the optical image capturing system 40 of the fourth embodiment, the focal length of the third lens 430 are expressed as f3, a sum of the focal lengths of all lenses with negative refractive power is Σ NP, and the following condition is satisfied: ΣNP=f3.

Please refer to the following Table 7 and Table 8.

TABLE 7

Lens Parameter for the Fourth Embodiment
f (focal length) = 1.3290 mm; f/HEP = 2.0;
HAF (half angle of view) = 37.5150 deg; tan(HAF) = 0.7677

| Surface No. | | Curvature Radius | Thickness (mm) | Material |
|---|---|---|---|---|
| 0 | Object | Plane | Infinity | |
| 1 | First Lens | 0.796358327 | 0.175 | Plastic |
| 2 | | 0.752894203 | 0.095 | |
| 3 | Aperture | Plane | 0.050 | |
| 4 | Second Lens | 0.69002414 | 0.289 | Plastic |
| 5 | | −5.470145447 | 0.127 | |
| 6 | Third Lens | −0.375226684 | 0.175 | Plastic |
| 7 | | −0.480949837 | 0.050 | |
| 8 | Fourth Lens | 0.634776701 | 0.175 | Plastic |
| 9 | | 0.628050498 | 0.130 | |
| 10 | Infrared filter | Plane | 0.210 | BK7_SCHOTT |
| 11 | | Plane | 0.446 | |
| 12 | Image Plane | Plane | | |

| Surface No. | Refractive Index | Coefficient of Dispersion | Focal Length |
|---|---|---|---|
| 0 | | | |
| 1 | 1.584 | 29.88 | 47.93 |
| 2 | | | |
| 3 | | | |
| 4 | 1.545 | 55.96 | 1.14 |
| 5 | | | |
| 6 | 1.642 | 22.46 | −7.54 |
| 7 | | | |
| 8 | 1.642 | 22.46 | 9.92 |
| 9 | | | |
| 10 | 1.517 | 64.13 | |
| 11 | | | |
| 12 | | | |

Reference Wavelength = 555 nm; Shield Position: the 1st surface with effective aperture radius = 0.390 mm; the 5th surface with effective aperture radius = 0.350 mm.

TABLE 8

Aspheric Coefficients of the fourth embodiment
Aspheric Coefficients

| | Surface No. | | | |
|---|---|---|---|---|
| | 1 | 2 | 4 | 5 |
| k | −1.559070E+01 | −3.277696E+01 | −1.338964E−01 | −2.644155E+01 |
| A4 | 3.931058E+00 | 6.407587E+00 | −7.455663E−01 | −3.112638E−01 |
| A6 | −1.040453E+02 | −1.208225E+02 | −4.905075E+01 | −7.316173E+01 |
| A8 | 2.548788E+03 | −4.252993E+01 | 2.152711E+03 | 1.536768E+03 |
| A10 | −4.367449E+04 | 4.938506E+04 | −6.180943E+04 | −3.005936E+04 |

TABLE 8-continued

Aspheric Coefficients of the fourth embodiment
Aspheric Coefficients

| | | | | |
|---|---|---|---|---|
| A12 | 4.647813E+05 | −1.098966E+06 | 9.823348E+05 | 3.189116E+05 |
| A14 | −2.944070E+06 | 1.140707E+07 | −9.044375E+06 | −1.714189E+06 |
| A16 | 1.013712E+07 | −5.908647E+07 | 4.382259E+07 | 4.420446E+06 |
| A18 | −1.459442E+07 | 1.229646E+08 | −8.582584E+07 | −4.104192E+06 |
| A20 | 1.874407E+01 | 0.000000E+00 | 0.000000E+00 | 0.000000E+00 |

| | Surface No. | | | |
|---|---|---|---|---|
| | 6 | 7 | 8 | 9 |
| k | −9.444825E−01 | −8.569895E−01 | −2.727253E+01 | −1.028315E+01 |
| A4 | 1.474769E+00 | −7.584700E+00 | −4.999799E+00 | −3.743632E+00 |
| A6 | −2.913984E+01 | 2.026719E+02 | 6.751631E+01 | 2.859772E+01 |
| A8 | 1.861605E+02 | −2.697091E+03 | −9.280684E+02 | −2.281186E+02 |
| A10 | −1.107176E+03 | 1.921504E+04 | 7.954824E+03 | 1.278101E+03 |
| A12 | 8.405416E+04 | −1.663989E+04 | −3.875688E+04 | −4.522034E+03 |
| A14 | −9.804138E+05 | −5.393357E+05 | 8.940373E+04 | 9.165264E+03 |
| A16 | 4.316120E+06 | 2.803448E+06 | −2.453740E+04 | −9.062636E+03 |
| A18 | −6.822180E+06 | −4.349295E+06 | −1.771508E+05 | 2.609779E+03 |
| A20 | 0.000000E+00 | 0.000000E+00 | 0.000000E+00 | 0.000000E+00 |

In the fourth embodiment, the presentation of the aspheric surface formula is similar to that in the first embodiment. Furthermore, the definitions of parameters in following tables are equal to those in the first embodiment, so the repetitious details will not be given here.

The following values for the conditions can be obtained from the data in Table 7 and Table 8.

| Fourth Embodiment (Primary Reference Wavelength = 555 nm) | | | | | |
|---|---|---|---|---|---|
| ETP1 | ETP2 | ETP3 | ETP4 | ED12/ED23 | SED |
| 0.165 | 0.200 | 0.190 | 0.192 | 2.891 | 0.369 |
| ETP1/TP1 | ETP2/TP2 | ETP3/TP3 | ETP4/TP4 | ED23/ED34 | SETP |
| 0.941 | 0.692 | 1.088 | 1.096 | 0.308 | 0.747 |
| ETL | EBL | EIN | EIR | PIR | STP |
| 1.869 | 0.753 | 1.116 | 0.096 | 0.130 | 0.814 |
| EIN/ETL | SETP/EIN | EIR/PIR | EBL/BL | BL | SETP/STP |
| 0.597 | 0.670 | 0.742 | 0.9568 | 0.787 | 0.918 |
| ED12 | ED23 | ED34 | ED12/IN12 | ED23/IN23 | ED34/IN34 |
| 0.149 | 0.052 | 0.168 | 1.028 | 0.408 | 3.356 |
| InRS41 | InRS42 | HVT41 | HVT42 | ODT % | TDT % |
| −0.04300 | −0.06200 | 0.26100 | 0.34000 | 1.30500 | 0.49200 |
| |f/f1| | |f/f2| | |f/f3| | |f/f4| | |f1/f2| | |f2/f3| |
| 0.02773 | 1.16477 | 0.17617 | 0.13399 | 42.00876 | 0.15125 |
| ΣPPR | ΣNPR | ΣPPR/\|ΣNPR\| | ΣPP | ΣNP | f1/ΣPP |
| 1.32648 | 0.17617 | 7.52969 | 58.99200 | −7.54400 | 0.81252 |
| f4/ΣNP | IN12/f | IN23/f | IN34/f | TP3/f | TP4/f |
| −0.15125 | 0.10910 | 0.09556 | 0.03762 | 0.13168 | 0.13168 |
| InTL | HOS | HOS/HOI | InS/HOS | InTL/HOS | ΣTP/InTL |
| 1.13600 | 1.92300 | 1.87062 | 0.85959 | 0.59074 | 0.71655 |

-continued

| Fourth Embodiment (Primary Reference Wavelength = 555 nm) | | | | |
| --- | --- | --- | --- | --- |
| (TP1 + IN12)/ TP2 | (TP4 + IN34)/ TP3 | TP1/TP2 | TP3/TP4 | IN23/(TP2 + IN23 + TP3) |
| 1.10727 | 1.28571 | 0.60554 | 1.00000 | 0.21489 |
| \|InRS41\|/ TP4 | \|InRS42\|/ TP4 | HVT42/HOI | HVT42/HOS | PhiA4/InTL | PhiA4/HOI |
| 0.2457 | 0.3543 | 0.3307 | 0.1768 | 1.1004 | 0.6080 |
| PhiA4 | PhiB | PhiC | PhiD | RI9 | PhiA4/HEP |
| 1.25 mm | 1.65 mm | 2.05 mm | 2.35 mm | 50% | 1.8811 |
| MTFE0 | MTFE3 | MTFE7 | MTFQ0 | MTFQ3 | MTFQ7 |
| 0.9 | 0.87 | 0.84 | 0.75 | 0.68 | 0.58 |

The following values for the conditions can be obtained from the data in Table 7 and Table 8

| Values Related to Inflection Point of Fourth Embodiment (Primary Reference Wavelength = 555 nm) | | | | | |
| --- | --- | --- | --- | --- | --- |
| HIF111 | 0.3010 | HIF111/HOI | 0.2928 | SGI111 | 0.0510 | \|SGI111\|/(\|SGI111\| + TP1) | 0.2257 |
| HIF121 | 0.2200 | HIF121/HOI | 0.2140 | SGI121 | 0.0280 | \|SGI121\|/(\|SGI121\| + TP1) | 0.1379 |
| HIF211 | 0.2190 | HIF211/HOI | 0.2130 | SGI211 | 0.0320 | \|SGI211\|/(\|SGI211\| + TP2) | 0.0997 |
| HIF311 | 0.2600 | HIF311/HOI | 0.2529 | SGI311 | −0.0870 | \|SGI311\|/(\|SGI311\| + TP3) | 0.3321 |
| HIF321 | 0.2570 | HIF321/HOI | 0.2500 | SGI321 | −0.0750 | \|SGI321\|/(\|SGI321\| + TP3) | 0.3000 |
| HIF411 | 0.1210 | HIF411/HOI | 0.1177 | SGI411 | 0.0090 | \|SGI411\|/(\|SGI411\| + TP4) | 0.0489 |
| HIF421 | 0.1620 | HIF421/HOI | 0.1576 | SGI421 | 0.0160 | \|SGI421\|/(\|SGI421\| + TP4) | 0.0838 |

The Fifth Embodiment

Figure 5A:
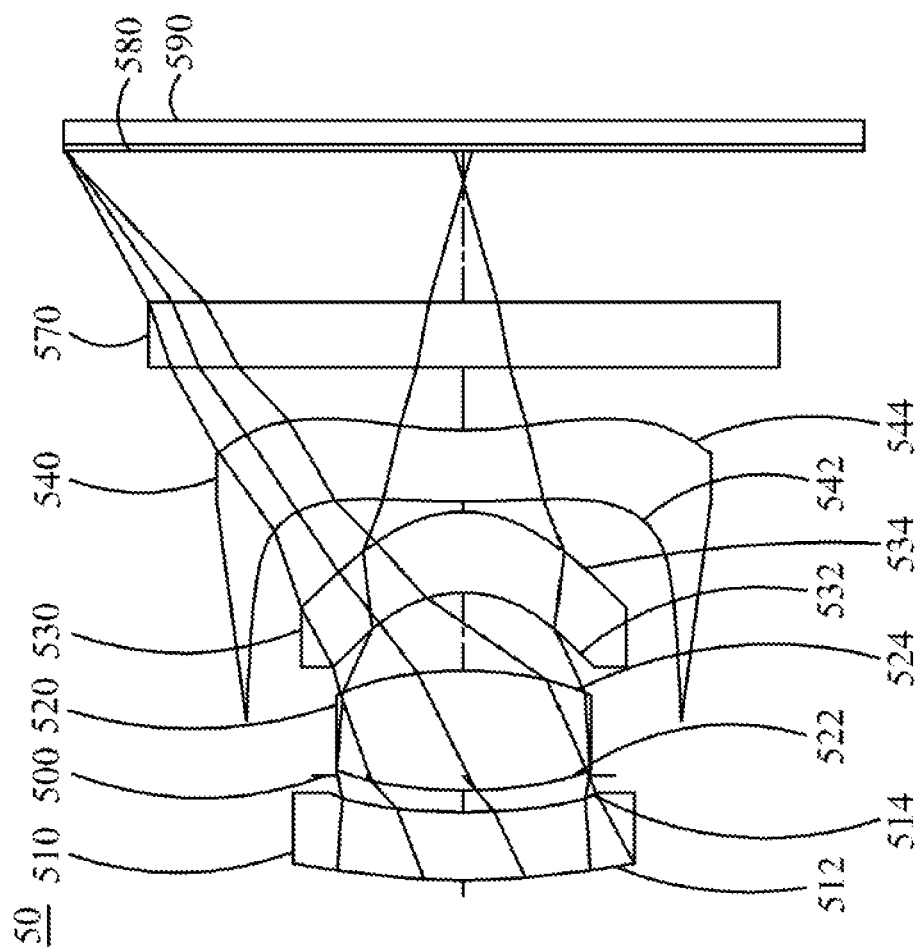
FIG. 5A is a schematic view of an optical image capturing system of the fifth embodiment of the present invention.
Figure 5B:
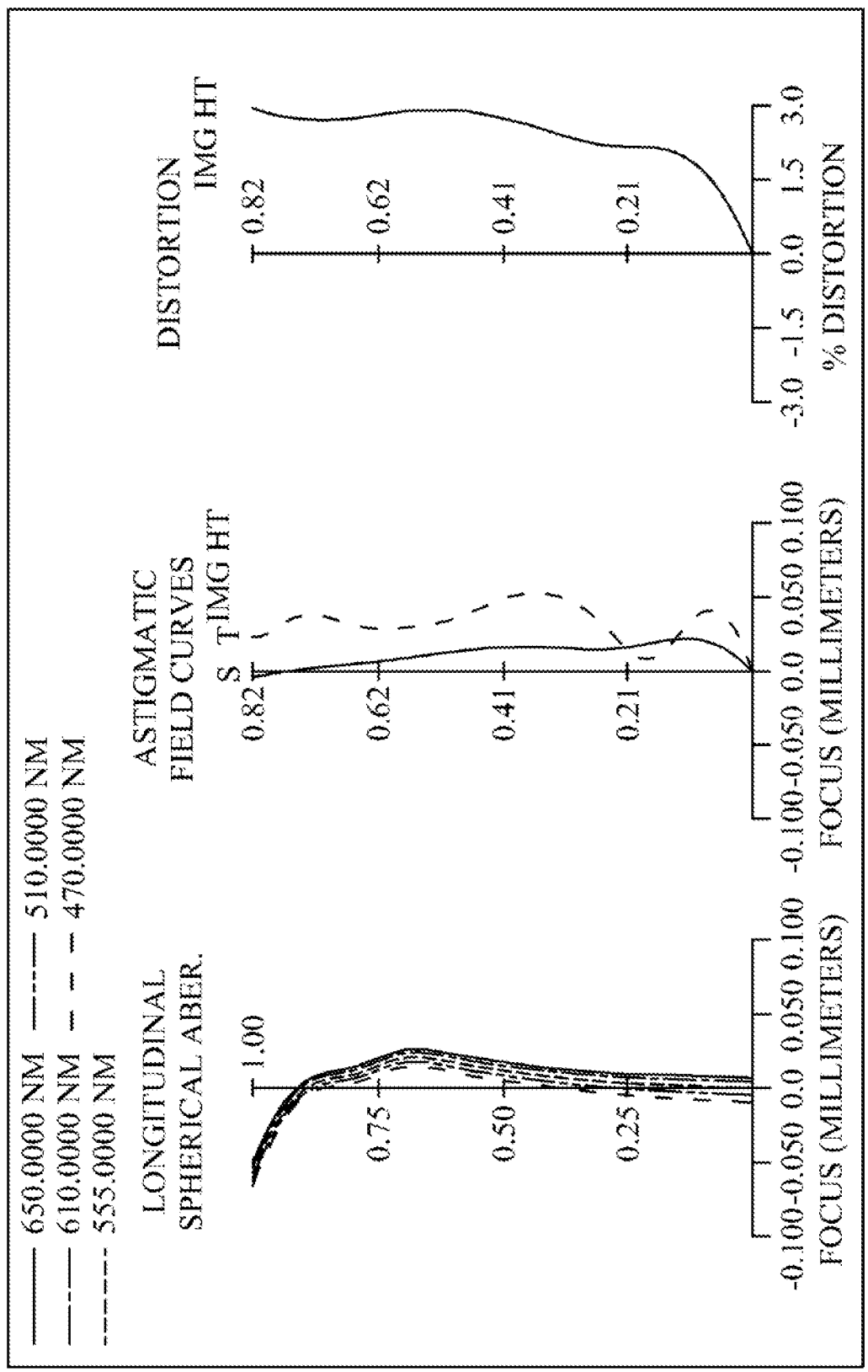
FIG. 5B shows curve diagrams of longitudinal spherical aberration, astigmatic field, and optical distortion of the optical image capturing system in the order from left to right of the fifth embodiment of the present invention.
Figure 5C:
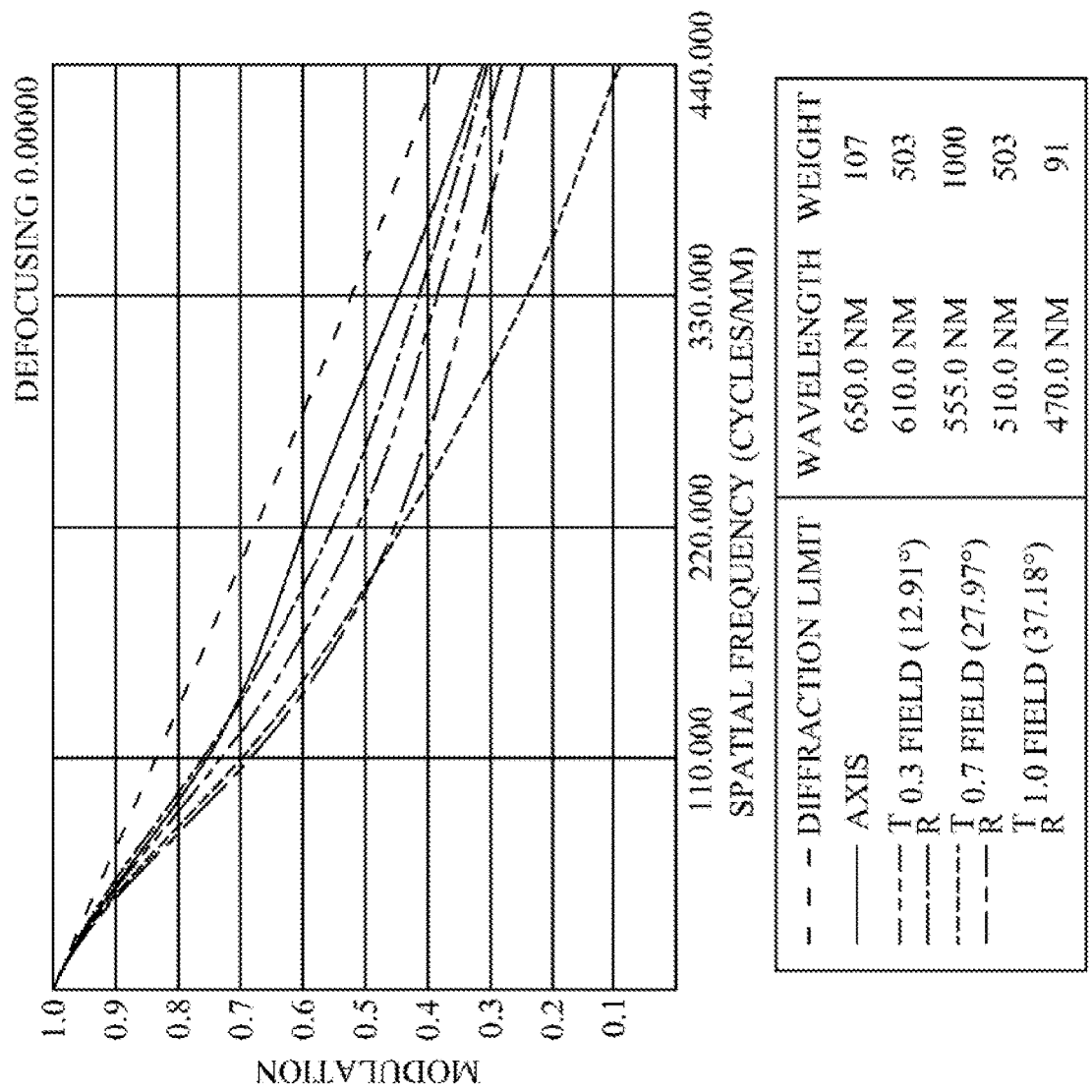
FIG. 5C is a characteristic diagram of modulation transfer of visible light spectrum for the optical image capturing system according to the fifth embodiment of the present invention.
Figure 5D:
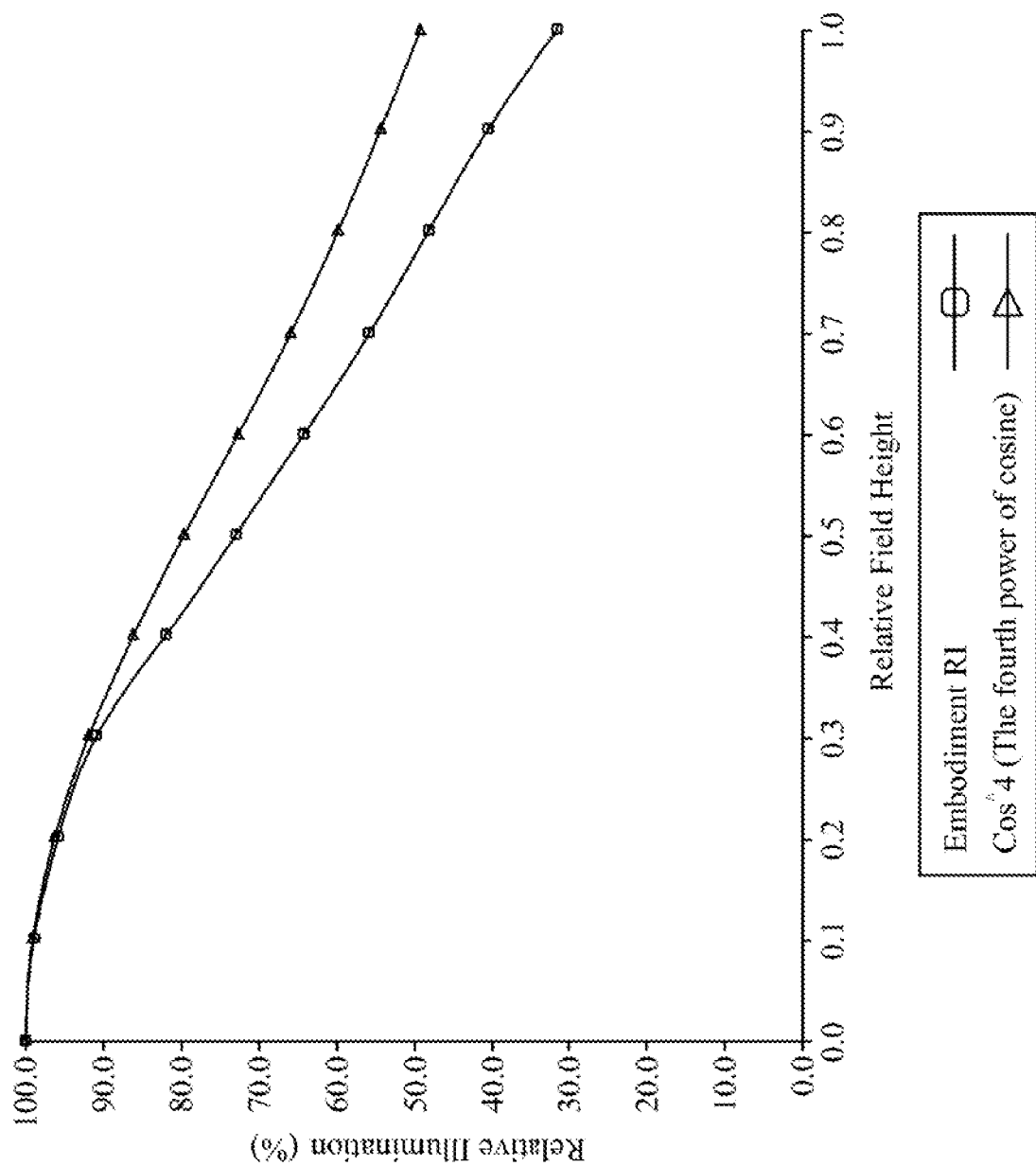
FIG. 5D is a numerical diagram of relative illumination at each field of view on the image plane for an optical image capturing system of the fifth embodiment of the present invention.

Please refer to FIGS. 5A, 5B, 5C and 5D. FIG. 5A is a schematic view of an optical image capturing system of the fifth embodiment of the present invention. FIG. 5B shows the longitudinal spherical aberration curves, astigmatic field curves, and optical distortion curve of the optical image capturing system in the order from left to right according to the fifth embodiment of the present invention. FIG. 5C is a characteristic diagram of modulation transfer of visible light spectrum for the optical image capturing system according to the fifth embodiment of the present invention. FIG. 5D is a numerical diagram of relative illumination at each field of view on the image plane for an optical image capturing system of the fifth embodiment of the present invention. As shown in FIG. 5A, in order along an optical axis from an object side to an image side, the optical image capturing system 50 comprises a first lens 510, an aperture stop 500 a second lens 520, a third lens 530, a fourth lens 540, an infrared filter 570, an image plane 580 and an image-sensing device 590.

The first lens 510 has negative refractive power and is made of plastic. An object side 512 of the first lens 510 is a convex surface and an image side 514 of the first lens 510 is a concave surface. Both of the object side 512 and the image side 514 of the first lens 510 are aspheric. The object side 512 of the first lens 510 has one inflection point.

The second lens 520 has positive refractive power and is made of plastic. An object side 522 of the second lens 520 is a convex surface and an image side 524 of the second lens 520 is a convex surface. Both of the object side 522 and the image side 524 of the second lens 520 are aspheric.

The third lens 530 has positive refractive power and is made of plastic. An object side 532 of the third lens 530 is a concave surface and an image side 534 of the third lens 530 is a convex surface. Both of the object side 532 and the image side 534 of the third lens 530 are aspheric. The image side 534 of the third lens 530 has one inflection point.

The fourth lens 540 has negative refractive power and is made of plastic. An object side 542 of the fourth lens 540 is convex a surface and an image side 544 of the fourth lens 540 is a concave surface. Both of the object side 542 and the image side 544 of the fourth lens 540 are aspheric. Both of the object side 542 and the image side 544 of the fourth lens 540 has one inflection point.

The infrared filter 570 is made of glass. The infrared filter 570 is disposed between the fourth lens 540 and the image plane 580, and does not affect the focal length of the optical image capturing system 50.

In the optical image capturing system 50 of the fifth embodiment, the second lens 520 and the third lens 530 have positive refractive power. The focal lengths of the second lens 520 and the third lens 530 are respectively expressed as f2 and f3. The sum of the fp of all lenses with positive refractive power of the optical image capturing system 50 is ΣPP, and the following condition is satisfied: ΣPP=f2+f3.

Hereby, this configuration is helpful to distribute the positive refractive power of the single lens to other lenses with positive refractive power in an appropriate way to suppress the generation of noticeable aberrations in the propagating process of the incident light in the optical image capturing system 50.

In the optical image capturing system 50 of the fifth embodiment, a sum of the focal lengths of all lenses with negative refractive power is $\Sigma$ NP, and the following condition is satisfied: $\Sigma NP = f1 + f4$.

Please refer to the following Table 9 and Table 10.

TABLE 9

Lens Parameter for the Fifth Embodiment
F (focal length) = 1.038 mm; f/HEP = 2.0;
HAF (half angle of view) = 40.2351 deg; tan(HAF) = 0.8461

| Surface No. | | Curvature Radius | Thickness (mm) | Material |
|---|---|---|---|---|
| 0 | Object | 1E+18 | 600 | |
| 1 | First Lens | 1.318838134 | 0.151 | Plastic |
| 2 | | 1.199785426 | 0.080 | |
| 3 | Aperture | 1E+18 | −0.033 | |
| 4 | Second Lens | 0.888008072 | 0.266 | Plastic |
| 5 | | −0.836283021 | −0.021 | |
| 6 | | 1E+18 | 0.195 | |
| 7 | Third Lens | −0.230724801 | 0.179 | Plastic |
| 8 | | −0.252833943 | 0.023 | |
| 9 | Fourth Lens | 0.961626482 | 0.161 | Plastic |
| 10 | | 0.584762783 | 0.141 | |
| 11 | Infrared filter | 1E+18 | 0.145 | BK7_SCHOTT |
| 12 | | 1E+18 | 0.336 | |
| 13 | | 1E+18 | 0.000 | |
| 14 | Image Plane | 1E+18 | 0.000 | |

| Surface No. | Refractive Index | Coefficient of Dispersion | Focal Length |
|---|---|---|---|
| 0 | | | |
| 1 | 1.661 | 20.364 | −40.448 |
| 2 | | | |
| 3 | | | |
| 4 | 1.545 | 55.961 | 0.834 |
| 5 | | | |
| 6 | | | |
| 7 | 1.545 | 55.961 | 2.594 |
| 8 | | | |
| 9 | 1.661 | 20.364 | −2.697 |
| 10 | | | |
| 11 | 1.517 | 64.13 | |
| 12 | | | |
| 13 | | | |
| 14 | | | |

Reference Wavelength = 555 nm; Shield Position: the 6th surface with effective aperture radius = 0.261 mm; the 10th surface with effective aperture radius = 0.510 mm.

TABLE 10

Aspheric Coefficients of the fifth embodiment
Aspheric Coefficients

| | Surface No. | | | |
|---|---|---|---|---|
| | 1 | 2 | 4 | 5 |
| k | −1.931550E+01 | −5.944256E−01 | 2.899251E+00 | −1.652042E−01 |
| A4 | 4.751055E−02 | 1.985239E−01 | 2.378219E+00 | −4.531571E+00 |
| A6 | −7.369787E−01 | 1.141525E+00 | −3.409528E+02 | 4.125321E+02 |
| A8 | −1.464233E+01 | 1.320343E+02 | 2.653552E+04 | −3.976522E+04 |
| A10 | −3.898305E+01 | 1.845076E+03 | −1.305270E+06 | 2.168067E+06 |
| A12 | 1.163348E+03 | −1.337007E+04 | 4.201857E+07 | −7.185274E+07 |
| A14 | 2.325617E+04 | −4.098113E+04 | −8.838875E+08 | 1.461296E+09 |
| A16 | −1.646115E+05 | 4.413052E+06 | 1.172744E+10 | −1.772179E+10 |
| A18 | 0.000000E+00 | 0.000000E+00 | −8.871474E+10 | 1.171847E+11 |
| A20 | 0.000000E+00 | 0.000000E+00 | 2.903080E+11 | −3.238002E+11 |

| | Surface No. | | | |
|---|---|---|---|---|
| | 7 | 8 | 9 | 10 |
| k | −2.129767E+00 | −3.535712E+00 | −2.991367E+02 | −1.652397E+00 |
| A4 | −9.144793E+00 | −3.994793E+01 | −3.470143E+00 | −1.319941E+01 |
| A6 | −1.078446E+03 | 1.892532E+03 | 1.603843E+02 | 1.852286E+02 |
| A8 | 9.151087E+04 | −6.900259E+04 | −6.615281E+03 | −2.230679E+03 |
| A10 | −4.008615E+06 | 1.677337E+06 | 1.514333E+05 | 1.958918E+04 |
| A12 | 1.079904E+08 | −2.670001E+07 | −2.187693E+06 | −1.240236E+05 |
| A14 | −1.835847E+09 | 2.744293E+08 | 2.010551E+07 | 5.484178E+05 |
| A16 | 1.919580E+10 | −1.747522E+09 | −1.140136E+08 | −1.594466E+06 |
| A18 | −1.123167E+11 | 6.253395E+09 | 3.628560E+08 | 2.709933E+06 |
| A20 | 2.802708E+11 | −9.593353E+09 | −4.954465E+08 | −2.019570E+06 |

In the fifth embodiment, the presentation of the aspheric surface formula is similar to that in the first embodiment. Furthermore, the definitions of parameters in following tables are equal to those in the first embodiment, so the repetitious details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| ETP1 | ETP2 | ETP3 | ETP4 | ED12/ED23 | SED |
| 0.164 | 0.169 | 0.198 | 0.183 | 0.795 | 0.290 |
| ETP1/TP1 | ETP2/TP2 | ETP3/TP3 | ETP4/TP4 | ED23/ED34 | SETP |
| 1.085 | 0.637 | 1.107 | 1.140 | 0.443 | 0.714 |
| ETL | EBL | EIN | EIR | PIR | STP |
| 1.601 | 0.597 | 1.004 | 0.116 | 0.141 | 0.756 |
| EIN/ETL | SETP/EIN | EIR/PIR | EBL/BL | BL | SETP/STP |
| 0.627 | 0.711 | 0.822 | 0.9603 | 0.6217 | 0.945 |
| ED12 | ED23 | ED34 | ED12/IN12 | ED23/IN23 | ED34/IN34 |
| 0.057 | 0.072 | 0.161 | 1.187 | 0.412 | 7.032 |
| InRS41 | InRS42 | HVT41 | HVT42 | ODT % | TDT % |
| −0.05607 | −0.05495 | 0.19248 | 0.29032 | 4.66088 | 1.96699 |
| \|f/f1\| | \|f/f2\| | \|f/f3\| | \|f/f4\| | \|f1/f2\| | \|f2/f3\| |
| 0.02566 | 1.24493 | 0.40010 | 0.38484 | 48.51187 | 0.32138 |
| ΣPPR | ΣNPR | ΣPPR/\|ΣNPR\| | ΣPP | ΣNP | f1/ΣPP |
| 1.67069 | 0.38484 | 4.34120 | −37.01941 | −2.69714 | 1.09260 |
| f4/ΣNP | IN12/f | IN23/f | IN34/f | TP3/f | TP4/f |
| 1.00000 | 0.04615 | 0.16743 | 0.02211 | 0.17254 | 0.15490 |
| InTL | HOS | HOS/HOI | InS/HOS | InTL/HOS | ΣTP/InTL |
| 1.00103 | 1.62276 | 1.74490 | 0.85739 | 0.61687 | 0.75561 |
| (TP1 + IN12)/TP2 | (TP4 + IN34)/TP3 | TP1/TP2 | TP3/TP4 | IN23/(TP2 + IN23 + TP3) | |
| 0.74891 | 1.02590 | 0.56852 | 1.11389 | 0.28102 | |
| \|InRS41\|/TP4 | \|InRS42\|/TP4 | HVT42/HOI | HVT42/HOS | PhiA4/InTL | PhiA4/HOI |
| 0.3488 | 0.3418 | 0.3122 | 0.1789 | 1.0189 | 1.0968 |
| PhiA4 | PhiB | PhiC | PhiD | RI9 | PhiA4/HEP |
| 1.02 mm | 1.4026 mm | 1.4026 mm | 1.8 mm | 55% | 0.5197 |
| MTFE0 | MTFE3 | MTFE7 | MTFQ0 | MTFQ3 | MTFQ7 |
| 0.89 | 0.88 | 0.87 | 0.75 | 0.73 | 0.7 |

The following values for the conditional expressions can be obtained from the data in Table 9 and Table 10:

| | Values Related to Inflection Point of Fifth Embodiment (Primary Reference Wavelength = 555 nm) |
|---|---|---|---|---|---|---|
| HIF111 | 0.3482 | HIF111/ HOI | 0.3744 | SGI111 | 0.0368 | \|SGI111\|/ (\|SGI111\| + TP1) | 0.1960 |
| HIF321 | 0.2908 | HIF321/ HOI | 0.3126 | SGI321 | −0.1685 | \|SGI321\|/ (\|SGI321\| + TP3) | 0.4848 |
| HIF411 | 0.0872 | HIF411/ HOI | 0.0937 | SGI411 | 0.0026 | \|SGI411\|/ (\|SGI411\| + TP4) | 0.0160 |
| HIF421 | 0.1344 | HIF421/ HOI | 0.1445 | SGI421 | 0.0119 | \|SGI421\|/ (\|SGI421\| + TP4) | 0.0689 |

The numerical data related to the length of the outline curve is shown according to table 9 and table 10

| | Fifth Embodiment (Primary Reference Wavelength = 555 nm) |
|---|---|---|---|---|---|---|
| ARE | ½(HEP) | ARE value | ARE − ½(HEP) | 2(ARE/HEP) % | TP | ARE/TP(%) |
| 11 | 0.260 | 0.260 | 0.00028 | 100.11% | 0.151 | 172.33% |
| 12 | 0.260 | 0.263 | 0.00278 | 101.07% | 0.151 | 173.99% |
| 21 | 0.260 | 0.264 | 0.00438 | 101.68% | 0.266 | 99.52% |
| 22 | 0.260 | 0.267 | 0.00685 | 102.64% | 0.266 | 100.45% |
| 31 | 0.260 | 0.312 | 0.05237 | 120.15% | 0.179 | 174.35% |
| 32 | 0.260 | 0.300 | 0.04057 | 115.61% | 0.179 | 167.77% |
| 41 | 0.260 | 0.259 | −0.00067 | 99.74% | 0.161 | 161.22% |
| 42 | 0.260 | 0.260 | 0.00049 | 100.19% | 0.161 | 161.94% |
| ARS | EHD | ARS value | ARS − EHD | (ARS/EHD) % | TP | ARS/TP(%) |
| 11 | 0.357 | 0.360 | 0.002 | 100.61% | 0.151 | 238.18% |
| 12 | 0.275 | 0.280 | 0.005 | 101.83% | 0.151 | 185.36% |
| 21 | 0.264 | 0.270 | 0.006 | 102.18% | 0.266 | 101.62% |
| 22 | 0.267 | 0.274 | 0.008 | 102.85% | 0.266 | 103.35% |
| 31 | 0.269 | 0.326 | 0.057 | 121.22% | 0.179 | 181.76% |
| 32 | 0.335 | 0.407 | 0.072 | 121.54% | 0.179 | 227.25% |
| 41 | 0.389 | 0.410 | 0.021 | 105.32% | 0.161 | 255.08% |
| 42 | 0.510 | 0.532 | 0.022 | 104.39% | 0.161 | 331.12% |

The Sixth Embodiment

Figure 6A:
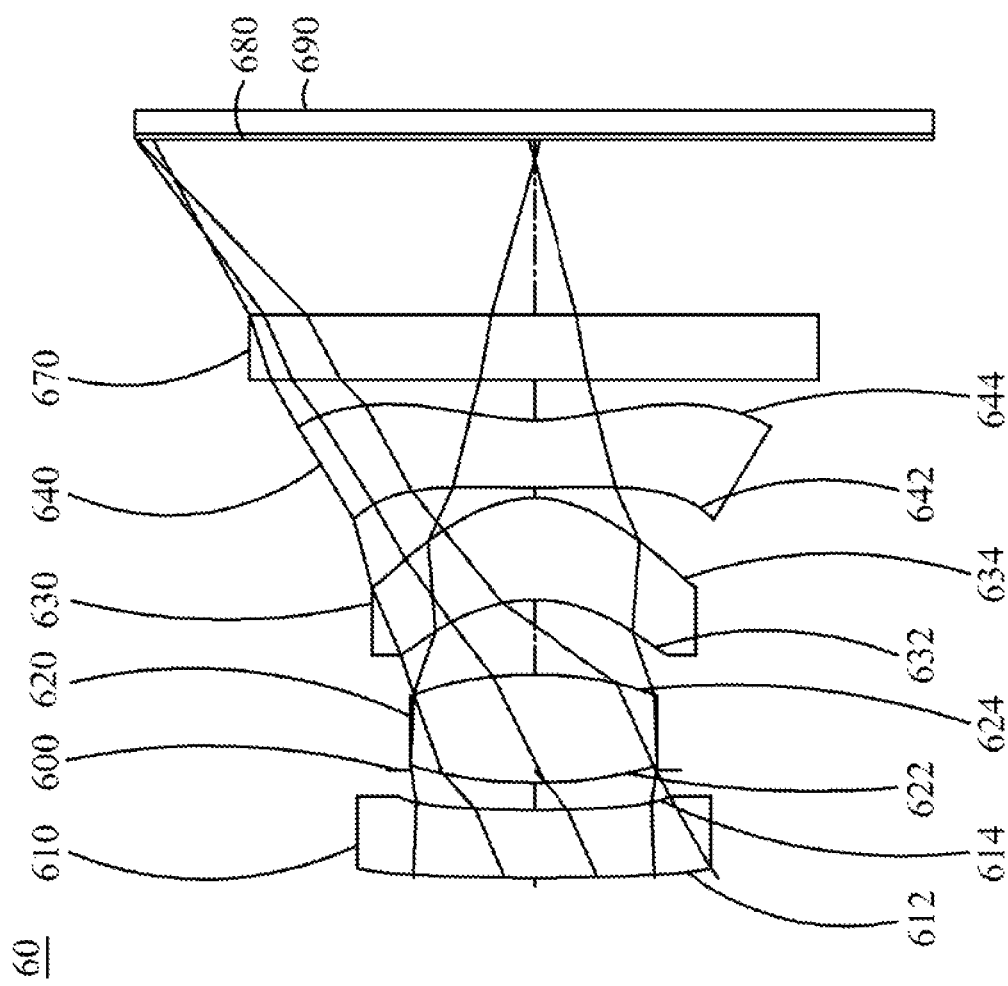
FIG. 6A is a schematic view of an optical image capturing system of the sixth embodiment of the present invention.
Figure 6B:
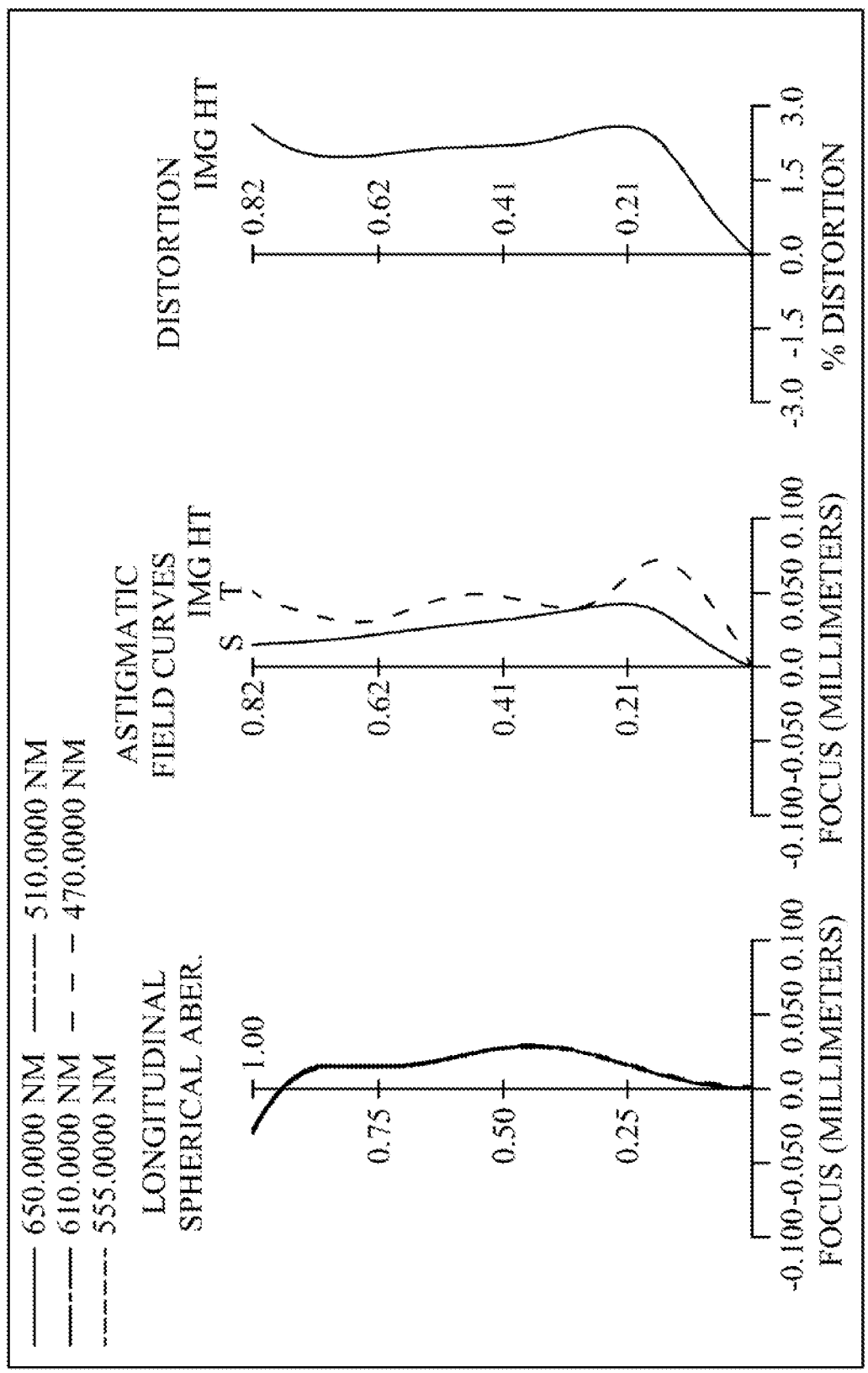
FIG. 6B shows curve diagrams of longitudinal spherical aberration, astigmatic field, and optical distortion of the optical image capturing system in the order from left to right of the sixth embodiment of the present invention.
Figure 6C:
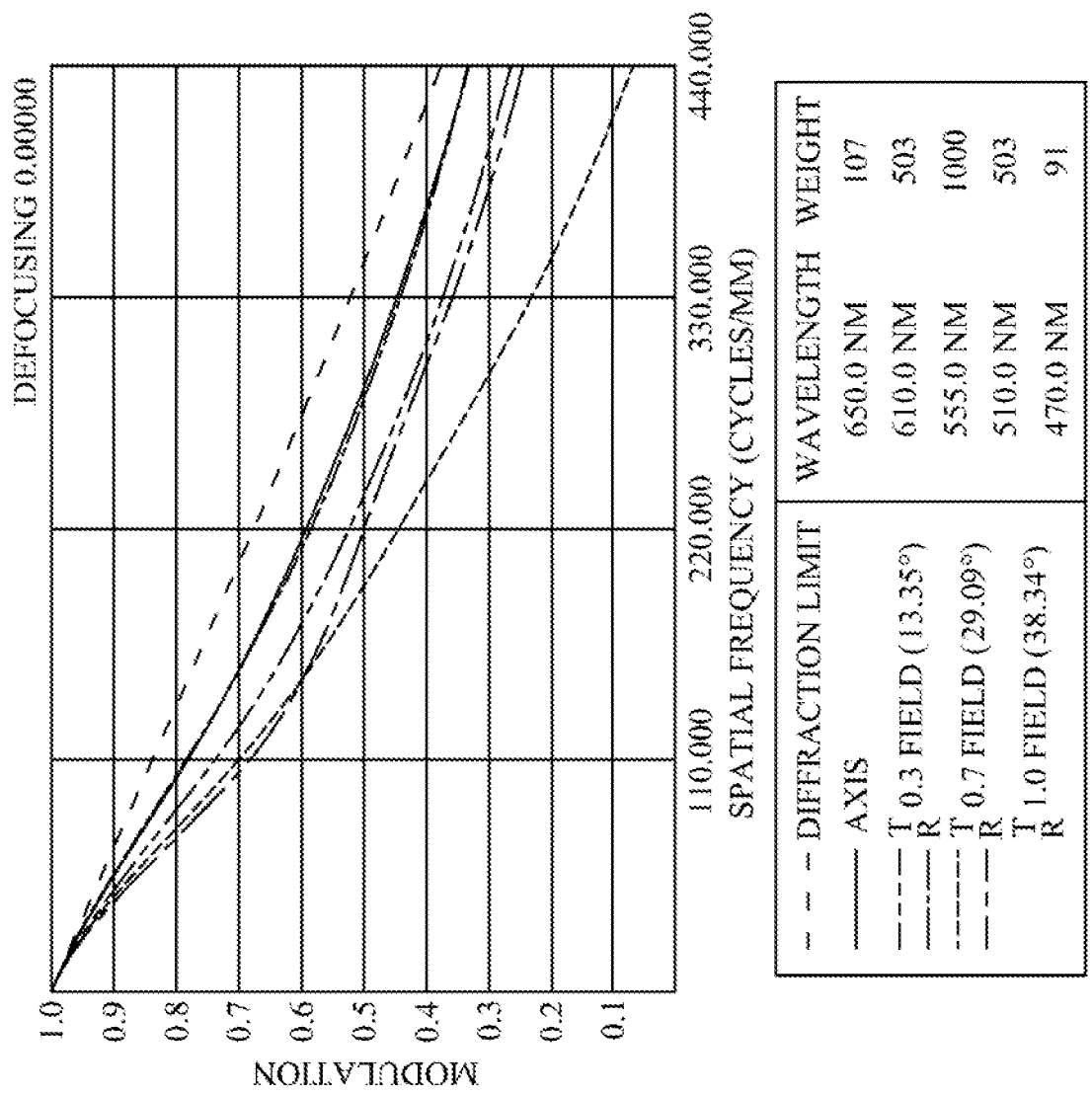
FIG. 6C is a characteristic diagram of modulation transfer of visible light spectrum for the optical image capturing system according to the sixth embodiment of the present invention.
Figure 6D:
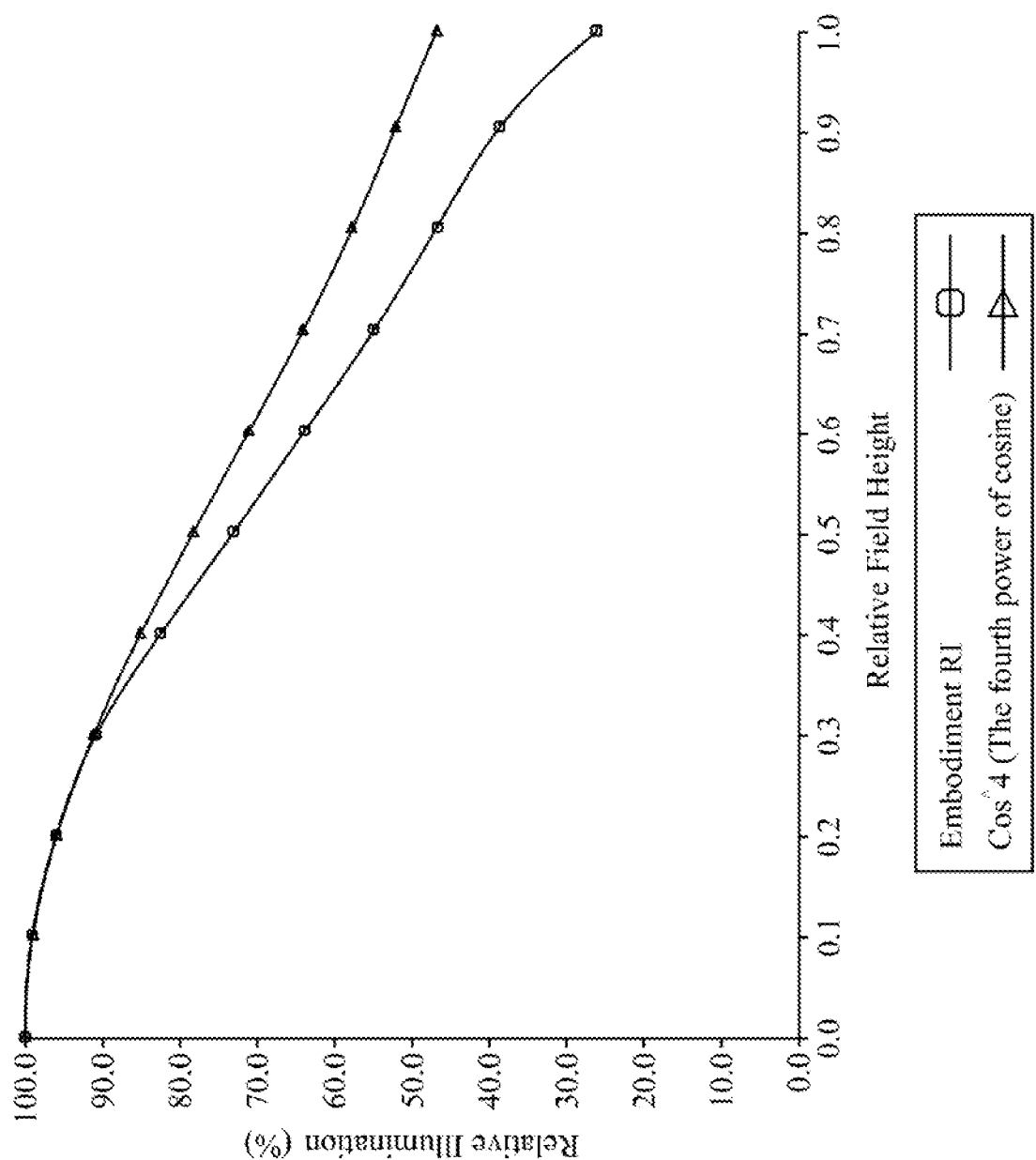
FIG. 6D is a numerical diagram of relative illumination at each field of view on the image plane for an optical image capturing system of the sixth embodiment of the present invention.

Please refer to FIGS. 6A, 6B, 6C and 6D. FIG. 6A is a schematic view of an optical image capturing system of the sixth embodiment of the present invention. FIG. 6B shows the longitudinal spherical aberration curves, astigmatic field curves, and optical distortion curve of the optical image capturing system in the order from left to right according to the sixth embodiment of the present invention. FIG. 6C is a characteristic diagram of modulation transfer of visible light spectrum for the optical image capturing system according to the sixth embodiment of the present invention. FIG. 6D is a numerical diagram of relative illumination at each field of view on the image plane for an optical image capturing system of the sixth embodiment of the present invention. As shown in FIG. 6A, in order along an optical axis from an object side to an image side, the optical image capturing system 60 comprises a first lens 610, an aperture stop 600 a second lens 620, a third lens 630, a fourth lens 640, an infrared filter 670, an image plane 680 and an image-sensing device 690.

The first lens 610 has negative refractive power and is made of plastic. An object side 612 of the first lens 610 is a convex surface and an image side 614 of the first lens 610 is a concave surface. Both of the object side 612 and the image side 614 of the first lens 610 are aspheric.

The second lens 620 has positive refractive power and is made of plastic. An object side 622 of the second lens 620 is a convex surface and an image side 624 of the second lens 620 is a convex surface. Both of the object side 622 and the image side 624 of the second lens 620 are aspheric. The image side 624 of the second lens 620 has one inflection point.

The third lens 630 has positive refractive power and is made of plastic. An object side 632 of the third lens 630 is a concave surface and an image side 634 of the third lens 630 is a convex surface. Both of the object side 632 and the image side 634 of the third lens 630 are aspheric. Both of the object side 632 and the image side 634 of the third lens 630 has one inflection point.

The fourth lens 640 has negative refractive power and is made of plastic. An object side 642 of the fourth lens 640 is convex a surface and an image side 644 of the fourth lens 640 is a concave surface. Both of the object side 642 and the image side 644 of the fourth lens 640 are aspheric. Both of the object side 642 and the image side 644 of the fourth lens 640 has one inflection point.

The infrared filter 670 is made of glass. The infrared filter 670 is disposed between the fourth lens 640 and the image plane 680, and does not affect the focal length of the optical image capturing system 60.

In the optical image capturing system 60 of the sixth embodiment, the second lens 620 and the third lens 630 have positive refractive power. The focal lengths of the second lens 620 and the third lens 630 are respectively expressed as f2 and f3. The sum of the fp of all lenses with positive refractive power of the optical image capturing system 60 is ΣPP, and the following condition is satisfied: ΣPP=f2+f3.

Hereby, this configuration is helpful to distribute the positive refractive power of the single lens to other lenses with positive refractive power in an appropriate way to suppress the generation of noticeable aberrations in the propagating process of the incident light in the optical image capturing system 60.

In the optical image capturing system 60 of the sixth embodiment, a sum of the focal lengths of all lenses with negative refractive power is Σ NP, and the following condition is satisfied: ΣNP=f1+f4.

Please refer to the following Table 11 and Table 12.

TABLE 11

Lens Parameter for the Sixth Embodiment
f (focal length) = 0.9946 mm; f/HEP = 2.0;
HAF (half angel of view) = 41.2533 deg; tan(HAF) = 0.8771

| Surface No. | | Curvature Radius | Thickness (mm) | Material |
|---|---|---|---|---|
| 0 | Object | 1E+18 | 600 | |
| 1 | First Lens | 7.46846478 | 0.151 | Plastic |
| 2 | | 4.317793429 | 0.088 | |
| 3 | Aperture | 1E+18 | −0.028 | |
| 4 | Second Lens | 0.935843227 | 0.239 | Plastic |
| 5 | | −0.933344075 | 0.010 | |
| 6 | | 1E+18 | 0.157 | |
| 7 | Third Lens | −0.322918565 | 0.227 | Plastic |
| 8 | | −0.210895065 | 0.023 | |

TABLE 11-continued

Lens Parameter for the Sixth Embodiment
f (focal length) = 0.9946 mm; f/HEP = 2.0;
HAF (half angel of view) = 41.2533 deg; tan(HAF) = 0.8771

| | | | | |
|---|---|---|---|---|
| 9 | Fourth Lens | 4.506707493 | 0.150 | Plastic |
| 10 | | 0.414840736 | 0.090 | |
| 11 | Infrared filter | 1E+18 | 0.145 | BK7_SCHOTT |
| 12 | | 1E+18 | 0.388 | |
| 13 | | 1E+18 | 0.000 | |
| 14 | Image Plane | 1E+18 | 0.000 | |

| Surface No. | Refractive Index | Coefficient of Dispersion | Focal Length |
|---|---|---|---|
| 0 | | | |
| 1 | 1.661 | 20.364 | −15.642 |
| 2 | | | |
| 3 | | | |
| 4 | 1.545 | 55.961 | 0.896 |
| 5 | | | |
| 6 | | | |
| 7 | 1.545 | 55.961 | 0.648 |
| 8 | | | |
| 9 | 1.661 | 20.364 | −0.695 |
| 10 | | | |
| 11 | 1.517 | 64.13 | |
| 12 | | | |
| 13 | | | |
| 14 | | | |

Reference Wavelength = 555 nm; Shield Position: the 6th surface with effective aperture radius = 0.265 mm.

TABLE 12

Aspheric Coefficients of the fifth embodiment
Aspheric Coefficients

| | Surface No. | | | |
|---|---|---|---|---|
| | 1 | 2 | 4 | 5 |
| k | 2.572381E+02 | 2.223058E+02 | 1.904462E+00 | −2.099831E+00 |
| A4 | 4.569267E−01 | 1.680923E+00 | 1.808880E+00 | −2.384445E+00 |
| A6 | −1.346296E+00 | 9.798959E+00 | −1.079205E+02 | 2.286660E+01 |
| A8 | 2.121674E+01 | −2.674219E+01 | 5.449604E+03 | −5.307268E+03 |
| A10 | 6.617868E+01 | −4.885509E+02 | −1.968503E+05 | 2.435205E+05 |
| A12 | −6.722692E+02 | 5.965613E+03 | 4.181697E+06 | −4.972932E+06 |
| A14 | −1.036815E+04 | 1.437029E+05 | −4.660329E+07 | 4.795142E+07 |
| A16 | 6.804141E+04 | −8.308662E+05 | 2.112434E+08 | −1.745943E+08 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| | Surface No. | | | |
|---|---|---|---|---|
| | 7 | 8 | 9 | 10 |
| k | −1.545752E+00 | −4.669869E+00 | 3.643159E+01 | −1.345056E+01 |
| A4 | −5.986753E+00 | −2.322068E+01 | −4.368014E+00 | −4.463185E+00 |
| A6 | −5.532782E+01 | 4.773595E+02 | 1.821189E+01 | 3.295984E+01 |
| A8 | 7.180106E+03 | −7.713606E+03 | −2.098946E+02 | −2.343704E+02 |
| A10 | −3.046991E+05 | 8.493639E+04 | 7.784101E+02 | 1.007289E+03 |
| A12 | 6.619474E+06 | −5.844502E+05 | 1.003698E+02 | −2.254853E+03 |
| A14 | −6.258719E+07 | 2.371643E+06 | −3.542943E+03 | 1.303148E+03 |
| A16 | 1.680202E+07 | −4.384066E+06 | −4.678203E+04 | 4.409045E+02 |
| A18 | 3.817877E+09 | 1.181835E+06 | −1.299365E+06 | 1.202425E+04 |
| A20 | −1.909590E+10 | −1.795783E+06 | 7.031548E+06 | −2.133442E+04 |

In the sixth embodiment, the presentation of the aspheric surface formula is similar to that in the first embodiment. Furthermore, the definitions of parameters in following tables are equal to those in the first embodiment, so the repetitious details will not be given here.

The following values for the conditional expressions can be obtained from the data in Table 11 and Table 12:

| Sixth Embodiment (Primary Reference Wavelength = 555 nm) | | | | | |
|---|---|---|---|---|---|
| ETP1 | ETP2 | ETP3 | ETP4 | ED12/ED23 | SED |
| 0.163 | 0.160 | 0.209 | 0.190 | 0.739 | 0.322 |
| ETP1/TP1 | ETP2/TP2 | ETP3/TP3 | ETP4/TP4 | ED23/ED34 | SETP |
| 1.079 | 0.668 | 0.919 | 1.271 | 0.774 | 0.721 |
| ETL | EBL | EIN | EIR | PIR | STP |
| 1.633 | 0.589 | 1.043 | 0.057 | 0.090 | 0.767 |
| EIN/ETL | SETP/EIN | EIR/PIR | EBL/BL | BL | SETP/STP |
| 0.639 | 0.691 | 0.635 | 0.9466 | 0.6222 | 0.941 |
| ED12 | ED23 | ED34 | ED12/IN12 | ED23/IN23 | ED34/IN34 |
| 0.078 | 0.106 | 0.137 | 1.294 | 0.638 | 5.978 |
| InRS41 | InRS42 | HVT41 | HVT42 | ODT % | TDT % |
| −0.08490 | −0.03269 | 0.11758 | 0.30304 | 4.94835 | 2.97889 |
| \|f/f1\| | \|f/f2\| | \|f/f3\| | \|f/f4\| | \|f1/f2\| | \|f2/f3\| |
| 0.06358 | 1.11017 | 1.53450 | 1.43093 | 17.45990 | 1.38222 |
| ΣPPR | ΣNPR | ΣPPR/\|ΣNPR\| | ΣPP | ΣNP | f1/ΣPP |
| 2.70825 | 1.43093 | 1.89264 | −14.09806 | −0.69506 | 1.10952 |
| f4/ΣNP | IN12/f | IN23/f | IN34/f | TP3/f | TP4/f |
| 1.00000 | 0.06098 | 0.16739 | 0.02309 | 0.22858 | 0.15043 |
| InTL | HOS | HOS/HOI | InS/HOS | InTL/HOS | ΣTP/InTL |
| 1.01692 | 1.63914 | 1.76252 | 0.85399 | 0.62040 | 0.75407 |
| (TP1 + IN12)/TP2 | (TP4 + IN34)/TP3 | TP1/TP2 | TP3 TP4 | IN23/(TP2 + IN23 + TP3) | |
| 0.88517 | 0.75909 | 0.63138 | 1.51957 | 0.26308 | |
| \|InRS41\|/TP4 | \|InRS42\|/TP4 | HVT42/HOI | HVT42/HOS | PhiA4/InTL | PhiA4/HOI |
| 0.5675 | 0.2185 | 0.3258 | 0.1849 | 1.0129 | 1.1075 |
| PhiA4 | PhiB | PhiC | PhiD | RI9 | PhiA4/HEP |
| 1.030 mm | 1.4026 mm | 1.4026 mm | 1.8 mm | 50% | 2.0712 |
| MTFE0 | MTFE3 | MTFE7 | MTFQ0 | MTFQ3 | MTFQ7 |
| 0.9 | 0.89 | 0.88 | 0.78 | 0.74 | 0.7 |

The following values for the conditional expressions can be obtained from the data in Table 11 and Table 12:

| Values Related to Inflection Point of Sixth Embodiment (Primary Reference Wavelength = 555 nm) | | | | | | |
|---|---|---|---|---|---|---|
| HIF221 | 0.2508 | HIF221/HOI | 0.2696 | SGI221 | −0.0441 | \|SGI221\|/(\|SGI221\| + TP2) | 0.1557 |
| HIF311 | 0.2356 | HIF311/HOI | 0.2533 | SGI311 | −0.0934 | \|SGI311\|/(\|SGI311\| + TP3) | 0.2913 |
| HIF321 | 0.2839 | HIF321/HOI | 0.3053 | SGI321 | −0.1545 | \|SGI321\|/(\|SGI321\| + TP3) | 0.4046 |
| HIF411 | 0.0669 | HIF411/HOI | 0.0719 | SGI411 | 0.0004 | \|SGI411\|/(\|SGI411\| + TP4) | 0.0027 |
| HIF421 | 0.1329 | HIF421/HOI | 0.1429 | SGI421 | 0.0157 | \|SGI421\|/(\|SGI421\| + TP4) | 0.0952 |

The numerical data related to the length of the outline curve is shown according to table 11 and table 12.

| Sixth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP(%) |
| 11 | 0.249 | 0.249 | 0.00011 | 100.05% | 0.151 | 165.11% |
| 12 | 0.249 | 0.250 | 0.00126 | 100.51% | 0.151 | 165.87% |
| 21 | 0.249 | 0.252 | 0.00349 | 101.40% | 0.239 | 105.66% |
| 22 | 0.249 | 0.254 | 0.00542 | 102.18% | 0.239 | 106.47% |
| 31 | 0.249 | 0.276 | 0.02654 | 110.66% | 0.227 | 121.20% |
| 32 | 0.249 | 0.283 | 0.03437 | 113.80% | 0.227 | 124.65% |
| 41 | 0.249 | 0.249 | 0.00044 | 100.18% | 0.150 | 166.73% |
| 42 | 0.249 | 0.251 | 0.00239 | 100.96% | 0.150 | 168.03% |
| ARS | EHD | ARS value | ARS − EHD | (ARS/EHD) % | TP | ARS/TP(%) |
| 11 | 0.376 | 0.377 | 0.001 | 100.25% | 0.151 | 250.12% |
| 12 | 0.284 | 0.287 | 0.003 | 101.19% | 0.151 | 190.21% |
| 21 | 0.258 | 0.261 | 0.003 | 101.28% | 0.239 | 109.19% |
| 22 | 0.269 | 0.276 | 0.007 | 102.53% | 0.239 | 115.45% |
| 31 | 0.276 | 0.308 | 0.032 | 111.50% | 0.227 | 135.60% |
| 32 | 0.339 | 0.404 | 0.065 | 119.09% | 0.227 | 177.65% |
| 41 | 0.382 | 0.407 | 0.025 | 106.58% | 0.150 | 272.33% |
| 42 | 0.515 | 0.531 | 0.017 | 103.21% | 0.150 | 355.13% |

Although the present invention is disclosed via the aforementioned embodiments, those embodiments do not serve to limit the scope of the present invention. A person skilled in the art may perform various alterations and modifications to the present invention without departing from the spirit and the scope of the present invention. Hence, the scope of the present invention should be defined by the following appended claims.

Despite the fact that the present invention is specifically presented and illustrated with reference to the exemplary embodiments thereof, it should be obvious to a person skilled in the art that, various modifications to the forms and details of the present invention may be performed without departing from the scope and spirit of the present invention defined by the following claims and equivalents thereof.

What is claimed is:

1. An optical image capturing system, in order along an optical axis from an object side to an image side, comprising:
    a first lens with refractive power;
    a second lens with positive refractive power;
    a third lens with refractive power;
    a fourth lens with refractive power; and
    an image plane, wherein the optical image capturing system comprises the four lenses with refractive power, at least one lens among the third lens to the fourth lens has positive refractive power, focal lengths of the four lenses are respectively expressed as f1, f2, f3 and f4, a focal length of the optical image capturing system is expressed as f, and an entrance pupil diameter of the optical image capturing system is expressed as HEP, a distance on the optical axis from an object side of the first lens to the image plane is expressed as HOS, a distance on the optical axis from the object side of the first lens to an image side of the fourth lens is expressed as InTL, a maximum effective diameter of the image side of the fourth lens is expressed as PhiA4, thicknesses of the first lens to the fourth lens at height of ½ HEP parallel to the optical axis are respectively expressed as ETP1, ETP2, ETP3 and ETP4, a sum of ETP1 to ETP4 described above is expressed as SETP, thicknesses of the first lens to the fourth lens on the optical axis are respectively expressed as TP1, TP2, TP3 and TP4, a sum of TP1 to TP4 described above is expressed as STP, and the following conditions are satisfied: $1.2 \leq f/HEP \leq 10$; $0.5 \leq HOS/f \leq 7$, $0 < PhiA4/InTL \leq 1.1$ and $0.5 \leq SETP/STP < 1$.

2. The optical image capturing system of claim 1, wherein a distance on the optical axis between the first lens and the second lens is expressed as IN12, a distance on the optical axis between the second lens and the third lens is expressed as IN23, and the following condition is satisfied: $IN23 > IN12$.

3. The optical image capturing system of claim 1, wherein a maximum image height perpendicular to the optical axis on the image plane is expressed as HOI, modulation transfer rates of visible light at a first spatial frequency of 55 cycles/mm at positions of the optical axis on the image plane, 0.3 HOI and 0.7 HOI on the image plane are respectively expressed as MTFE0, MTFE3 and MTFE7, the following conditions are satisfied: MTFE0≥0.3, MTFE3≥0.2, and MTFE7≥0.01.

4. The optical image capturing system of claim 1, wherein a half maximum angle of view of the optical image capturing system is expressed as HAF, and the following condition is satisfied: 0 deg<HAF≤50 deg.

5. The optical image capturing system of claim 1, wherein a horizontal distance parallel to the optical axis from a first coordinate point on the object side of the first lens at height of ½ HEP to the image plane is expressed as ETL, a horizontal distance parallel to the optical axis from the first coordinate point on the object side of the first lens at height of ½ HEP to a second coordinate point on the image side of the fourth lens at height of ½ HEP is expressed as EIN, and the following condition is satisfied: 0.2≤EIN/ETL<1.

6. The optical image capturing system according of claim 1, wherein the thickness parallel to the optical axis of the first lens at height of ½ HEP is expressed as ETP1, the thickness parallel to the optical axis of the second lens at height of ½ HEP is expressed as ETP2, the thickness parallel to the optical axis of the third lens at height of ½ HEP is expressed as ETP3, the thickness parallel to the optical axis of the fourth lens at height of ½ HEP is expressed as ETP4, the sum of ETP1 through ETP4 described above is expressed as SETP, and the following condition is satisfied: 0.3≤SETP/EIN≤0.8.

7. The optical image capturing system of claim 1, wherein a horizontal distance parallel to the optical axis from a second coordinate point on the image side of the fourth lens at height of ½ HEP to the image plane is expressed as EBL, a horizontal distance parallel to the optical axis from an intersection point where the image side of the fourth lens crosses the optical axis to the image plane is expressed as BL, and the following condition is satisfied: 0.2≤EBL/BL≤1.1.

8. The optical image capturing system of claim 1, wherein the optical image capturing system has a maximum image height HOI perpendicular to the optical axis on the image plane, and the following condition is satisfied: 0<PhiA4/2HOI≤2.0.

9. The optical image capturing system of claim 1, further comprising an aperture stop, wherein a distance on the optical axis from the aperture stop to the image plane is expressed by InS, an image-sensing device is disposed in the image plane, the optical image capturing system has a maximum image height HOI perpendicular to the optical axis on the image plane, and the following conditions are satisfied: 0.2≤InS/HOS≤1.1, and 0.5<HOS/HOI≤15.

10. An optical image capturing system, in order along an optical axis from an object side to an image side, comprising:
 a first lens with refractive power;
 a second lens with positive refractive power;
 a third lens with refractive power;
 a fourth lens with refractive power;
 an image plane; and
 a first positioning element comprising a holder, wherein the holder is in a hollow shape and opaque, and comprises a cylinder and a basement connected with each other; the cylinder is configured to accommodate the first lens to the fourth lens; the basement is between the fourth lens and the image plane, an outer periphery of the basement is greater than an outer periphery of the cylinder, a maximum value of the minimum side length of the basement perpendicular to the optical axis is expressed as PhiD;
 wherein the optical image capturing system comprises four lenses with refractive power, at least one lens among the third lens to the fourth lens has positive refractive power, focal lengths of the four lenses of the optical image capturing system are respectively expressed as f1, f2, f3 and f4, a focal length of the optical image capturing system is expressed as f, an entrance pupil diameter of the optical image capturing system is expressed as HEP, a distance on the optical axis from an object side of the first lens to the image plane is expressed as HOS, a half maximum angle of view of the optical image capturing system is expressed as HAF, a maximum effective diameter of an image side of the fourth lens is expressed as PhiA4, a horizontal distance parallel to the optical axis from a first coordinate point on the object side of the first lens at height of ½ HEP to the image plane is expressed as ETL, a horizontal distance parallel to the optical axis from the first coordinate point on the object side of the first lens at height of ½ HEP to a second coordinate point on the image side of the fourth lens at height of ½ HEP is expressed as EIN, and the following conditions are satisfied: 1.2≤f/HEP≤10; 0.5≤HOS/f≤7; 0 deg<HAF≤50 deg; 0 mm<PhiD≤2.0 mm; and 0.2≤EIN/ETL<1.

11. The optical image capturing system of claim 10, wherein the maximum effective diameter of the image side of the fourth lens HAF is expressed as PhiA4, and the following condition is satisfied: 0<PhiA4/InTL≤1.1.

12. The optical image capturing system of claim 10, wherein a distance on the optical axis between the first lens and the second lens is expressed as IN12, a distance on the optical axis between the second lens and the third lens is expressed as IN23, a distance on the optical axis between the third lens and the fourth lens is expressed as IN34, and the following conditions are satisfied: IN23>IN12 and IN23>IN34.

13. The optical image capturing system of claim 10, wherein an object side of the second lens on the optical axis is a convex surface and an image side of the second lens on the optical axis is a convex surface.

14. The optical image capturing system of claim 10, wherein thicknesses of the second lens, the third lens and the fourth lens on the optical axis are respectively expressed as TP2, TP3 and TP4, and the following conditions are satisfied: TP2>TP3 and TP2>TP4.

15. The optical image capturing system of claim 10, wherein the following condition is satisfied: 0<PhiA4/HEP≤3.0.

16. The optical image capturing system of claim 10, wherein the optical image capturing system has a maximum image height HOI perpendicular to the optical axis on the image plane, and the following condition is satisfied: 0<PhiA4/2HOI≤1.0.

17. The optical image capturing system of claim 10, wherein a horizontal distance parallel to the optical axis from a third coordinate point on an image side of the third lens at height of ½ HEP to a fourth coordinate point on an object side of the fourth lens at height of ½ HEP is expressed as ED34; a distance between the third lens and the fourth lens on the optical axis is expressed as IN34 and the following condition is satisfied: 0.5≤ED34/IN34≤10.

18. The optical image capturing system of claim 10, wherein a horizontal distance parallel to the optical axis from a fifth coordinate point on an image side of the second lens at height of ½ HEP to a sixth coordinate point on an object side of the third lens at height of ½ HEP is expressed as ED23; a distance between the second lens and the third lens on the optical axis is expressed as IN23 and the following condition is satisfied: 0.1≤ED23/IN23≤5.

19. The optical image capturing system of claim 10, wherein a maximum image height perpendicular to the optical axis on the image plane is expressed as HOI, modulation transfer rates of visible light at a second spatial frequency of 110 cycles/mm at positions of the optical axis on the image plane, 0.3 HOI and 0.7 HOI on the image plane are respectively expressed as MTFQ0, MTFQ3 and MTFQ7, and the following conditions are satisfied: MTFQ0≥0.3, MTFQ3≥0.2, and MTFQ7≥0.01.

20. An optical image capturing system, in order along an optical axis from an object side to an image side, comprising:
    a first lens with refractive power;
    a second lens with positive refractive power;
    a third lens with positive refractive power;
    a fourth lens with refractive power;
    an image plane;
    a first positioning element comprising a holder, wherein the holder is in a hollow shape and opaque, and comprises a cylinder and a basement connected with each other, and the cylinder is configured to accommodate the four lenses; the basement is between the fourth lens and the image plane; an outer periphery of the basement is greater than an outer periphery of the cylinder; and a maximum value of the minimum side length of the basement perpendicular to the optical axis is expressed as PhiD; and
    a second positioning element accommodated in the holder and comprising a positioning part and a connecting part, wherein the positioning part is in a hollow shape, and directly contacts and accommodates any one of the four lenses to arrange the four lenses on the optical axis; the connecting part is disposed outside the positioning part and directly contacts an inner periphery of the cylinder, and a maximum outer diameter of the connecting part on a plane perpendicular to the optical axis is expressed as PhiC;
    wherein the optical image capturing system comprises the four lenses with refractive power, at least one surface of at least one lens among the first lens to the fourth lens has at least one inflection point, focal lengths of the four lenses are respectively expressed as f1, f2, f3 and f4, a focal length of the optical image capturing system is expressed as f, and an entrance pupil diameter of the optical image capturing system is expressed as HEP, a distance on the optical axis from an object side of the first lens to the image plane is expressed as HOS, a half maximum angle of view of the optical image capturing system is expressed as HAF, a maximum effective diameter of an image side of the fourth lens is expressed as PhiA4, a horizontal distance parallel to the optical axis from a first coordinate point on the object side of the first lens at height of ½ HEP to the image plane is expressed as ETL, a horizontal distance parallel to the optical axis from the first coordinate point on the object side of the first lens at height of ½ HEP to a second coordinate point on the image side of the fourth lens at height of ½ HEP is expressed as EIN, and the following conditions are satisfied: 1.2≤f/HEP≤10; 0.5≤HOS/f≤7; 0 deg<HAF≤50 deg; 0<PhiA4/InTL≤1.1; PhiC<PhiD; 0 mm<PhiD≤2.0 mm; and 0.2≤EIN/ETL<1.

21. The optical image capturing system of claim 20, wherein a distance on the optical axis between the first lens and the second lens is expressed as IN12, a distance on the optical axis between the second lens and the third lens is expressed as IN23, a distance on the optical axis between the third lens and the fourth lens is expressed as IN34, and the following conditions are satisfied: IN23>IN12 and IN23>IN34.

22. The optical image capturing system of claim 20, thicknesses of the second lens, the third lens and the fourth lens on the optical axis are respectively expressed as TP2, TP3 and TP4, and the following condition is satisfied: TP2>TP3 and TP2>TP4.

23. The optical image capturing system of claim 20, wherein the following condition is satisfied: 0 mm<PhiA4≤1.5 mm.

24. The optical image capturing system of claim 20, wherein the optical image capturing system has a maximum image height HOI perpendicular to the optical axis on the image plane, a relative illumination on the maximum image height HOI of the optical image capturing system is expressed as RI, modulation transfer rates of visible light at a first spatial frequency of 55 cycles/mm at positions of the optical axis on the image plane, 0.3 HOI and 0.7 HOI on the image plane are respectively expressed as MTFE0, MTFE3 and MTFE7, and the following conditions are satisfied: MTFE0≥0.3; MTFE3≥0.2; MTFE7≥0.1 and 10%≤RI<100%.

25. The optical image capturing system of claim 20, further comprising an aperture stop, an image-sensing device and a driving module, wherein the image-sensing device is disposed in the image plane, a distance on the optical axis from the aperture stop to the image plane is expressed as InS, the driving module is coupled with the four lenses to displace the four lenses, and the following condition is satisfied: 0.2≤InS/HOS≤1.1.

\* \* \* \* \*